US012699962B2

(12) United States Patent
Zionpour et al.

(10) Patent No.: US 12,699,962 B2
(45) Date of Patent: Aug. 4, 2026

(54) DIGITAL PROCESSING SYSTEMS AND METHODS FOR DUAL MODE EDITING IN COLLABORATIVE DOCUMENTS ENABLING PRIVATE CHANGES IN COLLABORATIVE WORK SYSTEMS

(71) Applicant: MONDAY.COM LTD., Tel Aviv (IL)

(72) Inventors: Ron Zionpour, Kfar Sirkin (IL); Tal Haramati, Tel Aviv (IL); Roy Mann, Tel Aviv (IL)

(73) Assignee: MONDAY.COM LTD., Tel Aviv (IL)

( * ) Notice: Subject to any disclaimer, the term of this patent is extended or adjusted under 35 U.S.C. 154(b) by 0 days.

(21) Appl. No.: 17/565,780

(22) Filed: Dec. 30, 2021

(65) Prior Publication Data

US 2022/0221966 A1     Jul. 14, 2022

Related U.S. Application Data

(63) Continuation of application No. PCT/IB2021/062440, filed on Dec. 29, 2021, and a
(Continued)

(51) Int. Cl.
*G06F 3/0484* (2022.01)
*G06F 3/0481* (2022.01)
(Continued)

(52) U.S. Cl.
CPC .......... *G06F 3/0484* (2013.01); *G06F 3/0481* (2013.01); *G06F 3/04817* (2013.01);
(Continued)

(58) Field of Classification Search
CPC ............................. G06F 3/0484; G06F 40/166
(Continued)

(56) References Cited

U.S. PATENT DOCUMENTS 4,972,314  A    11/1990   Getzinger et al.
5,220,657  A     6/1993   Bly et al.
(Continued)

FOREIGN PATENT DOCUMENTS

CA        2 828 011  A1    9/2012
CN       103064833  A      4/2013
(Continued)

OTHER PUBLICATIONS

U.S. Appl. No. 17/565,843, filed Dec. 30, 2021.
(Continued)

*Primary Examiner* — Stephen S Hong
*Assistant Examiner* — Tionna M Burke
(74) *Attorney, Agent, or Firm* — Finnegan, Henderson, Farabow, Garrett & Dunner LLP

(57)     ABSTRACT

Systems, methods, and computer-readable media for enabling dual mode editing in collaborative documents to enable private changes are disclosed. The systems and methods may involve accessing an electronic collaborative document; receiving from a first editor operating in a collaborative mode, first edits to the electronic collaborative document; outputting second display signals to the first editor and a second editor, the second display signals reflecting the first edits made by the first editor; in a private mode, receiving from the first editor, second edits to the electronic collaborative document; and in response to the second edits, outputting third display signals to the first editor while withholding the third display signals from the second editor, such that the second edits are enabled to appear on a display of the first editor and are prevented from appearing on at least one display of the second editor.

31 Claims, 12 Drawing Sheets

Related U.S. Application Data continuation-in-part of application No. PCT/IB2021/000297, filed on Apr. 28, 2021, and a continuation-in-part of application No. PCT/IB2021/000090, filed on Feb. 11, 2021, and a continuation-in-part of application No. PCT/IB2021/000024, filed on Jan. 14, 2021.

(60) Provisional application No. 63/273,448, filed on Oct. 29, 2021, provisional application No. 63/273,453, filed on Oct. 29, 2021, provisional application No. 63/233,925, filed on Aug. 17, 2021.

(51) Int. Cl.

| | |
|---|---|
| *G06F 3/04817* | (2022.01) |
| *G06F 3/0483* | (2013.01) |
| *G06F 3/04847* | (2022.01) |
| *G06F 3/0485* | (2022.01) |
| *G06F 3/0486* | (2013.01) |
| *G06F 11/1446* | (2026.01) |
| *G06F 16/176* | (2019.01) |
| *G06F 16/18* | (2019.01) |
| *G06F 21/62* | (2013.01) |
| *G06F 40/103* | (2020.01) |
| *G06F 40/106* | (2020.01) |
| *G06F 40/109* | (2020.01) |
| *G06F 40/114* | (2020.01) |
| *G06F 40/117* | (2020.01) |
| *G06F 40/134* | (2020.01) |
| *G06F 40/166* | (2020.01) |
| *G06F 40/169* | (2020.01) |
| *G06F 40/186* | (2020.01) |
| *G06F 40/197* | (2020.01) |
| *G06F 40/30* | (2020.01) |
| *G06K 7/14* | (2006.01) |
| *G06Q 10/10* | (2023.01) |
| *G06T 13/00* | (2011.01) |
| *H04L 9/40* | (2022.01) |
| *H04L 51/046* | (2022.01) |
| *H04L 51/10* | (2022.01) |
| *H04L 65/401* | (2022.01) |
| *H04M 1/72436* | (2021.01) |
| *H04N 1/44* | (2006.01) |
| *G06F 3/04842* | (2022.01) |

(52) U.S. Cl.
CPC ........ *G06F 3/0483* (2013.01); *G06F 3/04847* (2013.01); *G06F 3/0485* (2013.01); *G06F 3/0486* (2013.01); *G06F 11/1469* (2013.01); *G06F 16/176* (2019.01); *G06F 16/1774* (2019.01); *G06F 16/1873* (2019.01); *G06F 21/6209* (2013.01); *G06F 21/6218* (2013.01); *G06F 21/629* (2013.01); *G06F 40/103* (2020.01); *G06F 40/106* (2020.01); *G06F 40/109* (2020.01); *G06F 40/114* (2020.01); *G06F 40/117* (2020.01); *G06F 40/134* (2020.01); *G06F 40/166* (2020.01); *G06F 40/169* (2020.01); *G06F 40/186* (2020.01); *G06F 40/197* (2020.01); *G06F 40/30* (2020.01); *G06K 7/1443* (2013.01); *G06Q 10/103* (2013.01); *G06T 13/00* (2013.01); *H04L 51/046* (2013.01); *H04L 51/10* (2013.01); *H04L 63/101* (2013.01); *H04L 63/102* (2013.01); *H04L 65/4015* (2013.01); *H04M 1/72436* (2021.01); *H04N 1/448* (2013.01); *G06F 3/04842* (2013.01); *G06F 2201/84* (2013.01)

(58) Field of Classification Search
USPC ......................................................... 715/753
See application file for complete search history.

(56) References Cited

U.S. PATENT DOCUMENTS

| | | | |
|---|---|---|---|
| 5,479,602 A | 12/1995 | Baecker et al. | |
| 5,517,663 A | 5/1996 | Kahn | |
| 5,632,009 A | 5/1997 | Rao et al. | |
| 5,657,437 A | 8/1997 | Bishop et al. | |
| 5,682,469 A | 10/1997 | Linnett | |
| 5,696,702 A | 12/1997 | Skinner et al. | |
| 5,726,701 A | 3/1998 | Needham | |
| 5,787,411 A | 7/1998 | Groff et al. | |
| 5,844,555 A * | 12/1998 | Menaker ................ | G06F 17/10 |
| | | | 715/205 |
| 5,880,742 A | 3/1999 | Rao et al. | |
| 5,933,145 A | 8/1999 | Meek | |
| 6,016,438 A | 1/2000 | Wakayama | |
| 6,016,553 A | 1/2000 | Schneider et al. | |
| 6,023,695 A | 2/2000 | Osborn et al. | |
| 6,034,681 A | 3/2000 | Miller et al. | |
| 6,049,622 A | 4/2000 | Robb et al. | |
| 6,088,707 A | 7/2000 | Bates et al. | |
| 6,108,573 A | 8/2000 | Debbins et al. | |
| 6,111,573 A | 8/2000 | McComb et al. | |
| 6,157,381 A | 12/2000 | Bates et al. | |
| 6,167,405 A | 12/2000 | Rosensteel, Jr. et al. | |
| 6,169,534 B1 | 1/2001 | Raffel et al. | |
| 6,182,127 B1 | 1/2001 | Cronin, III et al. | |
| 6,185,582 B1 | 2/2001 | Zellweger et al. | |
| 6,195,794 B1 | 2/2001 | Buxton | |
| 6,252,594 B1 | 6/2001 | Xia et al. | |
| 6,266,067 B1 | 7/2001 | Owen et al. | |
| 6,275,809 B1 | 8/2001 | Tamaki et al. | |
| 6,330,022 B1 | 12/2001 | Seligmann | |
| 6,377,965 B1 | 4/2002 | Hachamovitch et al. | |
| 6,385,617 B1 | 5/2002 | Malik | |
| 6,460,043 B1 | 10/2002 | Tabbara et al. | |
| 6,496,832 B2 | 12/2002 | Chi et al. | |
| 6,509,912 B1 | 1/2003 | Moran et al. | |
| 6,510,459 B2 | 1/2003 | Cronin, III et al. | |
| 6,522,347 B1 | 2/2003 | Tsuji et al. | |
| 6,527,556 B1 | 3/2003 | Koskinen | |
| 6,567,830 B1 | 5/2003 | Madduri | |
| 6,606,740 B1 | 8/2003 | Lynn et al. | |
| 6,626,959 B1 | 9/2003 | Moise et al. | |
| 6,636,242 B2 | 10/2003 | Bowman-Amuah | |
| 6,647,370 B1 | 11/2003 | Fu et al. | |
| 6,661,431 B1 | 12/2003 | Stuart et al. | |
| 6,988,248 B1 | 1/2006 | Tang et al. | |
| 7,027,997 B1 | 4/2006 | Robinson et al. | |
| 7,034,860 B2 | 4/2006 | Lia et al. | |
| 7,043,529 B1 | 5/2006 | Simonoff | |
| 7,054,891 B2 | 5/2006 | Cole | |
| 7,228,492 B1 | 6/2007 | Graham | |
| 7,237,188 B1 | 6/2007 | Leung | |
| 7,249,042 B1 | 7/2007 | Doerr et al. | |
| 7,272,637 B1 | 9/2007 | Himmelstein | |
| 7,274,375 B1 | 9/2007 | David | |
| 7,379,934 B1 | 5/2008 | Forman et al. | |
| 7,380,202 B1 | 5/2008 | Lindhorst et al. | |
| 7,383,320 B1 | 6/2008 | Silberstein et al. | |
| 7,389,473 B1 | 6/2008 | Sawicki et al. | |
| 7,415,664 B2 | 8/2008 | Aureglia et al. | |
| 7,417,644 B2 | 8/2008 | Cooper et al. | |
| 7,461,077 B1 | 12/2008 | Greenwood | |
| 7,489,976 B2 | 2/2009 | Adra | |
| 7,565,270 B2 | 7/2009 | Bramwell et al. | |
| 7,617,443 B2 | 11/2009 | Mills et al. | |
| 7,685,152 B2 | 3/2010 | Chivukula et al. | |
| 7,707,514 B2 | 4/2010 | Forstall et al. | |
| 7,710,290 B2 | 5/2010 | Johnson | |
| 7,747,782 B2 | 6/2010 | Hunt et al. | |
| 7,770,100 B2 | 8/2010 | Chamberlain et al. | |
| 7,827,476 B1 | 11/2010 | Roberts et al. | |

(56)                References Cited

U.S. PATENT DOCUMENTS

| | | | |
|---|---|---|---|
| 7,827,615 B1 | 11/2010 | Allababidi et al. | |
| 7,836,408 B1 | 11/2010 | Ollmann et al. | |
| 7,916,157 B1 | 3/2011 | Kelley et al. | |
| 7,921,360 B1 | 4/2011 | Sundermeyer et al. | |
| 7,933,952 B2 | 4/2011 | Parker et al. | |
| 7,945,622 B1* | 5/2011 | Pegg ..................... | G06Q 10/10 |
| | | | 709/204 |
| 7,954,043 B2 | 5/2011 | Bera | |
| 7,954,064 B2 | 5/2011 | Forstall et al. | |
| 8,046,703 B2 | 10/2011 | Busch et al. | |
| 8,060,518 B2 | 11/2011 | Timmons | |
| 8,078,955 B1 | 12/2011 | Gupta | |
| 8,082,274 B2 | 12/2011 | Steinglass et al. | |
| 8,108,241 B2 | 1/2012 | Shukoor | |
| 8,136,031 B2 | 3/2012 | Massand | |
| 8,151,213 B2 | 4/2012 | Weitzman et al. | |
| 8,223,172 B1 | 7/2012 | Miller et al. | |
| 8,286,072 B2 | 10/2012 | Chamberlain et al. | |
| 8,365,095 B2 | 1/2013 | Bansal et al. | |
| 8,375,327 B2 | 2/2013 | Lorch et al. | |
| 8,386,960 B1 | 2/2013 | Eismann et al. | |
| 8,407,217 B1 | 3/2013 | Zhang | |
| 8,413,261 B2* | 4/2013 | Nemoy ................. | H04L 63/102 |
| | | | 726/4 |
| 8,423,909 B2 | 4/2013 | Zabielski | |
| 8,543,566 B2 | 9/2013 | Weissman et al. | |
| 8,548,997 B1 | 10/2013 | Wu | |
| 8,560,942 B2 | 10/2013 | Fortes et al. | |
| 8,566,732 B2 | 10/2013 | Louch et al. | |
| 8,572,173 B2 | 10/2013 | Briere et al. | |
| 8,578,399 B2 | 11/2013 | Khen et al. | |
| 8,601,383 B2 | 12/2013 | Folting et al. | |
| 8,620,703 B1 | 12/2013 | Kapoor et al. | |
| 8,621,652 B2 | 12/2013 | Slater, Jr. | |
| 8,635,520 B2 | 1/2014 | Christiansen et al. | |
| 8,677,448 B1 | 3/2014 | Kauffman et al. | |
| 8,719,071 B2 | 5/2014 | Macintyre et al. | |
| 8,738,414 B1 | 5/2014 | Nagar et al. | |
| 8,812,471 B2 | 8/2014 | Akita | |
| 8,819,042 B2 | 8/2014 | Samudrala et al. | |
| 8,825,758 B2* | 9/2014 | Bailor ..................... | G06F 21/31 |
| | | | 709/204 |
| 8,838,533 B2 | 9/2014 | Kwiatkowski et al. | |
| 8,862,979 B2 | 10/2014 | Hawking | |
| 8,863,022 B2 | 10/2014 | Rhodes et al. | |
| 8,869,027 B2 | 10/2014 | Louch et al. | |
| 8,937,627 B1 | 1/2015 | Otero et al. | |
| 8,938,465 B2 | 1/2015 | Messer | |
| 8,954,871 B2 | 2/2015 | Louch et al. | |
| 9,007,405 B1 | 4/2015 | Eldar et al. | |
| 9,015,716 B2 | 4/2015 | Fletcher et al. | |
| 9,021,118 B2 | 4/2015 | John et al. | |
| 9,026,897 B2 | 5/2015 | Zarras | |
| 9,043,362 B2 | 5/2015 | Weissman et al. | |
| 9,063,958 B2 | 6/2015 | Müller et al. | |
| 9,129,234 B2 | 9/2015 | Campbell et al. | |
| 9,159,246 B2 | 10/2015 | Rodriguez et al. | |
| 9,172,738 B1 | 10/2015 | daCosta | |
| 9,177,238 B2 | 11/2015 | Windmueller et al. | |
| 9,183,303 B1 | 11/2015 | Goel et al. | |
| 9,223,770 B1 | 12/2015 | Ledet | |
| 9,239,719 B1 | 1/2016 | Feinstein et al. | |
| 9,244,917 B1 | 1/2016 | Sharma et al. | |
| 9,253,130 B2 | 2/2016 | Zaveri | |
| 9,268,604 B1 | 2/2016 | Herzberg et al. | |
| 9,286,246 B2 | 3/2016 | Saito et al. | |
| 9,286,475 B2 | 3/2016 | Li et al. | |
| 9,292,587 B2 | 3/2016 | Kann et al. | |
| 9,336,502 B2 | 5/2016 | Mohammad et al. | |
| 9,342,579 B2 | 5/2016 | Cao et al. | |
| 9,361,287 B1 | 6/2016 | Simon et al. | |
| 9,390,059 B1 | 7/2016 | Gur et al. | |
| 9,424,287 B2 | 8/2016 | Schroth | |
| 9,424,333 B1 | 8/2016 | Bisignani et al. | |
| 9,424,545 B1 | 8/2016 | Lee | |
| 9,430,458 B2 | 8/2016 | Rhee et al. | |
| 9,449,031 B2 | 9/2016 | Barrus et al. | |
| 9,495,386 B2 | 11/2016 | Tapley et al. | |
| 9,501,751 B1 | 11/2016 | Holler et al. | |
| 9,519,699 B1 | 12/2016 | Kulkarni et al. | |
| 9,558,172 B2 | 1/2017 | Rampson et al. | |
| 9,569,511 B2 | 2/2017 | Morin | |
| 9,613,086 B1 | 4/2017 | Sherman | |
| 9,635,091 B1 | 4/2017 | Laukkanen et al. | |
| 9,659,284 B1 | 5/2017 | Wilson et al. | |
| 9,679,456 B2 | 6/2017 | East | |
| 9,686,086 B1 | 6/2017 | Nguyen et al. | |
| 9,720,602 B1 | 8/2017 | Chen et al. | |
| 9,727,376 B1 | 8/2017 | Bills et al. | |
| 9,760,271 B2 | 9/2017 | Persaud | |
| 9,779,150 B1 | 10/2017 | Sherman et al. | |
| 9,794,256 B2 | 10/2017 | Kiang et al. | |
| 9,798,829 B1 | 10/2017 | Baisley | |
| 9,811,676 B1 | 11/2017 | Gauvin | |
| 9,866,561 B2 | 1/2018 | Psenka et al. | |
| 9,870,136 B2 | 1/2018 | Pourshahid | |
| 10,001,908 B2 | 6/2018 | Grieve et al. | |
| 10,043,296 B2 | 8/2018 | Li | |
| 10,067,928 B1 | 9/2018 | Krappe | |
| 10,078,668 B1 | 9/2018 | Woodrow et al. | |
| 10,169,306 B2 | 1/2019 | O'Shaughnessy et al. | |
| 10,176,154 B2 | 1/2019 | Ben-Aharon et al. | |
| 10,235,441 B1 | 3/2019 | Makhlin et al. | |
| 10,255,609 B2 | 4/2019 | Kinkead et al. | |
| 10,282,405 B1 | 5/2019 | Silk et al. | |
| 10,282,406 B2 | 5/2019 | Bissantz | |
| 10,311,080 B2 | 6/2019 | Folting et al. | |
| 10,318,624 B1 | 6/2019 | Rosner et al. | |
| 10,327,712 B2 | 6/2019 | Beymer et al. | |
| 10,347,017 B2 | 7/2019 | Ruble et al. | |
| 10,372,706 B2 | 8/2019 | Chavan et al. | |
| 10,380,140 B2 | 8/2019 | Sherman | |
| 10,423,758 B2 | 9/2019 | Kido et al. | |
| 10,445,702 B1 | 10/2019 | Hunt | |
| 10,452,360 B1 | 10/2019 | Burman et al. | |
| 10,453,118 B2 | 10/2019 | Smith et al. | |
| 10,474,317 B2 | 11/2019 | Ramanathan et al. | |
| 10,489,391 B1 | 11/2019 | Tomlin | |
| 10,489,462 B1 | 11/2019 | Rogynskyy et al. | |
| 10,496,737 B1 | 12/2019 | Sayre et al. | |
| 10,505,825 B1 | 12/2019 | Bettaiah et al. | |
| 10,528,599 B1 | 1/2020 | Pandis et al. | |
| 10,534,507 B1 | 1/2020 | Laukkanen et al. | |
| 10,540,152 B1 | 1/2020 | Krishnaswamy et al. | |
| 10,540,434 B2 | 1/2020 | Migeon et al. | |
| 10,546,001 B1 | 1/2020 | Nguyen et al. | |
| 10,564,622 B1 | 2/2020 | Dean et al. | |
| 10,573,407 B2 | 2/2020 | Ginsburg | |
| 10,579,724 B2 | 3/2020 | Campbell et al. | |
| 10,587,714 B1 | 3/2020 | Kulkarni et al. | |
| 10,628,002 B1 | 4/2020 | Kang et al. | |
| 10,698,594 B2 | 6/2020 | Sanches et al. | |
| 10,706,061 B2 | 7/2020 | Sherman et al. | |
| 10,719,220 B2 | 7/2020 | Ouellet et al. | |
| 10,733,256 B2 | 8/2020 | Fickenscher et al. | |
| 10,740,117 B2 | 8/2020 | Ording et al. | |
| 10,747,764 B1 | 8/2020 | Plenderleith | |
| 10,747,950 B2 | 8/2020 | Dang et al. | |
| 10,748,312 B2 | 8/2020 | Ruble et al. | |
| 10,754,688 B2 | 8/2020 | Powell | |
| 10,761,691 B2 | 9/2020 | Anzures et al. | |
| 10,795,555 B2 | 10/2020 | Burke et al. | |
| 10,809,696 B1 | 10/2020 | Principato | |
| 10,817,660 B2 | 10/2020 | Rampson et al. | |
| D910,077 S | 2/2021 | Naroshevitch et al. | |
| 10,963,578 B2 | 3/2021 | More et al. | |
| 11,010,371 B1 | 5/2021 | Slomka et al. | |
| 11,030,259 B2 | 6/2021 | Mullins et al. | |
| 11,042,363 B1 | 6/2021 | Krishnaswamy et al. | |
| 11,042,699 B1 | 6/2021 | Sayre et al. | |
| 11,048,714 B2 | 6/2021 | Sherman et al. | |
| 11,086,894 B1 | 8/2021 | Srivastava et al. | |
| 11,144,854 B1 | 10/2021 | Mouawad | |
| 11,222,167 B2 | 1/2022 | Gehrmann et al. | |

(56) References Cited

U.S. PATENT DOCUMENTS

| | | |
|---|---|---|
| 11,243,688 B1 | 2/2022 | Remy et al. |
| 11,341,705 B1 | 5/2022 | Isaacs et al. |
| 11,429,384 B1 | 8/2022 | Navert et al. |
| 11,443,390 B1 | 9/2022 | Caligaris et al. |
| 11,531,446 B1 | 12/2022 | Kakaire |
| 11,620,615 B2 | 4/2023 | Jiang et al. |
| 11,682,091 B2 | 6/2023 | Sukman et al. |
| 12,056,664 B2 | 8/2024 | Zionpour et al. |
| 2001/0008998 A1 | 7/2001 | Tamaki et al. |
| 2001/0032248 A1 | 10/2001 | Krafchin |
| 2001/0039551 A1 | 11/2001 | Saito et al. |
| 2002/0002459 A1 | 1/2002 | Lewis et al. |
| 2002/0065848 A1 | 5/2002 | Walker et al. |
| 2002/0065849 A1 | 5/2002 | Ferguson et al. |
| 2002/0065880 A1 | 5/2002 | Hasegawa et al. |
| 2002/0069207 A1 | 6/2002 | Alexander et al. |
| 2002/0075309 A1 | 6/2002 | Michelman et al. |
| 2002/0082892 A1 | 6/2002 | Raffel et al. |
| 2002/0099777 A1 | 7/2002 | Gupta et al. |
| 2002/0138528 A1 | 9/2002 | Gong et al. |
| 2003/0033196 A1 | 2/2003 | Tomlin |
| 2003/0041113 A1 | 2/2003 | Larsen |
| 2003/0051377 A1 | 3/2003 | Chirafesi, Jr. |
| 2003/0052912 A1 | 3/2003 | Bowman et al. |
| 2003/0058277 A1 | 3/2003 | Bowman-Amuah |
| 2003/0065662 A1 | 4/2003 | Cosic |
| 2003/0093408 A1 | 5/2003 | Brown et al. |
| 2003/0101416 A1 | 5/2003 | McInnes et al. |
| 2003/0135558 A1 | 7/2003 | Bellotti et al. |
| 2003/0137536 A1 | 7/2003 | Hugh |
| 2003/0187864 A1 | 10/2003 | McGoveran |
| 2003/0200215 A1 | 10/2003 | Chen et al. |
| 2003/0204490 A1 | 10/2003 | Kasriel |
| 2003/0233224 A1 | 12/2003 | Marchisio et al. |
| 2004/0032432 A1 | 2/2004 | Baynger |
| 2004/0078257 A1 | 4/2004 | Schweitzer et al. |
| 2004/0078373 A1 | 4/2004 | Ghoneimy et al. |
| 2004/0098284 A1 | 5/2004 | Petito et al. |
| 2004/0111666 A1 | 6/2004 | Hollcraft |
| 2004/0133441 A1 | 7/2004 | Brady et al. |
| 2004/0138939 A1 | 7/2004 | Theiler |
| 2004/0139400 A1 | 7/2004 | Allam et al. |
| 2004/0162833 A1 | 8/2004 | Jones et al. |
| 2004/0172592 A1 | 9/2004 | Collie et al. |
| 2004/0186762 A1 | 9/2004 | Beaven et al. |
| 2004/0212615 A1 | 10/2004 | Uthe |
| 2004/0215443 A1 | 10/2004 | Hatton |
| 2004/0230940 A1 | 11/2004 | Cooper et al. |
| 2004/0268227 A1 | 12/2004 | Brid |
| 2005/0034058 A1 | 2/2005 | Mills et al. |
| 2005/0034064 A1 | 2/2005 | Meyers et al. |
| 2005/0039001 A1 | 2/2005 | Hudis et al. |
| 2005/0039033 A1 | 2/2005 | Meyers et al. |
| 2005/0044486 A1 | 2/2005 | Kotler et al. |
| 2005/0060342 A1 | 3/2005 | Farag |
| 2005/0063615 A1 | 3/2005 | Siegel et al. |
| 2005/0066306 A1 | 3/2005 | Diab |
| 2005/0086360 A1 | 4/2005 | Mamou et al. |
| 2005/0091314 A1 | 4/2005 | Blagsvedt et al. |
| 2005/0091596 A1 | 4/2005 | Anthony et al. |
| 2005/0096973 A1 | 5/2005 | Heyse et al. |
| 2005/0114305 A1 | 5/2005 | Haynes et al. |
| 2005/0125395 A1 | 6/2005 | Boettiger |
| 2005/0165600 A1 | 7/2005 | Kasravi et al. |
| 2005/0171881 A1 | 8/2005 | Ghassemieh et al. |
| 2005/0210371 A1 | 9/2005 | Pollock et al. |
| 2005/0216830 A1 | 9/2005 | Turner et al. |
| 2005/0228250 A1 | 10/2005 | Bitter et al. |
| 2005/0251021 A1 | 11/2005 | Kaufman et al. |
| 2005/0257204 A1 | 11/2005 | Bryant et al. |
| 2005/0278297 A1 | 12/2005 | Nelson |
| 2005/0289170 A1 | 12/2005 | Brown et al. |
| 2005/0289342 A1 | 12/2005 | Needham et al. |
| 2005/0289453 A1 | 12/2005 | Segal et al. |
| 2006/0009960 A1 | 1/2006 | Valencot et al. |
| 2006/0013462 A1 | 1/2006 | Sadikali |
| 2006/0015499 A1 | 1/2006 | Clissold et al. |
| 2006/0015806 A1 | 1/2006 | Wallace |
| 2006/0031148 A1 | 2/2006 | O'Dell et al. |
| 2006/0031764 A1* | 2/2006 | Keyser ............ G06F 40/114 |
| | | 715/251 |
| 2006/0036568 A1 | 2/2006 | Moore et al. |
| 2006/0047553 A1 | 3/2006 | Fuhrmann et al. |
| 2006/0047811 A1 | 3/2006 | Lau et al. |
| 2006/0053096 A1 | 3/2006 | Subramanian et al. |
| 2006/0053194 A1 | 3/2006 | Schneider et al. |
| 2006/0069604 A1 | 3/2006 | Leukart et al. |
| 2006/0069635 A1 | 3/2006 | Ram et al. |
| 2006/0080594 A1 | 4/2006 | Chavoustie et al. |
| 2006/0085744 A1 | 4/2006 | Hays et al. |
| 2006/0090169 A1 | 4/2006 | Daniels et al. |
| 2006/0101324 A1 | 5/2006 | Goldberg et al. |
| 2006/0106642 A1 | 5/2006 | Reicher et al. |
| 2006/0107196 A1 | 5/2006 | Thanu et al. |
| 2006/0111953 A1 | 5/2006 | Setya |
| 2006/0112123 A1 | 5/2006 | Clark et al. |
| 2006/0129415 A1 | 6/2006 | Thukral et al. |
| 2006/0129913 A1 | 6/2006 | Vigesaa et al. |
| 2006/0136828 A1 | 6/2006 | Asano |
| 2006/0150090 A1 | 7/2006 | Swamidass |
| 2006/0173908 A1 | 8/2006 | Browning et al. |
| 2006/0190313 A1 | 8/2006 | Lu |
| 2006/0212299 A1 | 9/2006 | Law |
| 2006/0224542 A1 | 10/2006 | Yalamanchi |
| 2006/0224568 A1 | 10/2006 | Debrito |
| 2006/0224946 A1 | 10/2006 | Barrett et al. |
| 2006/0236246 A1 | 10/2006 | Bono et al. |
| 2006/0250369 A1 | 11/2006 | Keim |
| 2006/0253205 A1 | 11/2006 | Gardiner |
| 2006/0271574 A1 | 11/2006 | Villaron et al. |
| 2006/0287998 A1 | 12/2006 | Folting et al. |
| 2006/0294451 A1 | 12/2006 | Kelkar et al. |
| 2007/0027932 A1 | 2/2007 | Thibeault |
| 2007/0032993 A1 | 2/2007 | Yamaguchi et al. |
| 2007/0033531 A1 | 2/2007 | Marsh |
| 2007/0050322 A1 | 3/2007 | Vigesaa et al. |
| 2007/0050379 A1 | 3/2007 | Day et al. |
| 2007/0050710 A1 | 3/2007 | Redekop |
| 2007/0073899 A1 | 3/2007 | Judge et al. |
| 2007/0092048 A1 | 4/2007 | Chelstrom et al. |
| 2007/0094607 A1 | 4/2007 | Morgan et al. |
| 2007/0101291 A1 | 5/2007 | Forstall et al. |
| 2007/0106754 A1 | 5/2007 | Moore |
| 2007/0118527 A1 | 5/2007 | Winje et al. |
| 2007/0118813 A1 | 5/2007 | Forstall et al. |
| 2007/0143169 A1 | 6/2007 | Grant et al. |
| 2007/0150389 A1 | 6/2007 | Aamodt et al. |
| 2007/0168861 A1 | 7/2007 | Bell et al. |
| 2007/0174228 A1 | 7/2007 | Folting et al. |
| 2007/0174760 A1 | 7/2007 | Chamberlain et al. |
| 2007/0186173 A1 | 8/2007 | Both et al. |
| 2007/0220119 A1 | 9/2007 | Himmelstein |
| 2007/0233647 A1 | 10/2007 | Rawat et al. |
| 2007/0239746 A1 | 10/2007 | Masselle et al. |
| 2007/0256043 A1 | 11/2007 | Peters et al. |
| 2007/0282522 A1 | 12/2007 | Geelen |
| 2007/0282627 A1 | 12/2007 | Greenstein et al. |
| 2007/0283259 A1 | 12/2007 | Barry et al. |
| 2007/0294235 A1 | 12/2007 | Millett |
| 2007/0299795 A1 | 12/2007 | Macbeth et al. |
| 2007/0300174 A1 | 12/2007 | Macbeth et al. |
| 2007/0300185 A1 | 12/2007 | Macbeth et al. |
| 2008/0004929 A9 | 1/2008 | Raffel et al. |
| 2008/0005235 A1 | 1/2008 | Hegde et al. |
| 2008/0010615 A1 | 1/2008 | Curtis et al. |
| 2008/0033777 A1 | 2/2008 | Shukoor |
| 2008/0034307 A1 | 2/2008 | Cisler et al. |
| 2008/0034314 A1 | 2/2008 | Louch et al. |
| 2008/0052291 A1 | 2/2008 | Bender |
| 2008/0059312 A1 | 3/2008 | Gern et al. |
| 2008/0059539 A1 | 3/2008 | Chin et al. |
| 2008/0065460 A1 | 3/2008 | Raynor |
| 2008/0077530 A1 | 3/2008 | Banas et al. |
| 2008/0097748 A1 | 4/2008 | Haley et al. |

(56) References Cited

U.S. PATENT DOCUMENTS

| | | |
|---|---|---|
| 2008/0104091 A1 | 5/2008 | Chin |
| 2008/0126389 A1 | 5/2008 | Mush et al. |
| 2008/0126945 A1 | 5/2008 | Munkvold et al. |
| 2008/0133736 A1 | 6/2008 | Wensley et al. |
| 2008/0148140 A1 | 6/2008 | Nakano |
| 2008/0155547 A1 | 6/2008 | Weber et al. |
| 2008/0163075 A1 | 7/2008 | Beck et al. |
| 2008/0183593 A1 | 7/2008 | Dierks |
| 2008/0195948 A1 | 8/2008 | Bauer |
| 2008/0209318 A1 | 8/2008 | Allsop et al. |
| 2008/0216022 A1 | 9/2008 | Lorch et al. |
| 2008/0222192 A1 | 9/2008 | Hughes |
| 2008/0256014 A1 | 10/2008 | Gould et al. |
| 2008/0256429 A1 | 10/2008 | Penner et al. |
| 2008/0270597 A1 | 10/2008 | Tenenti |
| 2008/0282189 A1 | 11/2008 | Hofmann et al. |
| 2008/0295038 A1 | 11/2008 | Helfman et al. |
| 2008/0301237 A1 | 12/2008 | Parsons |
| 2009/0006171 A1 | 1/2009 | Blatchley et al. |
| 2009/0006283 A1 | 1/2009 | Labrie et al. |
| 2009/0007157 A1 | 1/2009 | Ward et al. |
| 2009/0013244 A1 | 1/2009 | Cudich et al. |
| 2009/0019383 A1 | 1/2009 | Riley et al. |
| 2009/0024944 A1 | 1/2009 | Louch et al. |
| 2009/0043814 A1 | 2/2009 | Faris et al. |
| 2009/0044090 A1 | 2/2009 | Gur et al. |
| 2009/0048896 A1 | 2/2009 | Anandan |
| 2009/0049372 A1 | 2/2009 | Goldberg |
| 2009/0075694 A1 | 3/2009 | Kim et al. |
| 2009/0077164 A1 | 3/2009 | Phillips et al. |
| 2009/0077217 A1 | 3/2009 | McFarland et al. |
| 2009/0083140 A1 | 3/2009 | Phan |
| 2009/0094514 A1 | 4/2009 | Dargahi et al. |
| 2009/0113310 A1 | 4/2009 | Appleyard et al. |
| 2009/0129596 A1 | 5/2009 | Chavez et al. |
| 2009/0132331 A1 | 5/2009 | Cartledge et al. |
| 2009/0132470 A1 | 5/2009 | Vignet |
| 2009/0150813 A1 | 6/2009 | Chang et al. |
| 2009/0174680 A1 | 7/2009 | Anzures et al. |
| 2009/0192787 A1 | 7/2009 | Roon |
| 2009/0198715 A1 | 8/2009 | Barbarek |
| 2009/0222760 A1 | 9/2009 | Halverson et al. |
| 2009/0234699 A1 | 9/2009 | Steinglass et al. |
| 2009/0248710 A1 | 10/2009 | McCormack et al. |
| 2009/0256972 A1 | 10/2009 | Ramaswamy et al. |
| 2009/0262690 A1 | 10/2009 | Breuer et al. |
| 2009/0271696 A1 | 10/2009 | Bailor et al. |
| 2009/0276692 A1 | 11/2009 | Rosner |
| 2009/0292690 A1 | 11/2009 | Culbert |
| 2009/0313201 A1 | 12/2009 | Huelsman et al. |
| 2009/0313537 A1 | 12/2009 | Fu et al. |
| 2009/0313570 A1 | 12/2009 | Po et al. |
| 2009/0319542 A1 | 12/2009 | Le Brazidec et al. |
| 2009/0319623 A1 | 12/2009 | Srinivasan et al. |
| 2009/0319882 A1 | 12/2009 | Morrison et al. |
| 2009/0327240 A1 | 12/2009 | Meehan et al. |
| 2009/0327301 A1 | 12/2009 | Lees et al. |
| 2009/0327851 A1 | 12/2009 | Raposo |
| 2009/0327875 A1 | 12/2009 | Kinkoh |
| 2010/0017699 A1 | 1/2010 | Farrell et al. |
| 2010/0031135 A1 | 2/2010 | Naghshin et al. |
| 2010/0070845 A1 | 3/2010 | Facemire et al. |
| 2010/0070895 A1 | 3/2010 | Messer |
| 2010/0082705 A1 | 4/2010 | Ramesh et al. |
| 2010/0083164 A1 | 4/2010 | Martin et al. |
| 2010/0088636 A1 | 4/2010 | Yerkes et al. |
| 2010/0095219 A1 | 4/2010 | Stachowiak et al. |
| 2010/0095298 A1 | 4/2010 | Seshadrinathan et al. |
| 2010/0100427 A1 | 4/2010 | McKeown et al. |
| 2010/0100463 A1 | 4/2010 | Molotsi et al. |
| 2010/0114926 A1 | 5/2010 | Agrawal et al. |
| 2010/0149005 A1 | 6/2010 | Yoon et al. |
| 2010/0174678 A1 | 7/2010 | Massand |
| 2010/0205521 A1 | 8/2010 | Folting |
| 2010/0228752 A1 | 9/2010 | Folting et al. |
| 2010/0241477 A1 | 9/2010 | Nylander et al. |
| 2010/0241948 A1 | 9/2010 | Andeen et al. |
| 2010/0241968 A1 | 9/2010 | Tarara et al. |
| 2010/0241972 A1* | 9/2010 | Spataro ................. G06Q 10/10 |
| | | 715/753 |
| 2010/0241990 A1 | 9/2010 | Gabriel et al. |
| 2010/0251090 A1 | 9/2010 | Chamberlain et al. |
| 2010/0251386 A1 | 9/2010 | Gilzean et al. |
| 2010/0257015 A1 | 10/2010 | Molander |
| 2010/0262625 A1 | 10/2010 | Pittenger |
| 2010/0268705 A1 | 10/2010 | Douglas et al. |
| 2010/0268773 A1 | 10/2010 | Hunt et al. |
| 2010/0287163 A1* | 11/2010 | Sridhar ................. G06Q 10/10 |
| | | 707/E17.089 |
| 2010/0287221 A1 | 11/2010 | Battepati et al. |
| 2010/0313119 A1 | 12/2010 | Baldwin et al. |
| 2010/0324964 A1 | 12/2010 | Callanan et al. |
| 2010/0332973 A1 | 12/2010 | Kloiber et al. |
| 2011/0010340 A1 | 1/2011 | Hung et al. |
| 2011/0016432 A1 | 1/2011 | Helfman |
| 2011/0028138 A1 | 2/2011 | Davies-Moore et al. |
| 2011/0041140 A1 | 2/2011 | Harm et al. |
| 2011/0047484 A1 | 2/2011 | Mount et al. |
| 2011/0055177 A1 | 3/2011 | Chakra et al. |
| 2011/0066933 A1 | 3/2011 | Ludwig |
| 2011/0071869 A1 | 3/2011 | O'Brien et al. |
| 2011/0106636 A1 | 5/2011 | Spear et al. |
| 2011/0119352 A1 | 5/2011 | Perov et al. |
| 2011/0154192 A1 | 6/2011 | Yang et al. |
| 2011/0179371 A1 | 7/2011 | Kopycinski et al. |
| 2011/0205231 A1 | 8/2011 | Hartley et al. |
| 2011/0208324 A1 | 8/2011 | Fukatsu |
| 2011/0208732 A1 | 8/2011 | Melton et al. |
| 2011/0209150 A1 | 8/2011 | Hammond et al. |
| 2011/0219321 A1 | 9/2011 | Gonzalez et al. |
| 2011/0225500 A1 | 9/2011 | Casalaina et al. |
| 2011/0225525 A1 | 9/2011 | Chasman et al. |
| 2011/0231273 A1 | 9/2011 | Buchheit |
| 2011/0238716 A1 | 9/2011 | Amir et al. |
| 2011/0258040 A1 | 10/2011 | Ghanasambandam |
| 2011/0269424 A1 | 11/2011 | Multer |
| 2011/0288900 A1 | 11/2011 | McQueen et al. |
| 2011/0289397 A1 | 11/2011 | Eastmond et al. |
| 2011/0289439 A1 | 11/2011 | Jugel |
| 2011/0298618 A1 | 12/2011 | Stahl et al. |
| 2011/0302003 A1 | 12/2011 | Shirish et al. |
| 2012/0029962 A1 | 2/2012 | Podgurny et al. |
| 2012/0035974 A1 | 2/2012 | Seybold |
| 2012/0036423 A1 | 2/2012 | Haynes et al. |
| 2012/0036462 A1 | 2/2012 | Schwartz et al. |
| 2012/0050802 A1 | 3/2012 | Masuda |
| 2012/0066587 A1 | 3/2012 | Zhou et al. |
| 2012/0072821 A1 | 3/2012 | Bowling |
| 2012/0079408 A1 | 3/2012 | Rohwer |
| 2012/0081762 A1 | 4/2012 | Yamada |
| 2012/0084798 A1 | 4/2012 | Reeves et al. |
| 2012/0086716 A1 | 4/2012 | Reeves et al. |
| 2012/0086717 A1 | 4/2012 | Liu |
| 2012/0089610 A1 | 4/2012 | Agrawal et al. |
| 2012/0089914 A1 | 4/2012 | Holt et al. |
| 2012/0089992 A1 | 4/2012 | Reeves et al. |
| 2012/0096389 A1 | 4/2012 | Flam et al. |
| 2012/0096392 A1 | 4/2012 | Ording et al. |
| 2012/0102432 A1 | 4/2012 | Breedvelt-Schouten et al. |
| 2012/0102543 A1 | 4/2012 | Kohli et al. |
| 2012/0110515 A1 | 5/2012 | Abramoff et al. |
| 2012/0116834 A1 | 5/2012 | Pope et al. |
| 2012/0116835 A1 | 5/2012 | Pope et al. |
| 2012/0124749 A1 | 5/2012 | Lewman |
| 2012/0130907 A1 | 5/2012 | Thompson et al. |
| 2012/0131445 A1 | 5/2012 | Oyarzabal et al. |
| 2012/0151173 A1 | 6/2012 | Shirley et al. |
| 2012/0158744 A1 | 6/2012 | Tseng et al. |
| 2012/0192050 A1 | 7/2012 | Campbell et al. |
| 2012/0198322 A1 | 8/2012 | Gulwani et al. |
| 2012/0210252 A1 | 8/2012 | Fedoseyeva et al. |
| 2012/0215574 A1 | 8/2012 | Driessnack et al. |
| 2012/0215578 A1 | 8/2012 | Swierz, III et al. |
| 2012/0229867 A1 | 9/2012 | Takagi |

(56) References Cited

U.S. PATENT DOCUMENTS

| | | |
|---|---|---|
| 2012/0233150 A1 | 9/2012 | Naim et al. |
| 2012/0233533 A1 | 9/2012 | Yücel et al. |
| 2012/0234907 A1 | 9/2012 | Clark et al. |
| 2012/0236368 A1 | 9/2012 | Uchida et al. |
| 2012/0239454 A1 | 9/2012 | Taix et al. |
| 2012/0244891 A1 | 9/2012 | Appleton |
| 2012/0246170 A1 | 9/2012 | Iantorno |
| 2012/0254252 A1 | 10/2012 | Jin et al. |
| 2012/0254770 A1 | 10/2012 | Ophir |
| 2012/0260190 A1 | 10/2012 | Berger et al. |
| 2012/0278117 A1 | 11/2012 | Nguyen et al. |
| 2012/0284197 A1 | 11/2012 | Strick et al. |
| 2012/0284643 A1* | 11/2012 | Sitrick ................. G06F 40/169 |
| | | 715/753 |
| 2012/0297307 A1 | 11/2012 | Rider et al. |
| 2012/0300931 A1 | 11/2012 | Ollikainen et al. |
| 2012/0303262 A1 | 11/2012 | Alam et al. |
| 2012/0304098 A1 | 11/2012 | Kuulusa |
| 2012/0311496 A1 | 12/2012 | Cao et al. |
| 2012/0311672 A1 | 12/2012 | Connor et al. |
| 2012/0324348 A1 | 12/2012 | Rounthwaite |
| 2013/0015954 A1 | 1/2013 | Thorne et al. |
| 2013/0018952 A1 | 1/2013 | McConnell et al. |
| 2013/0018953 A1 | 1/2013 | McConnell et al. |
| 2013/0018960 A1 | 1/2013 | Knysz et al. |
| 2013/0024418 A1 | 1/2013 | Strick et al. |
| 2013/0024760 A1 | 1/2013 | Vogel et al. |
| 2013/0036369 A1 | 2/2013 | Mitchell et al. |
| 2013/0041958 A1 | 2/2013 | Post et al. |
| 2013/0054514 A1* | 2/2013 | Barrett-Kahn ...... G06F 16/9574 |
| | | 707/E17.005 |
| 2013/0055113 A1 | 2/2013 | Chazin et al. |
| 2013/0059598 A1 | 3/2013 | Miyagi et al. |
| 2013/0063490 A1 | 3/2013 | Zaman et al. |
| 2013/0086460 A1 | 4/2013 | Folting et al. |
| 2013/0090969 A1 | 4/2013 | Rivere |
| 2013/0097490 A1 | 4/2013 | Kotler et al. |
| 2013/0103417 A1 | 4/2013 | Seto et al. |
| 2013/0104035 A1 | 4/2013 | Wagner et al. |
| 2013/0111320 A1 | 5/2013 | Campbell et al. |
| 2013/0117268 A1 | 5/2013 | Smith et al. |
| 2013/0159832 A1 | 6/2013 | Ingargiola et al. |
| 2013/0159907 A1 | 6/2013 | Brosche et al. |
| 2013/0179209 A1 | 7/2013 | Milosevich |
| 2013/0211866 A1 | 8/2013 | Gordon et al. |
| 2013/0212197 A1 | 8/2013 | Karlson |
| 2013/0212234 A1 | 8/2013 | Bartlett et al. |
| 2013/0215475 A1 | 8/2013 | Noguchi |
| 2013/0238363 A1 | 9/2013 | Ohta et al. |
| 2013/0238968 A1 | 9/2013 | Barrus |
| 2013/0246384 A1 | 9/2013 | Victor |
| 2013/0262527 A1 | 10/2013 | Hunter |
| 2013/0268331 A1 | 10/2013 | Bitz et al. |
| 2013/0297468 A1 | 11/2013 | Hirsch et al. |
| 2013/0307997 A1 | 11/2013 | O'Keefe et al. |
| 2013/0318424 A1 | 11/2013 | Boyd |
| 2013/0339051 A1 | 12/2013 | Dobrean |
| 2014/0002863 A1 | 1/2014 | Hasegawa et al. |
| 2014/0006326 A1 | 1/2014 | Bazanov |
| 2014/0012616 A1 | 1/2014 | Moshenek |
| 2014/0019842 A1 | 1/2014 | Montagna et al. |
| 2014/0033307 A1 | 1/2014 | Schmidtler |
| 2014/0043331 A1 | 2/2014 | Makinen et al. |
| 2014/0046638 A1 | 2/2014 | Peloski |
| 2014/0052749 A1 | 2/2014 | Rissanen |
| 2014/0058801 A1 | 2/2014 | Deodhar et al. |
| 2014/0059017 A1 | 2/2014 | Chaney et al. |
| 2014/0068403 A1 | 3/2014 | Bhargav et al. |
| 2014/0074545 A1 | 3/2014 | Minder et al. |
| 2014/0075301 A1 | 3/2014 | Mihara |
| 2014/0078557 A1 | 3/2014 | Hasegawa et al. |
| 2014/0082525 A1 | 3/2014 | Kass et al. |
| 2014/0095237 A1 | 4/2014 | Ehrler et al. |
| 2014/0101527 A1 | 4/2014 | Suciu |
| 2014/0108985 A1 | 4/2014 | Scott et al. |
| 2014/0109012 A1 | 4/2014 | Choudhary et al. |
| 2014/0111516 A1 | 4/2014 | Hall et al. |
| 2014/0115515 A1 | 4/2014 | Adams et al. |
| 2014/0115518 A1 | 4/2014 | Abdukalykov et al. |
| 2014/0129960 A1 | 5/2014 | Wang et al. |
| 2014/0136972 A1 | 5/2014 | Rodgers et al. |
| 2014/0137003 A1 | 5/2014 | Peters et al. |
| 2014/0137144 A1 | 5/2014 | Järvenpää et al. |
| 2014/0172475 A1 | 6/2014 | Olliphant et al. |
| 2014/0173401 A1 | 6/2014 | Oshlag et al. |
| 2014/0181155 A1 | 6/2014 | Homsany |
| 2014/0188748 A1 | 7/2014 | Cavoue et al. |
| 2014/0195933 A1 | 7/2014 | Rao DV |
| 2014/0214404 A1 | 7/2014 | Kalia et al. |
| 2014/0215303 A1 | 7/2014 | Grigorovitch et al. |
| 2014/0229816 A1 | 8/2014 | Yakub |
| 2014/0240735 A1 | 8/2014 | Salgado |
| 2014/0249877 A1 | 9/2014 | Hull et al. |
| 2014/0257568 A1 | 9/2014 | Czaja et al. |
| 2014/0278638 A1 | 9/2014 | Kreuzkamp et al. |
| 2014/0278720 A1 | 9/2014 | Taguchi |
| 2014/0280287 A1 | 9/2014 | Ganti |
| 2014/0280377 A1 | 9/2014 | Frew |
| 2014/0281868 A1 | 9/2014 | Vogel et al. |
| 2014/0281869 A1 | 9/2014 | Yob |
| 2014/0289223 A1 | 9/2014 | Colwell et al. |
| 2014/0304174 A1 | 10/2014 | Scott et al. |
| 2014/0306837 A1 | 10/2014 | Hauck, III |
| 2014/0310345 A1 | 10/2014 | Megiddo et al. |
| 2014/0324497 A1 | 10/2014 | Verma et al. |
| 2014/0324501 A1 | 10/2014 | Davidow et al. |
| 2014/0325552 A1 | 10/2014 | Evans et al. |
| 2014/0365938 A1 | 12/2014 | Black et al. |
| 2014/0372856 A1 | 12/2014 | Radakovitz et al. |
| 2014/0372932 A1 | 12/2014 | Rutherford et al. |
| 2015/0032686 A1 | 1/2015 | Kuchoor |
| 2015/0033131 A1 | 1/2015 | Peev et al. |
| 2015/0033149 A1 | 1/2015 | Kuchoor |
| 2015/0035918 A1 | 2/2015 | Matsumoto et al. |
| 2015/0039387 A1 | 2/2015 | Akahoshi et al. |
| 2015/0046209 A1 | 2/2015 | Choe |
| 2015/0067556 A1 | 3/2015 | Tibrewal et al. |
| 2015/0074721 A1 | 3/2015 | Fishman et al. |
| 2015/0074728 A1 | 3/2015 | Chai et al. |
| 2015/0088822 A1 | 3/2015 | Raja et al. |
| 2015/0095752 A1 | 4/2015 | Studer et al. |
| 2015/0106736 A1 | 4/2015 | Torman et al. |
| 2015/0125834 A1 | 5/2015 | Mendoza |
| 2015/0142676 A1 | 5/2015 | McGinnis et al. |
| 2015/0142829 A1 | 5/2015 | Lee et al. |
| 2015/0153943 A1 | 6/2015 | Wang |
| 2015/0154660 A1 | 6/2015 | Weald et al. |
| 2015/0169514 A1 | 6/2015 | Sah et al. |
| 2015/0169531 A1 | 6/2015 | Campbell et al. |
| 2015/0178657 A1 | 6/2015 | Kleehammer et al. |
| 2015/0188964 A1 | 7/2015 | Sharma et al. |
| 2015/0205830 A1 | 7/2015 | Bastide et al. |
| 2015/0212717 A1 | 7/2015 | Nair et al. |
| 2015/0213397 A1 | 7/2015 | Arena |
| 2015/0220491 A1 | 8/2015 | Cochrane et al. |
| 2015/0234887 A1 | 8/2015 | Greene et al. |
| 2015/0242091 A1 | 8/2015 | Lu et al. |
| 2015/0249864 A1 | 9/2015 | Tang et al. |
| 2015/0261796 A1 | 9/2015 | Gould et al. |
| 2015/0262121 A1 | 9/2015 | Riel-Dalpe et al. |
| 2015/0278699 A1 | 10/2015 | Danielsson |
| 2015/0281292 A1 | 10/2015 | Murayama |
| 2015/0293954 A1 | 10/2015 | Hsiao et al. |
| 2015/0295779 A1 | 10/2015 | Ching et al. |
| 2015/0295877 A1 | 10/2015 | Roman |
| 2015/0310126 A1 | 10/2015 | Steiner et al. |
| 2015/0317590 A1 | 11/2015 | Karlson |
| 2015/0324453 A1 | 11/2015 | Werner |
| 2015/0331846 A1 | 11/2015 | Guggilla et al. |
| 2015/0363478 A1 | 12/2015 | Haynes |
| 2015/0370540 A1 | 12/2015 | Coslovi et al. |
| 2015/0370776 A1 | 12/2015 | New |
| 2015/0370904 A1 | 12/2015 | Joshi et al. |
| 2015/0378542 A1 | 12/2015 | Saito et al. |

(56) References Cited

U.S. PATENT DOCUMENTS

| | | |
|---|---|---|
| 2015/0378711 A1 | 12/2015 | Cameron et al. |
| 2015/0378979 A1 | 12/2015 | Hirzel et al. |
| 2015/0379472 A1 | 12/2015 | Gilmour et al. |
| 2016/0012111 A1 | 1/2016 | Pattabhiraman et al. |
| 2016/0018962 A1 | 1/2016 | Low et al. |
| 2016/0026939 A1 | 1/2016 | Schiffer et al. |
| 2016/0027076 A1 | 1/2016 | Jackson et al. |
| 2016/0035546 A1 | 2/2016 | Platt et al. |
| 2016/0055134 A1 | 2/2016 | Sathish et al. |
| 2016/0055374 A1 | 2/2016 | Zhang et al. |
| 2016/0063435 A1 | 3/2016 | Shah et al. |
| 2016/0068960 A1 | 3/2016 | Jung et al. |
| 2016/0078368 A1 | 3/2016 | Kakhandiki et al. |
| 2016/0088480 A1 | 3/2016 | Chen et al. |
| 2016/0092557 A1 | 3/2016 | Stojanovic et al. |
| 2016/0098574 A1 | 4/2016 | Bargagni |
| 2016/0117308 A1 | 4/2016 | Haider et al. |
| 2016/0170586 A1 | 6/2016 | Gallo |
| 2016/0173122 A1 | 6/2016 | Akitomi et al. |
| 2016/0196310 A1 | 7/2016 | Dutta |
| 2016/0210572 A1 | 7/2016 | Shaaban et al. |
| 2016/0224532 A1 | 8/2016 | Miller et al. |
| 2016/0224676 A1 | 8/2016 | Miller et al. |
| 2016/0224939 A1 | 8/2016 | Chen et al. |
| 2016/0231915 A1 | 8/2016 | Nhan et al. |
| 2016/0232489 A1 | 8/2016 | Skaaksrud |
| 2016/0246490 A1 | 8/2016 | Cabral |
| 2016/0253982 A1 | 9/2016 | Cheung et al. |
| 2016/0259856 A1 | 9/2016 | Ananthapur et al. |
| 2016/0275150 A1 | 9/2016 | Bournonnais et al. |
| 2016/0292206 A1 | 10/2016 | Ruiz Velazquez et al. |
| 2016/0299655 A1 | 10/2016 | Migos et al. |
| 2016/0308963 A1 | 10/2016 | Kung |
| 2016/0321235 A1 | 11/2016 | He et al. |
| 2016/0321604 A1 | 11/2016 | Imaeda et al. |
| 2016/0335302 A1 | 11/2016 | Teodorescu |
| 2016/0335303 A1 | 11/2016 | Madhalam et al. |
| 2016/0335604 A1 | 11/2016 | Reminick et al. |
| 2016/0335731 A1 | 11/2016 | Hall |
| 2016/0335903 A1 | 11/2016 | Mendoza |
| 2016/0344828 A1 | 11/2016 | Häusler et al. |
| 2016/0350950 A1 | 12/2016 | Ritchie et al. |
| 2016/0381099 A1 | 12/2016 | Keslin et al. |
| 2017/0017779 A1 | 1/2017 | Huang et al. |
| 2017/0031967 A1 | 2/2017 | Chavan et al. |
| 2017/0041296 A1 | 2/2017 | Ford et al. |
| 2017/0052937 A1 | 2/2017 | Sirven et al. |
| 2017/0061342 A1 | 3/2017 | LoRe et al. |
| 2017/0061360 A1 | 3/2017 | Rucker et al. |
| 2017/0061820 A1 | 3/2017 | Firoozbakhsh |
| 2017/0063722 A1 | 3/2017 | Cropper et al. |
| 2017/0075557 A1 | 3/2017 | Noble et al. |
| 2017/0076101 A1 | 3/2017 | Kochhar et al. |
| 2017/0090734 A1 | 3/2017 | Fitzpatrick |
| 2017/0090736 A1 | 3/2017 | King et al. |
| 2017/0091337 A1 | 3/2017 | Patterson |
| 2017/0093876 A1 | 3/2017 | Feng et al. |
| 2017/0109499 A1 | 4/2017 | Doshi et al. |
| 2017/0111327 A1 | 4/2017 | Wu |
| 2017/0116552 A1 | 4/2017 | Deodhar et al. |
| 2017/0124042 A1 | 5/2017 | Campbell et al. |
| 2017/0124048 A1 | 5/2017 | Campbell et al. |
| 2017/0124055 A1 | 5/2017 | Radakovitz et al. |
| 2017/0124740 A1 | 5/2017 | Campbell et al. |
| 2017/0126772 A1 | 5/2017 | Campbell et al. |
| 2017/0132296 A1 | 5/2017 | Ding |
| 2017/0132652 A1 | 5/2017 | Kedzlie et al. |
| 2017/0139874 A1 | 5/2017 | Chin |
| 2017/0139884 A1 | 5/2017 | Bendig et al. |
| 2017/0139891 A1 | 5/2017 | Ah-Soon et al. |
| 2017/0139992 A1 | 5/2017 | Morin |
| 2017/0140047 A1 | 5/2017 | Bendig et al. |
| 2017/0140219 A1 | 5/2017 | King et al. |
| 2017/0153771 A1 | 6/2017 | Chu |
| 2017/0161246 A1 | 6/2017 | Klima |
| 2017/0177556 A1 | 6/2017 | Fay et al. |
| 2017/0177888 A1 | 6/2017 | Arora et al. |
| 2017/0185575 A1 | 6/2017 | Sood et al. |
| 2017/0185592 A1 | 6/2017 | Frei et al. |
| 2017/0185668 A1 | 6/2017 | Convertino et al. |
| 2017/0200122 A1 | 7/2017 | Edson et al. |
| 2017/0201428 A1 | 7/2017 | Normandin |
| 2017/0206366 A1 | 7/2017 | Fay et al. |
| 2017/0212924 A1 | 7/2017 | Semlani et al. |
| 2017/0220813 A1 | 8/2017 | Mullins et al. |
| 2017/0221072 A1 | 8/2017 | AthuluruTlrumala et al. |
| 2017/0228421 A1 | 8/2017 | Sharma et al. |
| 2017/0228445 A1 | 8/2017 | Chiu et al. |
| 2017/0228460 A1 | 8/2017 | Amel |
| 2017/0229152 A1 | 8/2017 | Loganathan et al. |
| 2017/0236081 A1 | 8/2017 | Grady Smith et al. |
| 2017/0242921 A1 | 8/2017 | Rota |
| 2017/0257517 A1 | 9/2017 | Panda |
| 2017/0262786 A1 | 9/2017 | Khasis |
| 2017/0270970 A1 | 9/2017 | Ho et al. |
| 2017/0272316 A1 | 9/2017 | Johnson et al. |
| 2017/0272331 A1 | 9/2017 | Lissack |
| 2017/0277620 A1 | 9/2017 | Kadioglu |
| 2017/0277669 A1 | 9/2017 | Sekharan |
| 2017/0285879 A1 | 10/2017 | Pilkington et al. |
| 2017/0285890 A1 | 10/2017 | Dolman |
| 2017/0289619 A1 | 10/2017 | Xu et al. |
| 2017/0300545 A1 | 10/2017 | Lee et al. |
| 2017/0301039 A1 | 10/2017 | Dyer et al. |
| 2017/0315683 A1 | 11/2017 | Boucher et al. |
| 2017/0315974 A1 | 11/2017 | Kong et al. |
| 2017/0315979 A1 | 11/2017 | Boucher et al. |
| 2017/0322963 A1 | 11/2017 | Ramamurthi et al. |
| 2017/0324692 A1 | 11/2017 | Zhou |
| 2017/0329479 A1 | 11/2017 | Rauschenbach et al. |
| 2017/0351252 A1 | 12/2017 | Kleifges et al. |
| 2017/0372442 A1 | 12/2017 | Mejias |
| 2017/0374205 A1 | 12/2017 | Panda |
| 2018/0011827 A1 | 1/2018 | Avery et al. |
| 2018/0025084 A1 | 1/2018 | Conlan et al. |
| 2018/0026954 A1 | 1/2018 | Toepke et al. |
| 2018/0032492 A1 | 2/2018 | Altshuller et al. |
| 2018/0032570 A1 | 2/2018 | Miller et al. |
| 2018/0039651 A1 | 2/2018 | Tobin et al. |
| 2018/0055434 A1 | 3/2018 | Cheung et al. |
| 2018/0075104 A1 | 3/2018 | Oberbreckling et al. |
| 2018/0075115 A1 | 3/2018 | Murray et al. |
| 2018/0075413 A1 | 3/2018 | Culver et al. |
| 2018/0075560 A1 | 3/2018 | Thukral et al. |
| 2018/0081505 A1 | 3/2018 | Ron et al. |
| 2018/0081863 A1 | 3/2018 | Bathla |
| 2018/0081868 A1 | 3/2018 | Willcock et al. |
| 2018/0088753 A1 | 3/2018 | Viégas et al. |
| 2018/0088989 A1 | 3/2018 | Nield et al. |
| 2018/0089299 A1 | 3/2018 | Collins et al. |
| 2018/0095938 A1 | 4/2018 | Monte |
| 2018/0096417 A1 | 4/2018 | Cook et al. |
| 2018/0109760 A1 | 4/2018 | Metter et al. |
| 2018/0121028 A1 | 5/2018 | Kuscher et al. |
| 2018/0121994 A1 | 5/2018 | Matsunaga et al. |
| 2018/0128636 A1 | 5/2018 | Zhou |
| 2018/0129651 A1 | 5/2018 | Latvala et al. |
| 2018/0157455 A1 | 6/2018 | Troy et al. |
| 2018/0157467 A1 | 6/2018 | Stachura |
| 2018/0157468 A1 | 6/2018 | Stachura |
| 2018/0157633 A1 | 6/2018 | He et al. |
| 2018/0173715 A1 | 6/2018 | Dunne |
| 2018/0181650 A1 | 6/2018 | Komatsuda et al. |
| 2018/0181716 A1 | 6/2018 | Mander et al. |
| 2018/0189734 A1 | 7/2018 | Newhouse et al. |
| 2018/0210936 A1 | 7/2018 | Reynolds et al. |
| 2018/0225270 A1 | 8/2018 | Bhide et al. |
| 2018/0260371 A1 | 9/2018 | Theodore et al. |
| 2018/0260435 A1 | 9/2018 | Xu |
| 2018/0262705 A1 | 9/2018 | Park et al. |
| 2018/0276417 A1 | 9/2018 | Cerezo |
| 2018/0285149 A1 | 10/2018 | Bhandari et al. |
| 2018/0285918 A1 | 10/2018 | Staggs |
| 2018/0293217 A1 | 10/2018 | Callaghan |

(56) References Cited

U.S. PATENT DOCUMENTS

| | | |
|---|---|---|
| 2018/0293587 A1 | 10/2018 | Oda |
| 2018/0293669 A1 | 10/2018 | Jackson et al. |
| 2018/0329930 A1 | 11/2018 | Eberlein et al. |
| 2018/0330320 A1 | 11/2018 | Kohli |
| 2018/0357305 A1 | 12/2018 | Kinast et al. |
| 2018/0365429 A1 | 12/2018 | Segal |
| 2018/0367484 A1 | 12/2018 | Rodriguez et al. |
| 2018/0373434 A1 | 12/2018 | Switzer et al. |
| 2018/0373757 A1 | 12/2018 | Schukovets et al. |
| 2019/0005094 A1 | 1/2019 | Yi |
| 2019/0011310 A1 | 1/2019 | Turnbull et al. |
| 2019/0012306 A1 | 1/2019 | Dvorak |
| 2019/0012342 A1 | 1/2019 | Cohn |
| 2019/0034395 A1 | 1/2019 | Curry et al. |
| 2019/0036989 A1 | 1/2019 | Eirinberg et al. |
| 2019/0042628 A1 | 2/2019 | Rajpara |
| 2019/0050445 A1 | 2/2019 | Griffith et al. |
| 2019/0050466 A1 | 2/2019 | Kim et al. |
| 2019/0050812 A1 | 2/2019 | Boileau |
| 2019/0056856 A1 | 2/2019 | Simmons et al. |
| 2019/0065545 A1 | 2/2019 | Hazel et al. |
| 2019/0068703 A1 | 2/2019 | Vora et al. |
| 2019/0073350 A1 | 3/2019 | Shiotani |
| 2019/0095413 A1 | 3/2019 | Davis et al. |
| 2019/0097909 A1 | 3/2019 | Puri et al. |
| 2019/0102425 A1 | 4/2019 | Obeidat |
| 2019/0108046 A1 | 4/2019 | Spencer-Harper et al. |
| 2019/0113935 A1 | 4/2019 | Kuo et al. |
| 2019/0114308 A1 | 4/2019 | Hancock |
| 2019/0114589 A1 | 4/2019 | Voss et al. |
| 2019/0123924 A1 | 4/2019 | Embiricos et al. |
| 2019/0130611 A1 | 5/2019 | Black et al. |
| 2019/0138583 A1 | 5/2019 | Silk et al. |
| 2019/0138588 A1 | 5/2019 | Silk et al. |
| 2019/0138653 A1 | 5/2019 | Roller et al. |
| 2019/0147030 A1 | 5/2019 | Stein et al. |
| 2019/0155821 A1 | 5/2019 | Dirisala |
| 2019/0179501 A1 | 6/2019 | Seeley et al. |
| 2019/0199823 A1 | 6/2019 | Underwood et al. |
| 2019/0208058 A1 | 7/2019 | Dvorkin et al. |
| 2019/0213557 A1 | 7/2019 | Dotan-Cohen et al. |
| 2019/0220161 A1 | 7/2019 | Loftus et al. |
| 2019/0236188 A1 | 8/2019 | McKenna |
| 2019/0243879 A1 | 8/2019 | Harley et al. |
| 2019/0251884 A1 | 8/2019 | Burns et al. |
| 2019/0258461 A1 | 8/2019 | Li et al. |
| 2019/0258706 A1 | 8/2019 | Li et al. |
| 2019/0286839 A1 | 9/2019 | Mutha et al. |
| 2019/0306009 A1 | 10/2019 | Makovsky et al. |
| 2019/0324840 A1 | 10/2019 | Malamut et al. |
| 2019/0325012 A1 | 10/2019 | Delaney et al. |
| 2019/0327294 A1 | 10/2019 | Subramani Nadar et al. |
| 2019/0340550 A1 | 11/2019 | Denger et al. |
| 2019/0347077 A1 | 11/2019 | Huebra |
| 2019/0361879 A1 | 11/2019 | Rogynskyy et al. |
| 2019/0361971 A1 | 11/2019 | Zenger et al. |
| 2019/0364009 A1 | 11/2019 | Joseph et al. |
| 2019/0371442 A1 | 12/2019 | Schoenberg |
| 2019/0377791 A1 | 12/2019 | Mahmoud et al. |
| 2019/0391707 A1 | 12/2019 | Ristow et al. |
| 2020/0005248 A1 | 1/2020 | Gerzi et al. |
| 2020/0005295 A1 | 1/2020 | Murphy |
| 2020/0012629 A1 | 1/2020 | Lereya et al. |
| 2020/0019548 A1 | 1/2020 | Agnew et al. |
| 2020/0019595 A1 | 1/2020 | Azua |
| 2020/0026352 A1 | 1/2020 | Wang et al. |
| 2020/0026397 A1 | 1/2020 | Wohlstadter et al. |
| 2020/0042648 A1 | 2/2020 | Rao |
| 2020/0050696 A1 | 2/2020 | Mowatt et al. |
| 2020/0053176 A1 | 2/2020 | Jimenez et al. |
| 2020/0125574 A1 | 4/2020 | Ghoshal et al. |
| 2020/0134002 A1 | 4/2020 | Tung et al. |
| 2020/0142546 A1 | 5/2020 | Breedvelt-Schouten et al. |
| 2020/0151630 A1 | 5/2020 | Shakhnovich |
| 2020/0159558 A1 | 5/2020 | Bak et al. |
| 2020/0175094 A1 | 6/2020 | Palmer |
| 2020/0176089 A1 | 6/2020 | Jones et al. |
| 2020/0192785 A1 | 6/2020 | Chen |
| 2020/0193388 A1 | 6/2020 | Tran-Kiem et al. |
| 2020/0247661 A1 | 8/2020 | Rao et al. |
| 2020/0265112 A1 | 8/2020 | Fox et al. |
| 2020/0279315 A1 | 9/2020 | Manggala |
| 2020/0293616 A1 | 9/2020 | Nelson et al. |
| 2020/0301678 A1 | 9/2020 | Burman et al. |
| 2020/0301902 A1 | 9/2020 | Maloy et al. |
| 2020/0310835 A1 | 10/2020 | Momchilov |
| 2020/0326824 A1 | 10/2020 | Alonso et al. |
| 2020/0327244 A1 | 10/2020 | Blass et al. |
| 2020/0334019 A1 | 10/2020 | Bosworth et al. |
| 2020/0348809 A1 | 11/2020 | Drescher |
| 2020/0349320 A1 | 11/2020 | Owens |
| 2020/0356740 A1 | 11/2020 | Principato |
| 2020/0356873 A1 | 11/2020 | Nawrocke et al. |
| 2020/0374146 A1 | 11/2020 | Chhabra et al. |
| 2020/0380212 A1 | 12/2020 | Butler et al. |
| 2020/0380449 A1 | 12/2020 | Choi |
| 2020/0387664 A1 | 12/2020 | Kusumura et al. |
| 2020/0401581 A1 | 12/2020 | Eubank et al. |
| 2020/0401583 A1 | 12/2020 | Church et al. |
| 2020/0409949 A1 | 12/2020 | Saxena et al. |
| 2020/0410395 A1 | 12/2020 | Ray et al. |
| 2021/0014136 A1 | 1/2021 | Rath |
| 2021/0019287 A1 | 1/2021 | Prasad et al. |
| 2021/0019374 A1 | 1/2021 | Donaldson et al. |
| 2021/0021603 A1 | 1/2021 | Gibbons |
| 2021/0034058 A1 | 2/2021 | Subramanian et al. |
| 2021/0035069 A1 | 2/2021 | Parikh |
| 2021/0042796 A1 | 2/2021 | Khoury et al. |
| 2021/0049524 A1 | 2/2021 | Nachum et al. |
| 2021/0049555 A1 | 2/2021 | Shor |
| 2021/0055955 A1 | 2/2021 | Yankelevich et al. |
| 2021/0056509 A1 | 2/2021 | Lindy |
| 2021/0065203 A1 | 3/2021 | Billigmeier et al. |
| 2021/0072883 A1 | 3/2021 | Migunova et al. |
| 2021/0073526 A1 | 3/2021 | Zeng et al. |
| 2021/0084120 A1 | 3/2021 | Fisher et al. |
| 2021/0124749 A1 | 4/2021 | Suzuki et al. |
| 2021/0124872 A1 | 4/2021 | Lereya |
| 2021/0136027 A1 | 5/2021 | Barbitta et al. |
| 2021/0149553 A1 | 5/2021 | Lereya et al. |
| 2021/0149688 A1 | 5/2021 | Newell et al. |
| 2021/0149925 A1 | 5/2021 | Mann et al. |
| 2021/0150489 A1 | 5/2021 | Haramati et al. |
| 2021/0165782 A1 | 6/2021 | Deshpande et al. |
| 2021/0166196 A1 | 6/2021 | Lereya et al. |
| 2021/0166339 A1 | 6/2021 | Mann et al. |
| 2021/0173682 A1 | 6/2021 | Chakraborti et al. |
| 2021/0174006 A1 | 6/2021 | Stokes |
| 2021/0192126 A1 | 6/2021 | Gehrmann et al. |
| 2021/0248311 A1 | 8/2021 | Helft et al. |
| 2021/0257065 A1 | 8/2021 | Mander et al. |
| 2021/0264220 A1 | 8/2021 | Wei et al. |
| 2021/0273957 A1 | 9/2021 | Boyer et al. |
| 2021/0326519 A1 | 10/2021 | Lin et al. |
| 2021/0328888 A1 | 10/2021 | Rath |
| 2021/0342785 A1 | 11/2021 | Mann et al. |
| 2021/0365446 A1 | 11/2021 | Srivastava et al. |
| 2021/0374197 A1 | 12/2021 | Chauhan |
| 2021/0397585 A1 | 12/2021 | Seward |
| 2022/0099454 A1 | 3/2022 | Decrop et al. |
| 2022/0121325 A1 | 4/2022 | Roberts et al. |
| 2022/0121478 A1 | 4/2022 | Chivukula et al. |
| 2022/0221591 A1 | 7/2022 | Smith et al. |
| 2022/0222427 A1 | 7/2022 | Mann et al. |
| 2022/0291666 A1 | 9/2022 | Cella et al. |
| 2022/0292180 A1 | 9/2022 | Chauhan |
| 2023/0153651 A1 | 5/2023 | Bi et al. |
| 2023/0316382 A1 | 10/2023 | Faricy et al. |
| 2023/0419161 A1 | 12/2023 | Dines |

(56) References Cited

U.S. PATENT DOCUMENTS

| 2024/0046142 A1 | 2/2024 | Marks et al. |
| 2024/0053727 A1 | 2/2024 | Timisescu et al. |

FOREIGN PATENT DOCUMENTS

| CN | 107123424 A | 9/2017 |
| CN | 107422666 A | 12/2017 |
| CN | 107623596 A | 1/2018 |
| CN | 107885656 A | 4/2018 |
| CN | 108717428 A | 10/2018 |
| CN | 112929172 A | 6/2021 |
| EP | 3 443 466 B1 | 12/2021 |
| KR | 20150100760 | 9/2015 |
| KR | 20220016276 A | 2/2022 |
| WO | WO 2004/100015 A2 | 11/2004 |
| WO | WO 2006/116580 A2 | 11/2006 |
| WO | WO 2008109541 A1 | 9/2008 |
| WO | WO 2014088393 A1 | 6/2014 |
| WO | WO 2017/202159 A1 | 11/2017 |
| WO | WO 2018023798 A1 | 2/2018 |
| WO | 2018042424 A1 | 3/2018 |
| WO | 2020139865 A1 | 7/2020 |
| WO | WO 2020/187408 A1 | 9/2020 |
| WO | WO 2021096944 A1 | 5/2021 |
| WO | WO 2021144656 A1 | 7/2021 |
| WO | WO 2021161104 A1 | 8/2021 |
| WO | WO 2021220058 A1 | 11/2021 |
| WO | WO 2022153122 A1 | 7/2022 |

OTHER PUBLICATIONS

U.S. Appl. No. 17/565,534, filed Dec. 30, 2021.
Alessio et al., Monday.com Walkthrough 2018\All Features, Platforms & Thoughts, Mar. 1, 2018, pp. 1-55, 2018.
Rodrigo et al., Project Management with Monday.com: a 101 Introduction; Jul. 22, 2019, pp. 1-21, 2019.
International Search Report and Written Opinion of the International Searching Authority in PCT/IB2020/000658, mailed Nov. 11, 2020 (12 pages).
International Search Report in PCT/IB2020/000974, mailed May 3, 2021 (19 pages).
International Search Report in PCT/1B2021/000090 dated Jul. 27, 2021.
ShowMyPC, "Switch Presenter While Using ShowMyPC"; web archive.org; Aug. 20, 2016.
International Search Report and Written Opinion of the International Search Authority in PCT/1B2020/000024, mailed May 3, 2021 (13 pages).
"Pivot table—Wikipedia"; URL: https://en.wikipedia .org/w/index. php?title=Pivot_table&oldid=857163289, originally retrieve on Oct. 23, 2019; retrieved on Jul. 16, 2021.
Vishal Singh, "A Theoretical Framework of a BIM-based Multi-Disciplinary Collaboration Platform", Nov. 5, 2020, Automation in Construction, 20 (2011), pp. 134-144 (Year: 2011).
Edward A. Stohr, Workflow Automation: Overview and Research Issues, 2001, Information Systems Frontiers 3:3, pp. 281-296 (Year: 2001).
International Search Report and Written Opinion of the International Search Authority in PCT/1B2021/000297, mailed Oct. 12, 2021 (20 pages).
Dapulse.com "features".extracted from web.archive.or/web/ 2014091818421/https://dapulse.com/features; Sep. 2014 (Year: 2014).
Stephen Larson et al., Introducing Data Mining Concepts Using Microsoft Excel's Table Analysis Tools, Oct. 2015, [Retrieved on Nov. 19, 2021], Retrieved from the internet: <URL: https://dl.acm. org/doi/pdf/10.5555/2831373.2831394> 3 Pages (127-129) (Year: 2015).
Isaiah Pinchas et al., Lexical Analysis Tool, May 2004, [Retrieved on Nov. 19, 2021], Retrieved from the internet: <URL: https:// dl.acm.org/doi/pdf/10.1145/997140.997147> 9 Pages (66-74) (Year: 2004).

Sajjad Bahrebar et al., "A Novel Type-2 Fuzzy Logic for Improved Risk Analysis of Proton Exchange Membrane Fuel Cells in Marine Power Systems Application", Energies, 11, 721, pp. 1-16, Mar. 22, 2018.
Pedersen et al., "Tivoli: an electronic whiteboard for informal workgroup meetings", Conference on Human Factors in Computing Systems: Proceedings of the Interact '93 and CHI '93 conference on Human factors in computing systems; Apr. 24-29, 1993:391-398. (Year 1993).
Kollmann, Franz, "Realizing Fine-Granular Read and Write Rights on Tree Structured Documents." in The Second International Conference on Availability, Reliability and Security (ARES'07), pp. 517-523. IEEE, 2007. (Year: 2007).
Baarslag, "Negotiation as an Interaction Mechanism for Deciding App Permissions." In Proceedings of the 2016 CHI Conference Extended Abstracts on Human Factors in Computing Systems, pp. 2012-2019. 2016 (Year: 2016).
Peltier, "Clustered and Stacked Column and Bar Charts", Aug. 2011, Peltier Technical Services, Inc., pp. 1-128; (Year: 2011).
Beate List, "An Evaluation of Conceptual Business Process Modelling Languages", 2006, SAC'06, Apr. 23-27, pp. 1532-1539 (Year: 2006).
"Demonstracion en espanol de Monday.com", published Feb. 20, 2019. https://www.youtube.com/watch?v=z0qydTgoflA (Year: 2019).
Desmedt, Yvo, and Arash Shaghaghi, "Function-Based Access Control (FBAC) From Access Control Matrix to Access Control Tensor." In Proceedings of the 8th ACM CCS International Workshop on Managing Insider Security Threats, pp. 89-92. (2016).
Anupam, V., et al., "Personalizing the Web Using Site Descriptions", Proceedings of the Tenth International Workshop on Database and Expert Systems Applications, ISBN: 0-7695-0281-4, DOI: 10.1109/DEXA.1999.795275, Jan. 1, 1999, pp. 732-738. (Year: 1999).
Gutwin, C. et al., "Supporting Informal Collaboration in Shared-Workspace Groupware", J. Univers. Comput. Sci., 14(9), 1411-1434 (2008).
Barai, S., et al., "Image Annotation System Using Visual and Textual Features", In: Proceedings of the 16th International Conference on Distributed Multi-media Systems, pp. 289-296 (2010).
U.S. Appl. No. 17/143,897, filed Jan. 7, 2021.
U.S. Appl. No. 17/143,603, filed Jan. 7, 2021.
U.S. Appl. No. 17/143,745, filed Jan. 7, 2021.
U.S. Appl. No. 17/143,482, filed Jan. 7, 2021.
U.S. Appl. No. 17/143,768, filed Jan. 7, 2021.
U.S. Appl. No. 17/143,677, filed Jan. 7, 2021.
U.S. Appl. No. 17/143,653, filed Jan. 7, 2021.
U.S. Appl. No. 17/143,916, filed Jan. 7, 2021.
U.S. Appl. No. 17/143,475, filed Jan. 7, 2021.
U.S. Appl. No. 17/143,865, filed Jan. 7, 2021.
U.S. Appl. No. 17/143,462, filed Jan. 7, 2021.
U.S. Appl. No. 17/143,470, filed Jan. 7, 2021.
U.S. Appl. No. 17/143,905, filed Jan. 7, 2021.
U.S. Appl. No. 17/143,798, filed Jan. 7, 2021.
U.S. Appl. No. 17/143,892, filed Jan. 7, 2021.
U.S. Appl. No. 17/243,716, filed Apr. 29, 2021.
U.S. Appl. No. 17/243,727, filed Apr. 29, 2021.
U.S. Appl. No. 17/232,978, filed Apr. 16, 2021.
U.S. Appl. No. 17/243,809, filed Apr. 29, 2021.
U.S. Appl. No. 17/243,901, filed Apr. 29, 2021.
U.S. Appl. No. 17/232,354, filed Apr. 16, 2021.
U.S. Appl. No. 17/243,898, filed Apr. 29, 2021.
U.S. Appl. No. 17/243,969, filed Apr. 29, 2021.
U.S. Appl. No. 17/243,742, filed Apr. 29, 2021.
U.S. Appl. No. 17/243,752, filed Apr. 29, 2021.
U.S. Appl. No. 17/232,754, filed Apr. 16, 2021.
U.S. Appl. No. 17/232,827, filed Apr. 16, 2021.
U.S. Appl. No. 17/243,763, filed Apr. 29, 2021.
U.S. Appl. No. 17/243,848, filed Apr. 29, 2021.
U.S. Appl. No. 17/243,934, filed Apr. 29, 2021.
U.S. Appl. No. 17/244,121, filed Apr. 29, 2021.
U.S. Appl. No. 17/243,807, filed Apr. 29, 2021.
U.S. Appl. No. 17/244,027, filed Apr. 29, 2021.
U.S. Appl. No. 17/244,157, filed Apr. 29, 2021.

(56)                References Cited

OTHER PUBLICATIONS

U.S. Appl. No. 17/243,725, filed Apr. 29, 2021.
U.S. Appl. No. 17/243,737, filed Apr. 29, 2021.
U.S. Appl. No. 17/243,748, filed Apr. 29, 2021.
U.S. Appl. No. 16/453,065, filed Jun. 26, 2019.
U.S. Appl. No. 17/243,691, filed Apr. 29, 2021.
U.S. Appl. No. 17/243,722, filed Apr. 29, 2021.
U.S. Appl. No. 17/243,892, filed Apr. 29, 2021.
U.S. Appl. No. 17/243,977, filed Apr. 29, 2021.
U.S. Appl. No. 17/243,764, filed Apr. 29, 2021.
U.S. Appl. No. 17/243,837, filed Apr. 29, 2021.
U.S. Appl. No. 17/243,729, filed Apr. 29, 2021.
U.S. Appl. No. 17/243,802, filed Apr. 29, 2021.
U.S. Appl. No. 17/242,452, filed Apr. 28, 2021.
U.S. Appl. No. 17/243,891, filed Apr. 29, 2021.
U.S. Appl. No. 17/243,775, filed Apr. 29, 2021.
U.S. Appl. No. 17/243,731, filed Apr. 29, 2021.
U.S. Appl. No. 17/243,768, filed Apr. 29, 2021.
U.S. Appl. No. 16/502,679, filed Jul. 3, 2019.
U.S. Appl. No. 17/565,652, filed Dec. 30, 2021.
U.S. Appl. No. 17/565,699, filed Dec. 30, 2021.
U.S. Appl. No. 17/565,853, filed Dec. 30, 2021.
U.S. Appl. No. 17/565,880, filed Dec. 30, 2021.
U.S. Appl. No. 17/564,745, filed Dec. 29, 2021.
U.S. Appl. No. 17/565,526, filed Dec. 30, 2021.
U.S. Appl. No. 17/565,614, filed Dec. 30, 2021.
U.S. Appl. No. 17/565,718, filed Dec. 30, 2021.
U.S. Appl. No. 17/565,801, filed Dec. 30, 2021.
U.S. Appl. No. 17/565,821, filed Dec. 30, 2021.
U.S. Appl. No. 17/565,780, filed Dec. 30, 2021.
B. Ionescu, C. Gadea, B. Solomon, M. Trifan, D. Ionescu and V. Stoicu-Tivadar, "Achat-centric collaborative environment for web-based real-time collaboration," 2015 IEEE 10th Jubilee International Symposium on Applied Computational Intelligence and Informatics, Timisoara, Romania, 2015, pp. 105-110 (Year: 2015).
Donath, "Interfaces Make Meaning" chapter from The Social Machine: Designs for Living Online, pp. 41-76, copyright 2014. ( Year: 2014).
Stancu, Florin-Alexandru, Mihai Chiroiu, and Razvan Rughinis. "SecCollab-Improving Confindentiality for Existing Cloud-Based Collaborative Editors." In 2017 21st International Conferences on Control Systems and Computer Scient (CSCS), pp. 324-331. IEEE,2017. (Year: 2017).
Susanne Hupfer, Li-Te Cheng, Steven Ross, and John Patterson. 2004. Introducing collaboration into an application development environment. In Proceedings of the 2004 ACM conference on Computer supported cooperative work (CSCW '04). Association for Computing Machinery, New York, NY USA, 21-24 (Year: 2004).
Using Filters in Overview, published Mar. 7, 2017. https://www.youtube.com/watch?v=hycANhz7gww (Year: 2017).
Abor Jr. C., "Low-Code and No-Code AI: New AI Development—What is code anymore?!?!" (as retrieved from https://www.linkedin.com/pulse/low-code-no-code-ai-new-development-what-code-anymore-c-l-abor-jr); Jul. 15, 2023 (Year: 2023).
Aylward, Grant, "Drag-and-Drop AI Enables Digital Workforce Deployment at Scale Share" (as retrieved from https://www.blueprism.com/resources/ blog/drag-and-drop-ai-enables-digital-workforce-deployment-at-scale/); March 19 202 (Year: 2020).
Chen et al., "Artificial Intelligence in Education: A Review," IEEEAccess vol. 8, pp. 75264-75278 (Year: 2020).
Dapulse.com, "High Level Overview", Extracted from https://web.archive.org/web/20161104170936/https://dapulse.com (Year: 2016).
Dorn et al., "Efficient Full-Field Vibration Measurements and Operational Modal Analysis Using Neuromorphic Event-Based Imaging," Journal of Engineering Mechanics, vol. 144, No. 7, Jul. 1, 2018 (Year: 2018).
Freund, K., "SiMa.ai Creates Drag-And-Drop Platform For Building AI Workflows" (as retrieved from https://www.forbes.com/sites/karlfreund/2023/09/12/simaal-creates-drag-and-drop-platform-for-building-ai-workflows/?sh=789de8466046); Sep. 12, 2023 (Year: 2023).
Monday.com et al., "Basic Walkthrough", https://www.youtube.com/watch?v=VpbgWyPf74g; Aug. 9, 2019. (Year: 2019).
Sreenath et al., "Agent-based service selection," Journal of Web Semantics 1.3, pp. 261-279 (Year: 2004).
Wilson et al., "Beyond Social Graphs: User Interactions in Online Social Networks and their Implications," ACM Transactions on the Web, vol. 6, No. 4, Article 17, Nov. 2012 (Year: 2012).
Zhang et al., "Integrating semantic NLP and logic reasoning into a unified system for fully-automated code checking," Automation in Construction, vol. 73, 2017, pp. 45-57, ISSN 0926-5805, https://doi.org/10.1016/j.autcon.2016.08.027.
Zhenjiang et al., "Asynchronous Event-Based Visual Shape Tracking for Stable Haptic Feedback in Microrobotics," IEEE Transactions on Robotics, IEEE Service Center, Piscataway, NJ, vol. 28, No. 5, Oct. 1, 2012, pp. 1081-1089 (Year: 2012).
Ziheng, G., "Advanced Cyberinfrastructure for Managing Hybrid Geoscientific AI Workflows" (Year: 2019).
International Search Report and Written Opinion in PCT/IB2023/061992, mailed Mar. 19, 2024, 7 pages.
Yamada et al., "A Software Tag Generation System to Realize Software Traceability," 2010 Asia Pacific Software Engineering Conference, pp. 423-432.

* cited by examiner

800

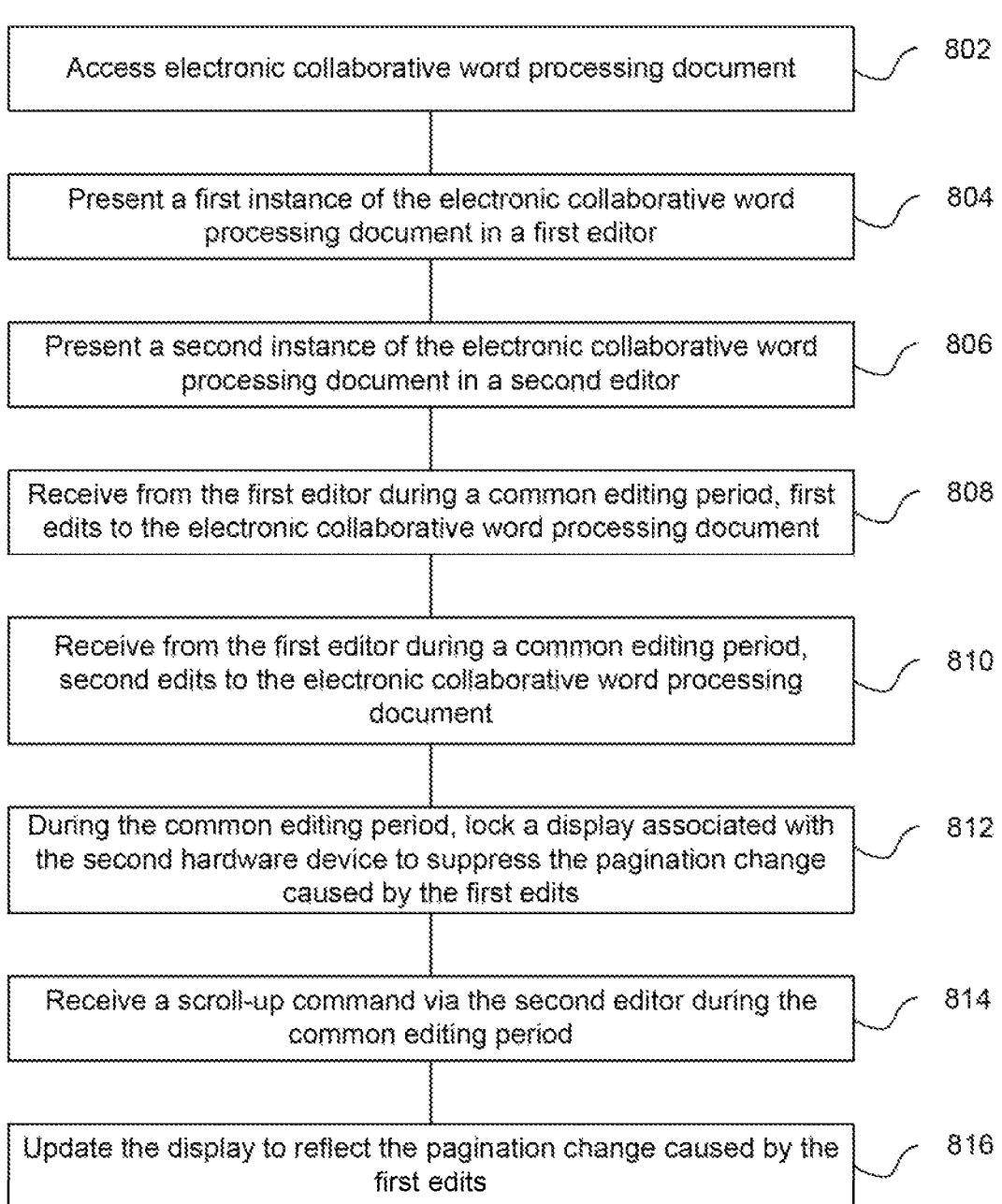

802 — Access electronic collaborative word processing document

804 — Present a first instance of the electronic collaborative word processing document in a first editor 806 — Present a second instance of the electronic collaborative word processing document in a second editor 808 — Receive from the first editor during a common editing period, first edits to the electronic collaborative word processing document 810 — Receive from the first editor during a common editing period, second edits to the electronic collaborative word processing document 812 — During the common editing period, lock a display associated with the second hardware device to suppress the pagination change caused by the first edits 814 — Receive a scroll-up command via the second editor during the common editing period 816 — Update the display to reflect the pagination change caused by the first edits

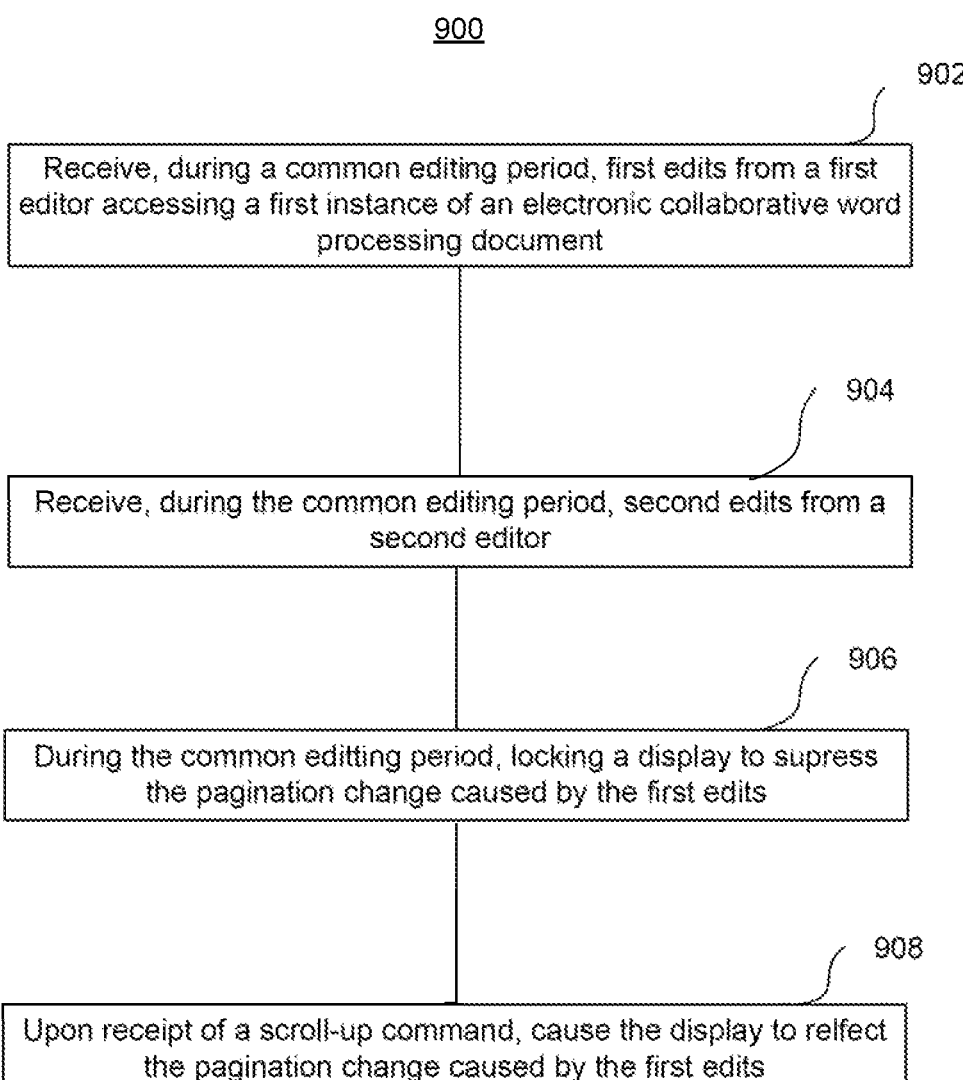

902

Receive, during a common editing period, first edits from a first editor accessing a first instance of an electronic collaborative word processing document

904

Receive, during the common editing period, second edits from a second editor

906

During the common editing period, locking a display to supress the pagination change caused by the first edits

908

Upon receipt of a scroll-up command, cause the display to relfect the pagination change caused by the first edits

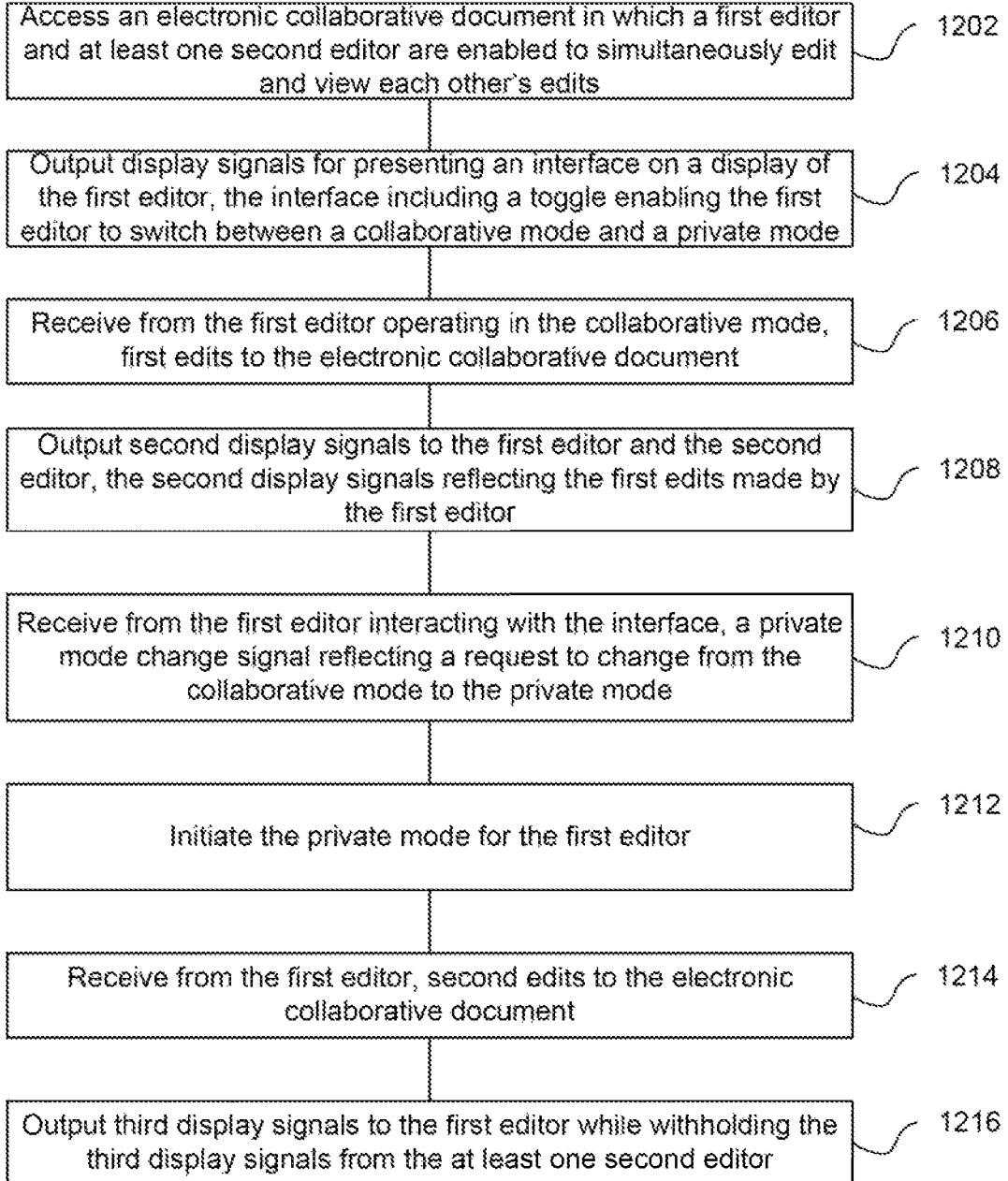

Access an electronic collaborative document in which a first editor and at least one second editor are enabled to simultaneously edit and view each other's edits — 1202

Output display signals for presenting an interface on a display of the first editor, the interface including a toggle enabling the first editor to switch between a collaborative mode and a private mode — 1204

Receive from the first editor operating in the collaborative mode, first edits to the electronic collaborative document — 1206

Output second display signals to the first editor and the second editor, the second display signals reflecting the first edits made by the first editor — 1208

Receive from the first editor interacting with the interface, a private mode change signal reflecting a request to change from the collaborative mode to the private mode — 1210

Initiate the private mode for the first editor — 1212

Receive from the first editor, second edits to the electronic collaborative document — 1214

Output third display signals to the first editor while withholding the third display signals from the at least one second editor — 1216

Fig. 12

DIGITAL PROCESSING SYSTEMS AND METHODS FOR DUAL MODE EDITING IN COLLABORATIVE DOCUMENTS ENABLING PRIVATE CHANGES IN COLLABORATIVE WORK SYSTEMS

CROSS-REFERENCE TO RELATED APPLICATIONS

This application is based on and claims benefit of priority of International Patent Application No. PCT/IB2021/062440 filed on Dec. 29, 2021, which claims priority to U.S. Provisional Patent Application No. 63/233,925, filed Aug. 17, 2021, U.S. Provisional Patent Application No. 63/273, 448, filed Oct. 29, 2021, U.S. Provisional Patent Application No. 63/273,453, filed Oct. 29, 2021, International Patent Application No. PCT/IB2021/000024, filed on Jan. 14, 2021, International Patent Application No. PCT/IB2021/ 000090, filed on Feb. 11, 2021, and International Patent Application No. PCT/IB2021/000297, filed on Apr. 28, 2021, the contents of all of which are incorporated herein by reference in their entireties.

TECHNICAL FIELD

Embodiments consistent with the present disclosure include systems and methods for collaborative work systems. The disclosed systems and methods may be implemented using a combination of conventional hardware and software as well as specialized hardware and software, such as a machine constructed and/or programmed specifically for performing functions associated with the disclosed method steps. Consistent with other disclosed embodiments, non-transitory computer-readable storage media may store program instructions, which may be executable by at least one processing device and perform any of the steps and/or methods described herein.

BACKGROUND

Operation of modern enterprises can be complicated and time consuming. In many cases, managing the operation of a single project requires integration of several employees, departments, and other resources of the entity. To manage the challenging operation, project management software applications may be used. Such software applications allow a user to organize, plan, and manage resources by providing project-related information in order to optimize the time and resources spent on each project. It would be useful to improve these software applications to increase operation management efficiency.

SUMMARY

One aspect of the present disclosure is directed to systems, methods, and computer readable media for enabling dual mode editing in collaborative documents to enable private changes. The system may include at least one processor configured to access an electronic collaborative document in which a first editor and at least one second editor are enabled to simultaneously edit and view each other's edits to the electronic collaborative document; output first display signals for presenting an interface on a display of the first editor, the interface including a toggle enabling the first editor to switch between a collaborative mode and a private mode; receive from the first editor operating in the collaborative mode, first edits to the electronic collaborative document; output second display signals to the first editor and the at least one second editor, the second display signals reflecting the first edits made by the first editor; receive from the first editor interacting with the interface, a private mode change signal reflecting a request to change from the collaborative mode to the private mode; in response to the first mode change signal, initiate in connection with the electronic collaborative document the private mode for the first editor; in the private mode, receive from the first editor, second edits to the electronic collaborative document; and in response to the second edits, output third display signals to the first editor while withholding the third display signals from the at least one second editor, such that the second edits are enabled to appear on a display of the first editor and are prevented from appearing on at least one display of the at least one second editor.

BRIEF DESCRIPTION OF THE DRAWINGS

FIG. 8 illustrates a block diagram of an example process for managing display interference in an electronic collaborative word processing document, consistent with some embodiments of the present disclosure.

FIG. 9 illustrates a block diagram of another example process for managing display interference in an electronic collaborative word processing document, consistent with some embodiments of the present disclosure.

FIG. 12 illustrates a block diagram of an example process for enabling dual mode editing in collaborative documents to enable private changes.

DETAILED DESCRIPTION

Figure 1:
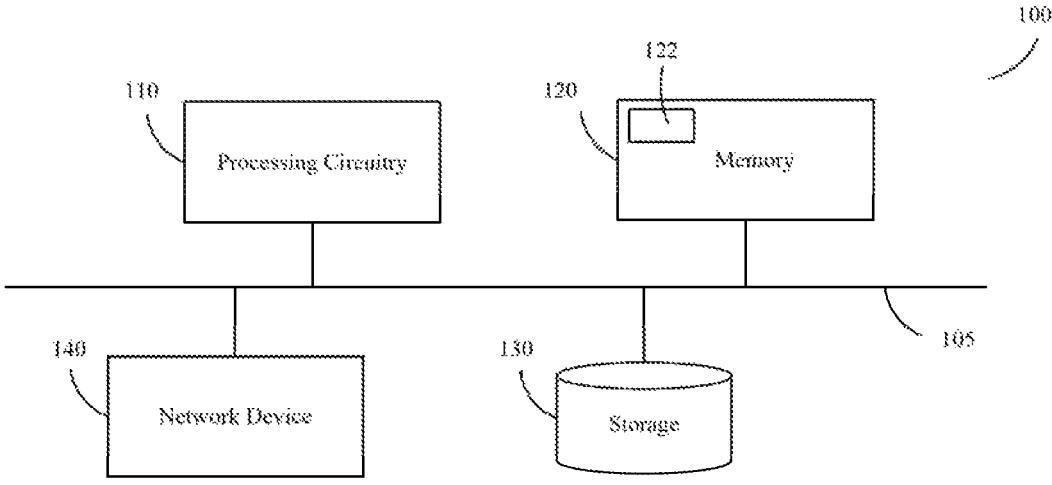
FIG. 1 is a block diagram of an exemplary computing device which may be employed in connection with embodiments of the present disclosure.

Exemplary embodiments are described with reference to the accompanying drawings. The figures are not necessarily drawn to scale. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It should also be noted that as used herein and in the appended claims, the singular forms "a," "an," and "the" include plural references unless the context clearly dictates otherwise.

In the following description, various working examples are provided for illustrative purposes. However, is to be understood the present disclosure may be practiced without one or more of these details.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

This disclosure presents various mechanisms for collaborative work systems. Such systems may involve software that enables multiple users to work collaboratively. By way of one example, workflow management software may enable various members of a team to cooperate via a common online platform. It is intended that one or more aspects of any mechanism may be combined with one or more aspect of any other mechanisms, and such combinations are within the scope of this disclosure.

This disclosure is constructed to provide a basic understanding of a few exemplary embodiments with the understanding that features of the exemplary embodiments may be combined with other disclosed features or may be incorporated into platforms or embodiments not described herein while still remaining within the scope of this disclosure. For convenience, and form of the word "embodiment" as used herein is intended to refer to a single embodiment or multiple embodiments of the disclosure.

Certain embodiments disclosed herein include devices, systems, and methods for collaborative work systems that may allow a user to interact with information in real time. To avoid repetition, the functionality of some embodiments is described herein solely in connection with a processor or at least one processor. It is to be understood that such exemplary descriptions of functionality applies equally to methods and computer readable media and constitutes a written description of systems, methods, and computer readable media. The underlying platform may allow a user to structure a systems, methods, or computer readable media in many ways using common building blocks, thereby permitting flexibility in constructing a product that suits desired needs. This may be accomplished through the use of boards. A board may be a table configured to contain items (e.g., individual items presented in horizontal rows) defining objects or entities that are managed in the platform (task, project, client, deal, etc.). Unless expressly noted otherwise, the terms "board" and "table" may be considered synonymous for purposes of this disclosure. In some embodiments, a board may contain information beyond which is displayed in a table. Boards may include sub-boards that may have a separate structure from a board. Sub-boards may be tables with sub-items that may be related to the items of a board. Columns intersecting with rows of items may together define cells in which data associated with each item may be maintained. Each column may have a heading or label defining an associated data type. When used herein in combination with a column, a row may be presented horizontally and a column vertically. However, in the broader generic sense as used herein, the term "row" may refer to one or more of a horizontal and/or a vertical presentation. A table or tablature as used herein, refers to data presented in horizontal and vertical rows, (e.g., horizontal rows and vertical columns) defining cells in which data is presented. Tablature may refer to any structure for presenting data in an organized manner, as previously discussed. such as cells presented in horizontal rows and vertical columns, vertical rows and horizontal columns, a tree data structure, a web chart, or any other structured representation, as explained throughout this disclosure. A cell may refer to a unit of information contained in the tablature defined by the structure of the tablature. For example, a cell may be defined as an intersection between a horizontal row with a vertical column in a tablature having rows and columns. A cell may also be defined as an intersection between a horizontal and a vertical row, or as an intersection between a horizontal and a vertical column. As a further example, a cell may be defined as a node on a web chart or a node on a tree data structure. As would be appreciated by a skilled artisan, however, the disclosed embodiments are not limited to any specific structure, but rather may be practiced in conjunction with any desired organizational arrangement. In addition, tablature may include any type of information, depending on intended use. When used in conjunction with a workflow management application, the tablature may include any information associated with one or more tasks, such as one or more status values, projects, countries, persons, teams, progress statuses, a combination thereof, or any other information related to a task.

While a table view may be one way to present and manage the data contained on a board, a table's or board's data may be presented in different ways. For example, in some embodiments, dashboards may be utilized to present or summarize data derived from one or more boards. A dashboard may be a non-table form of presenting data, using, for example, static or dynamic graphical representations. A dashboard may also include multiple non-table forms of presenting data. As discussed later in greater detail, such representations may include various forms of graphs or graphics. In some instances, dashboards (which may also be referred to more generically as "widgets") may include tablature. Software links may interconnect one or more boards with one or more dashboards thereby enabling the dashboards to reflect data presented on the boards. This may allow, for example, data from multiple boards to be displayed and/or managed from a common location. These widgets may provide visualizations that allow a user to update data derived from one or more boards.

Boards (or the data associated with boards) may be stored in a local memory on a user device or may be stored in a local network repository. Boards may also be stored in a remote repository and may be accessed through a network. In some instances, permissions may be set to limit board access to the board's "owner" while in other embodiments a user's board may be accessed by other users through any of the networks described in this disclosure. When one user makes a change in a board, that change may be updated to the board stored in a memory or repository and may be pushed to the other user devices that access that same board. These changes may be made to cells, items, columns, boards, dashboard views, logical rules, or any other data associated with the boards. Similarly, when cells are tied together or are mirrored across multiple boards, a change in one board may cause a cascading change in the tied or mirrored boards or dashboards of the same or other owners.

Boards and widgets may be part of a platform that may enable users to interact with information in real time in collaborative work systems involving electronic collaborative word processing documents. Electronic collaborative word processing documents (and other variations of the term) as used herein are not limited to only digital files for word processing, but may include any other processing document such as presentation slides, tables, databases, graphics, sound files, video files or any other digital document or file. Electronic collaborative word processing documents may include any digital file that may provide for input, editing, formatting, display, and/or output of text, graphics, widgets, objects, tables, links, animations, dynamically updated elements, or any other data object that may be used in conjunction with the digital file. Any information stored on or displayed from an electronic collaborative word processing document may be organized into blocks. A block may include any organizational unit of information in a digital file, such as a single text character, word, sentence, paragraph, page, graphic, or any combination thereof. Blocks may include static or dynamic information, and may be linked to other sources of data for dynamic updates. Blocks may be automatically organized by the system, or may be manually selected by a user according to preference. In one embodiment, a user may select a segment of any information in an electronic word processing document and assign it as a particular block for input, editing, formatting, or any other further configuration.

An electronic collaborative word processing document may be stored in one or more repositories connected to a network accessible by one or more users through their computing devices. In one embodiment, one or more users may simultaneously edit an electronic collaborative word processing document. The one or more users may access the electronic collaborative word processing document through one or more user devices connected to a network. User access to an electronic collaborative word processing document may be managed through permission settings set by an author of the electronic collaborative word processing document. An electronic collaborative word processing document may include graphical user interface elements enabled to support the input, display, and management of multiple edits made by multiple users operating simultaneously within the same document.

Various embodiments are described herein with reference to a system, method, device, or computer readable medium. It is intended that the disclosure of one is a disclosure of all. For example, it is to be understood that disclosure of a computer readable medium described herein also constitutes a disclosure of methods implemented by the computer readable medium, and systems and devices for implementing those methods, via for example, at least one processor. It is to be understood that this form of disclosure is for ease of discussion only, and one or more aspects of one embodiment herein may be combined with one or more aspects of other embodiments herein, within the intended scope of this disclosure.

Embodiments described herein may refer to a non-transitory computer readable medium containing instructions that when executed by at least one processor, cause the at least one processor to perform a method. Non-transitory computer readable mediums may be any medium capable of storing data in any memory in a way that may be read by any computing device with a processor to carry out methods or any other instructions stored in the memory. The non-transitory computer readable medium may be implemented as hardware, firmware, software, or any combination thereof. Moreover, the software may preferably be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine may be implemented on a computer platform having hardware such as one or more central processing units ("CPUs"), a memory, and input/output interfaces. The computer platform may also include an operating system and microinstruction code. The various processes and functions described in this disclosure may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium may be any computer readable medium except for a transitory propagating signal.

The memory may include a Random Access Memory (RAM), a Read-Only Memory (ROM), a hard disk, an optical disk, a magnetic medium, a flash memory, other permanent, fixed, volatile or non-volatile memory, or any other mechanism capable of storing instructions. The memory may include one or more separate storage devices collocated or disbursed, capable of storing data structures, instructions, or any other data. The memory may further include a memory portion containing instructions for the processor to execute. The memory may also be used as a working scratch pad for the processors or as a temporary storage.

Some embodiments may involve at least one processor. A processor may be any physical device or group of devices having electric circuitry that performs a logic operation on input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory.

In some embodiments, the at least one processor may include more than one processor. Each processor may have a similar construction, or the processors may be of differing constructions that are electrically connected or disconnected from each other. For example, the processors may be separate circuits or integrated in a single circuit. When more than one processor is used, the processors may be configured to operate independently or collaboratively. The processors may be coupled electrically, magnetically, optically, acoustically, mechanically or by other means that permit them to interact.

Consistent with the present disclosure, disclosed embodiments may involve a network. A network may constitute any type of physical or wireless computer networking arrangement used to exchange data. For example, a network may be the Internet, a private data network, a virtual private network using a public network, a Wi-Fi network, a LAN or WAN network, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data and/or information between separate entities.

Certain embodiments disclosed herein may also include a computing device for generating features for work collaborative systems, the computing device may include processing circuitry communicatively connected to a network interface and to a memory, wherein the memory contains instructions that, when executed by the processing circuitry, configure the computing device to receive from a user device associated with a user account instruction to generate a new column of a single data type for a first data structure, wherein the first data structure may be a column oriented data structure, and store, based on the instructions, the new column within the column-oriented data structure repository, wherein the column-oriented data structure repository may be accessible and may be displayed as a display feature to the user and at least a second user account. The computing devices may be devices such as mobile devices, desktops, laptops, tablets, or any other devices capable of processing data. Such computing devices may include a display such as an LED display, augmented reality (AR), virtual reality (VR) display.

Certain embodiments disclosed herein may include a processor configured to perform methods that may include triggering an action in response to an input. The input may be from a user action or from a change of information contained in a user's table, in another table, across multiple tables, across multiple user devices, or from third-party applications. Triggering may be caused manually, such as through a user action, or may be caused automatically, such as through a logical rule, logical combination rule, or logical templates associated with a board. For example, a trigger may include an input of a data item that is recognized by at least one processor that brings about another action.

In some embodiments, the methods including triggering may cause an alteration of data and may also cause an alteration of display of data contained in a board or in memory. An alteration of data may include a recalculation of data, the addition of data, the subtraction of data, or a rearrangement of information. Further, triggering may also cause a communication to be sent to a user, other individuals, or groups of individuals. The communication may be a notification within the system or may be a notification outside of the system through a contact address such as by email, phone call, text message, video conferencing, or any other third-party communication application.

Some embodiments include one or more of automations, logical rules, logical sentence structures and logical (sentence structure) templates. While these terms are described herein in differing contexts, in a broadest sense, in each instance an automation may include a process that responds to a trigger or condition to produce an outcome; a logical rule may underly the automation in order to implement the automation via a set of instructions; a logical sentence structure is one way for a user to define an automation; and a logical template/logical sentence structure template may be a fill-in-the-blank tool used to construct a logical sentence structure. While all automations may have an underlying logical rule, all automations need not implement that rule through a logical sentence structure. Any other manner of defining a process that respond to a trigger or condition to produce an outcome may be used to construct an automation.

Other terms used throughout this disclosure in differing exemplary contexts may generally share the following common definitions.

In some embodiments, machine learning algorithms (also referred to as machine learning models or artificial intelligence in the present disclosure) may be trained using training examples, for example in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may comprise an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters arc set manually by a person or automatically by a process external to the machine learning algorithm (such as a hyper parameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters.

FIG. 1 is a block diagram of an exemplary computing device 100 for generating a column and/or row oriented data structure repository for data consistent with some embodiments. The computing device 100 may include processing circuitry 110, such as, for example, a central processing unit (CPU). In some embodiments, the processing circuitry 110 may include, or may be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The processing circuitry such as processing circuitry 110 may be coupled via a bus 105 to a memory 120.

The memory 120 may further include a memory portion 122 that may contain instructions that when executed by the processing circuitry 110, may perform the method described in more detail herein. The memory 120 may be further used as a working scratch pad for the processing circuitry 110, a temporary storage, and others, as the case may be. The memory 120 may be a volatile memory such as, but not limited to, random access memory (RAM), or non-volatile memory (NVM), such as, but not limited to, flash memory. The processing circuitry 110 may be further connected to a network device 140, such as a network interface card, for providing connectivity between the computing device 100 and a network, such as a network 210, discussed in more detail with respect to FIG. 2 below. The processing circuitry 110 may be further coupled with a storage device 130. The storage device 130 may be used for the purpose of storing single data type column-oriented data structures, data elements associated with the data structures, or any other data structures. While illustrated in FIG. 1 as a single device, it is to be understood that storage device 130 may include multiple devices either collocated or distributed.

The processing circuitry 110 and/or the memory 120 may also include machine-readable media for storing software. "Software" as used herein refers broadly to any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, may cause the processing system to perform the various functions described in further detail herein.

Figure 2:
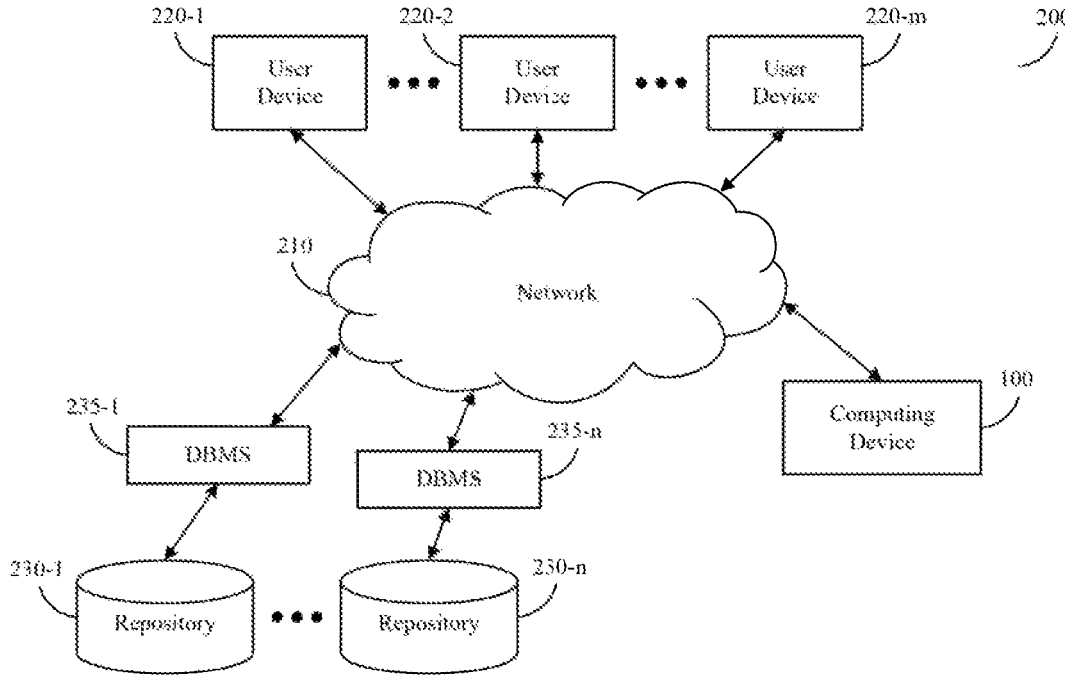
FIG. 2 is a block diagram of an exemplary computing architecture for collaborative work systems, consistent with embodiments of the present disclosure.

FIG. 2 is a block diagram of computing architecture 200 that may be used in connection with various disclosed embodiments. The computing device 100, as described in connection with FIG. 1, may be coupled to network 210. The network 210 may enable communication between different elements that may be communicatively coupled with the computing device 100, as further described below. The network 210 may include the Internet, the world-wide-web (WWW), a local area network (LAN), a wide area network (WAN), a metro area network (MAN), and other networks capable of enabling communication between the elements of the computing architecture 200. In some disclosed embodiments, the computing device 100 may be a server deployed in a cloud computing environment.

One or more user devices 220-1 through user device 220-m, where 'm' in an integer equal to or greater than 1, referred to individually as user device 220 and collectively as user devices 220, may be communicatively coupled with the computing device 100 via the network 210. A user device 220 may be for example, a smart phone, a mobile phone, a laptop, a tablet computer, a wearable computing device, a personal computer (PC), a smart television and the like. A user device 220 may be configured to send to and receive from the computing device 100 data and/or metadata associated with a variety of elements associated with single data type column-oriented data structures, such as columns, rows, cells, schemas, and the like.

One or more data repositories 230-1 through data repository 230-n, where 'n' in an integer equal to or greater than 1, referred to individually as data repository 230 and collectively as data repository 230, may be communicatively coupled with the computing device 100 via the network 210, or embedded within the computing device 100. Each data repository 230 may be communicatively connected to the network 210 through one or more database management services (DBMS) 235-1 through DBMS 235-n. The data repository 230 may be for example, a storage device containing a database, a data warehouse, and the like, that may be used for storing data structures, data items, metadata, or any information, as further described below. In some embodiments, one or more of the repositories may be distributed over several physical storage devices, e.g., in a cloud-based computing environment. Any storage device may be a network accessible storage device, or a component of the computing device 100.

Figure 3:
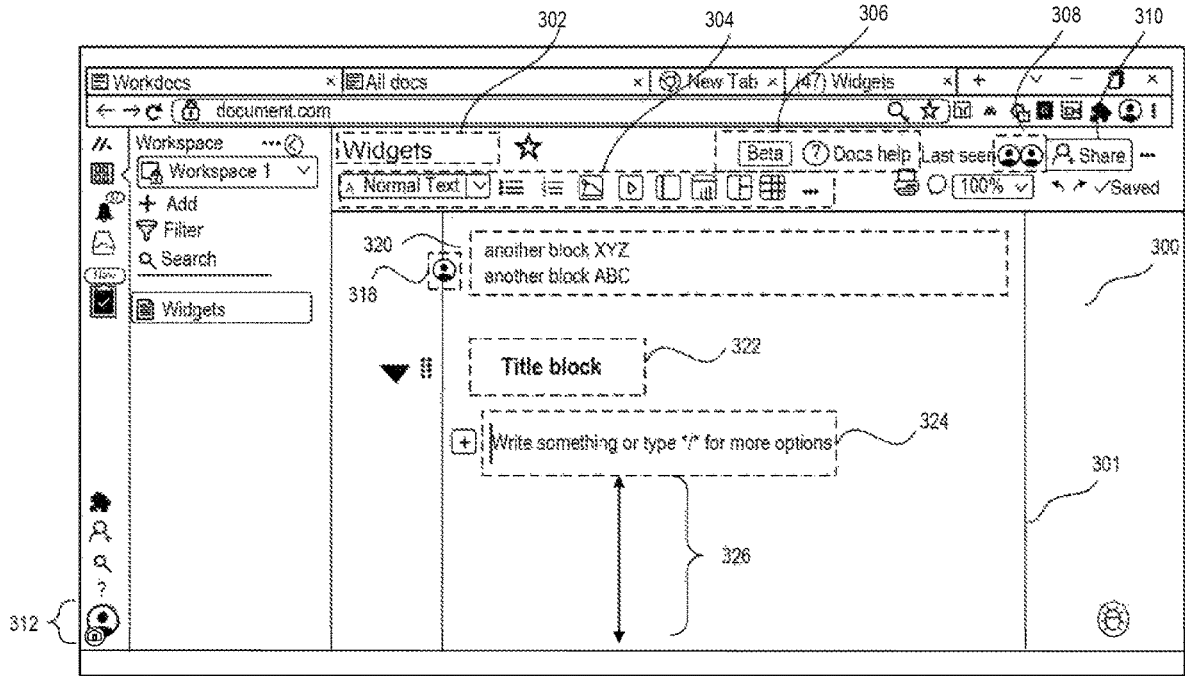
FIG. 3 illustrates an example of an electronic collaborative word processing document, consistent with some embodiments of the present disclosure.

FIG. 3 is an exemplary embodiment of a presentation of an electronic collaborative word processing document 301 via an editing interface or editor 300. The editor 300 may include any user interface components 302 through 312 to assist with input or modification of information in an electronic collaborative word processing document 301. For example, editor 300 may include an indication of an entity 312, which may include at least one individual or group of individuals associated with an account for accessing the electronic collaborative word processing document. User interface components may provide the ability to format a title 302 of the electronic collaborative word processing document, select a view 304, perform a lookup for additional features 306, view an indication of other entities 308 accessing the electronic collaborative word processing document at a certain time (e.g., at the same time or at a recorded previous time), and configure permission access 310 to the electronic collaborative word processing document. The electronic collaborative word processing document 301 may include information that may be organized into blocks as previously discussed. For example, a block 320 may itself include one or more blocks of information. Each block may have similar or different configurations or formats according to a default or according to user preferences. For example, block 322 may be a "Title Block" configured to include text identifying a title of the document, and may also contain, embed, or otherwise link to metadata associated with the title. A block may be pre-configured to display information in a particular format (e.g., in bold font). Other blocks in the same electronic collaborative word processing document 301, such as compound block 320 or input block 324 may be configured differently from title block 322. As a user inputs information into a block, either via input block 324 or a previously entered block, the platform may provide an indication of the entity 318 responsible for inputting or altering the information. The entity responsible for inputting or altering the information in the electronic collaborative word processing document may include any entity accessing the document, such as an author of the document or any other collaborator who has permission to access the document.

In a collaborative word processing document, multiple users may simultaneously edit a single document in real time or near real time. Edits by a first user in one section of a document may interfere with the display of a second editor making edits to the same document, which may hamper the second editor's ability to make simultaneous edits in the document. The problem may be compounded when large groups make simultaneous edits to the same document, or when one user adds a large amount of content to the document. The introduction of text, graphics, or other objects to an earlier page in a collaborative word processing document may adjust the location of text or objects in a later page of the document or may shift a user's viewport so that the user's active editing location is no longer within the user's view. This reduces efficiency in collaboration between users and may lead to unintended editing errors by the user. Therefore, there is a need for unconventional innovations for managing display interference in an electronic collaborative word processing document to enable multiple users simultaneously edit a collaborative word processing document.

Such unconventional approaches may enable computer systems to implement functions to improve the efficiency of electronic collaborative word processing documents. By using unique and unconventional methods of classifying and storing data associated with a collaborative word processing document or by grouping editable segments of the collaborative word processing document into unique and discrete segments, a system may provide display locking techniques to increase the efficiency of electronic collaborative word processing documents. Various embodiments of the present disclosure describe unconventional systems, methods, and computer readable media for managing display interference in an electronic collaborative word processing document. Various embodiments of the present disclosure may include at least one processor configured to access the electronic collaborative word processing document, present a first instance of the electronic collaborative word processing document via a first hardware device running a first editor, and present a second instance of the electronic collaborative word processing document via a second hardware device running a second editor. The at least one processor may be configured to receive from the first editor during a common editing period, first edits to the electronic collaborative word processing document made on earlier page of the electronic collaborative word processing document that result in a pagination change. The at least one processor may be further configured to receive from the second editor during the common editing period, second edits to the electronic collaborative word processing document made on a second page of the electronic collaborative word processing document later than the first page. The at least one processor may be configured to, during the common editing period, lock a display associated with the second hardware device to suppress the pagination change caused by the first edits received by the second hardware device, and upon receipt of a scroll-up command via the second editor during the common editing period, cause the display associated with the second hardware device to reflect the pagination change caused by the first edits.

Thus, the various embodiments in the present disclosure describe at least a technological solution, based on improvements to operations of computer systems and platforms, to the technical challenge of managing display interference caused by simultaneous edits to an electronic collaborative word processing document.

Some disclosed embodiments may involve systems, methods, and computer readable media for managing display interference in an electronic collaborative word processing document. Display interference may refer to an undesirable adjustment of a viewing display, or editing location within an electronic collaborative word processing document caused by edits made by another user, or by any other alterations in the electronic collaborative word processing document. Display interference may include any shift in the location of information or data displayed within an electronic collaborative word processing document. For example, a user may be editing paragraph "A" on a second page of a collaborative word processing document. Another user may add two pages of text on a first page of the same collaborative word processing document. The addition of two pages of text to the collaborative word processing document may cause paragraph "A" to move to a fourth page in the collaborative word processing document that is out of the current view of the first user. This movement of paragraph "A" is one example of a display interference. Display interference is not limited to an unwanted shift of an active editing location outside of the current viewport. Display interference may include unwanted shifts of an active editing location within a viewport. For example, display interference may include the addition of a single line of text to a collaborative word processing document that causes paragraph "A" to move one line of text down in the collaborative word processing document, with paragraph "A" either remaining wholly or partially within the current viewport. Display interference is not limited to vertical shifts in information or data displayed within an electronic collaborative word processing document and may include horizontal shifts or a combination of vertical and horizontal shifts in the display of information or data caused by other edits within the document. Furthermore, display interference is not limited to movement in the location of information or data in an active editing location and may include the movement in the location of any information or data within a collaborative word processing document. Managing display interference may include any steps taken by the system to resolve display interference that may occur on one or more displays of one or more users accessing an electronic collaborative word processing document, which is discussed in further detail below.

Some aspects of the present disclosure may involve display interference within an electronic collaborative word processing document. An electronic collaborative word processing document may be a file read by a computer program that provides for the input, editing, formatting, display, and output of text, graphics, widgets, objects, tables, or other elements typically used in computer desktop publishing applications. An electronic collaborative word processing document may be stored in one or more repositories connected to a network accessible by one or more users via at least one associated computing device. In one embodiment, one or more users may simultaneously edit an electronic collaborative word processing document, with all users' edits displaying in real-time or near real time within the same collaborative word processing document file. The one or more users may access the electronic collaborative word processing document through one or more user devices connected to a network. An electronic collaborative word processing document may include graphical user interface elements enabled to support the input, display, and management of multiple edits made by multiple users operating simultaneously within the same document. Though this disclosure refers to electronic collaborative word processing documents, the systems, methods, and techniques disclosed herein are not limited to word processing documents and may be adapted for use in other productivity applications such as documents, presentations, worksheets, databases, charts, graphs, digital paintings, electronic music and digital video or any other application software used for producing information.

FIG. 3 is an exemplary embodiment of a presentation of an electronic collaborative word processing document 301 via an editing interface or editor 300. The editor 300 may include any user interface components 302 through 312 to assist with input or modification of information in an electronic collaborative word processing document 301. For example, editor 300 may include an indication of an entity 312, which may include at least one individual or group of individuals associated with an account for accessing the electronic collaborative word processing document. User interface components may provide the ability to format a title 302 of the electronic collaborative word processing document, select a view 304, perform a lookup for additional features 306, view an indication of other entities 308 accessing the electronic collaborative word processing document at a certain time (e.g., at the same time or at a recorded previous time), and configure permission access 310 to the electronic collaborative word processing document. The electronic collaborative word processing document 301 may include information that may be organized into blocks as previously discussed. For example, a block 320 may itself include one or more blocks of information. Each block may have similar or different configurations or formats according to a default or according to user preferences. For example, block 322 may be a "Title Block" configured to include text identifying a title of the document, and may also contain, embed, or otherwise link to metadata associated with the title. A block may be pre-configured to display information in a particular format (e.g., in bold font). Other blocks in the same electronic collaborative word processing document 301, such as compound block 320 or input block 324 may be configured differently from title block 322. As a user inputs information into a block, either via input block 324 or a previously entered block, the platform may provide an indication of the entity 318 responsible for inputting or altering the information. The entity responsible for inputting or altering the information in the electronic collaborative word processing document may include any entity accessing the document, such as an author of the document or any other collaborator who has permission to access the document.

Some disclosed embodiments may include accessing an electronic collaborative word processing document. An electronic collaborative word processing document may be stored in one or more data repositories and the document may be retrieved by one or more users for downloading, receiving, processing, editing, or viewing, the electronic collaborative word processing document. An electronic collaborative word processing document may be accessed by a user using a user device through a network. Accessing an electronic collaborative word processing document may involve retrieving data through any electrical medium such as one or more signals, instructions, operations, functions, databases, memories, hard drives, private data networks, virtual private networks, Wi-Fi networks, LAN or WAN networks, Ethernet cables, coaxial cables, twisted pair cables, fiber optics, public switched telephone networks, wireless cellular networks, BLUETOOTH™, BLUETOOTH LE™ (BLE), Wi-Fi, near field communications (NFC), or any other suitable communication method that provide a medium for exchanging data. In some embodiments, accessing information may include adding, editing, deleting, re-arranging, or otherwise modifying information directly or indirectly from the network. A user may access the electronic collaborative word processing document using a user device, which may include a computer, laptop, smartphone, tablet, VR headset, smart watch, or any other electronic display device capable of receiving and sending data. In some embodiments, accessing the electronic word processing document may include retrieving the electronic word processing document from a web browser cache. Additionally or alternatively, accessing the electronic word processing document may include connecting with a live data stream of the electronic word processing document from a remote source. In some embodiments, accessing the electronic word processing document may include logging into an account having a permission to access the document. For example, accessing the electronic word processing document may be achieved by interacting with an indication associated with the electronic word processing document, such as an icon or file name, which may cause the system to retrieve (e.g., from a storage medium) a particular electronic word processing document associated with the indication.

For example, an electronic collaborative word processing document may be stored in repository 230-1 as shown in FIG. 2. Repository 230-1 may be configured to store software, files, or code, such as electronic collaborative word processing documents developed using computing device 100 or user device 220-1. Repository 230-1 may further be accessed by computing device 100, user device 220-1, or other components of system 200 for downloading, receiving, processing, editing, or viewing, the electronic collaborative word processing document. Repository 230-1 may be any suitable combination of data storage devices, which may optionally include any type or combination of slave databases, load balancers, dummy servers, firewalls, back-up databases, and/or any other desired database components. In some embodiments, repository 230-1 may be employed as a cloud service, such as a Software as a Service (SaaS) system, a Platform as a Service (PaaS), or Infrastructure as a Service (IaaS) system. For example, repository 230-1 may be based on infrastructure of services of Amazon Web Services™ (AWS), Microsoft Azure™, Google Cloud Platform™, Cisco Metapod™, Joyent™, vmWare™, or other cloud computing providers. Repository 230-1 may include other commercial file sharing services, such as Dropbox™, Google Docs™, or iCloud™. In some embodiments, repository 230-1 may be a remote storage location, such as a network drive or server in communication with network 210. In other embodiments repository 230-1 may also be a local storage device, such as local memory of one or more computing devices (e.g., computing device 100) in a distributed computing environment.

Some disclosed embodiments may include presenting a first instance of an electronic collaborative word processing document. Presenting an instance of an electronic word processing document may include causing a display of the information contained in the electronic word processing document via a display device. An electronic collaborative word processing document may be presented in multiple instances on multiple user devices. Presenting multiple instances of the electronic collaborative word processing document on multiple devices may facilitate collaborative editing of the same document because multiple users may access and edit the same document file at the same time from different user devices. A first instance of the electronic collaborative word processing document may include the presentation of data and information contained in the electronic collaborative word processing document to a first user. For example, a user may view or edit a first instance of the electronic collaborative word processing document and the user may control the location of the user's view (e.g., an active display window) or edits in the first instance of the electronic collaborative word processing document. This location may be independent or distinct from other users' views or editing locations in any other instance of the electronic collaborative word processing document. In one embodiment, edits made by a user in an instance of the electronic collaborative word processing document are synchronized in real time or near-real time to all other instances of the same electronic collaborative word processing document.

A first instance of an electronic collaborative word processing document may be presented via a first hardware device running a first editor. A first hardware device may include a computer, laptop, smartphone, tablet, VR headset, smart watch, or any other electronic display device capable of receiving and sending data. A first editor may be a user interface that provides for the input, editing, formatting, display, and output of text, graphics, widgets, objects, tables, or other elements in an electronic word processing document. A first editor may receive user input via a keyboard, mouse, microphone, digital camera, scanner, voice sensing, webcam, biometric device, stylus, haptic devices, or any other input device capable of transmitting input data. In one embodiment, a user accesses an electronic collaborative word processing document using a computer and views the document in an editor that receives text and other input via a mouse and keyboard.

Figure 4:
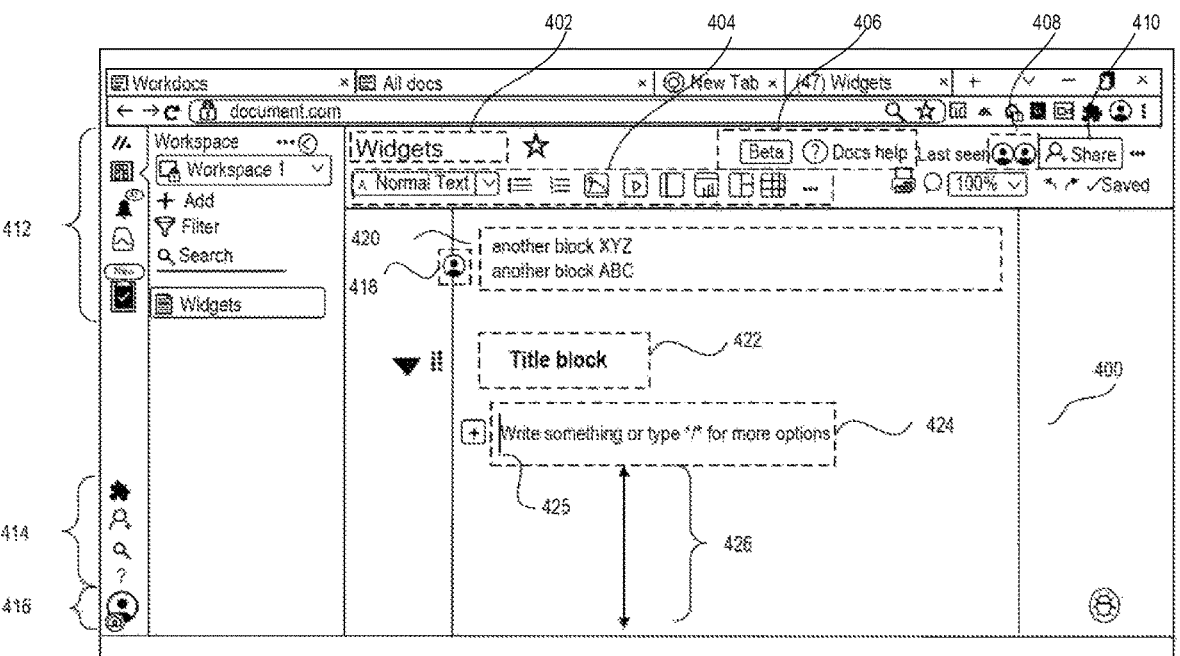
FIG. 4 illustrates an example of an instance of a collaborative word processing document, consistent with some embodiments of the present disclosure.

By way of example, FIG. 4 illustrates an instance of a collaborative electronic word processing document presented within an editor 400. In some embodiments, editor 400 may be displayed by a computing device (e.g., the computing device 100 illustrated in FIG. 1), software running thereon, or any other projecting device ((e.g., projector, AR or VR lens, or any other display device) as previously discussed). Editor 400 may include various tools for displaying information associated with the document of for editing the document. For example, editor 400 may display a title 402 indicating the title of the document. Formatting bar 404 may depict various tools to adjust formatting of information or objects within the document. Help bar 406 may be included which may provide hyperlinks to information about various features of the editor 400. Share button 410 may be included to invite additional users to edit another instance of the collaborative electronic word processing document. Editor 400 may include tool bar 412 and interface bar 414.

Some disclosed embodiments may include presenting a second instance of the electronic collaborative word processing document. Presenting a second instance of the electronic collaborative word processing document may be achieved in the same or similar manner as presenting a first instance of the electronic collaborative word processing document, as discussed above. Presenting a second instance may include the display of data and information contained in the electronic collaborative word processing document to a second user. For example, a second user may view or edit a second instance of the electronic collaborative word processing document and the second user may control the location of the second user's view or edits in the second instance of the electronic collaborative word processing document. Views presented and edits made in the second instance of the electronic collaborative word processing document may be made independently of the views presented or edits made by other users in any other instance, such as in the first instance discussed previously above. For example, the first instance and the second instance of the electronic collaborative word processing document may display different portions of the document and may receive edits to the electronic collaborative word processing document at different locations within the document. Edits made by a user in the first or the second instance of the electronic collaborative word processing document may be incorporated into other instances of the electronic collaborative word processing document in real time. In some embodiments, the first instance and the second instance of the electronic collaborative word processing document may share a common viewport displaying some of the same data and information in both the first and second instances of the document. Edits made in the first or second instance may be demarcated by user identification indicators in the first and second instance. User identification indicators may include a graphic, a user ID indicator, a color, a font, or any other differentiator that indicates the source of an edit in an instance of the electronic collaborative word processing document. The second instance of the electronic collaborative word processing document may be presented via a second hardware device running a second editor, in a similar manner to the first hardware device and the first editor described herein. Any number of hardware devices may run an editor to access another instance of the electronic collaborative word processing document.

Returning to FIG. 4 by way of example, editor 400 may indicate the that multiple users are accessing an electronic collaborative word processing document through the display of user indicator, such as user display indicator 408 which indicates two users are running an instance of the electronic collaborative word processing document. Editor 400 may include current user indicator 416. Current user indicator 416 may indicate the identification of the user running the displayed instance of the collaborative word processing document. In some embodiments, the objects and information displayed for editing may be controlled by the current user shown in 416 in each instance of the electronic collaborative word processing document. For example, FIG. 4 may depict an editing location that is actively edited by the current user, such as editing location 424. Editing location 424 may be a block as described herein. Other blocks may be shown in the viewport of editor 400 but may not be the active editing location. For example, FIG. 4 includes Title block 422 and paragraph block 420 which are not actively being edited by the user. The location that a different user is actively editing in another instance of the electronic collaborative word processing document may be indicated by icon 418, which may indicate the active working location of another user, which in this example is paragraph block 420.

Some embodiments may include receiving from a first editor during a common editing period, first edits to an electronic collaborative word processing document. A common editing period may include a time when at least two instances of the electronic collaborative word processing document are presented in two editors. In one embodiment, a common editing period may include two users each viewing and editing the same electronic collaborative word processing document in two instances displayed on separate hardware devices associated with each of the two users. A common editing period is not limited to situations when two users are editing a document and may include any number of users editing a document in real or near real time. An edit to an electronic collaborative word processing document may include the addition, manipulation, or deletion of objects or data, and may include addition, manipulation, or deletion of text, graphics, tables, images, formatting, highlights, manipulation of fonts, icons, shapes, references, headers, footers, or any other addition, deletion, or manipulation of objects or any other data within the electronic word processing document. Receiving the first edits may include the system receiving an edit request from a computing device associated with a user. The request may be transmitted over a network to a repository where the electronic collaborative word processing document is stored. At least one processor may then perform a lookup of permission settings to confirm whether the computing device has authorization to make the edit. In a situation where authorization is confirmed, the system may then implement and store the edit with the electronic collaborative word processing document such that any other computing devices accessing the document may retrieve the document with the implemented change.

In some embodiments, edits made during a common editing period may be transmitted or received through a communications interface. A communications interface may be a platform capable of sending and retrieving data through any electrical medium such as the types described herein that manage and track edits made in a collaborative electronic word processing document from one or more editors. In one embodiment, the communications interface may be integrated with the electronic collaborative word processing document editor. For example, protocols may be incorporated into the editor that manage exchanges of data between multiple editors running one or more instances of the electronic collaborative word processing document. In other embodiments, the communications interface may be separate from the editor and may run on separate hardware devices.

For example, a communications interface may run on a computing device, such as computing device 100 (of FIG. 1), and may transmit or receive edits made by a first editor running on user devices 220-1 and a second editor running on user device 220-2 through network 210 (of FIG. 2). More broadly, a communications interface may refer to any platform capable transmitting or receiving edits made to an electronic collaborative word processing document through a network or other electronic medium.

In some embodiments, first edits may occur on a first earlier page of an electronic collaborative word processing document and result in a pagination change. A pagination change may include any alteration to a length of an electronic document, such as by a line of text, a page of text, or multiple pages of text. The pagination change may a result of an addition, deletion, rearrangement, or any other modification to the information in the electronic collaborative word processing document. For example, data and objects in the electronic collaborative word processing document may be arranged in a publication display format that depict the display of data and objects on printed pages, such as the display found in desktop publishing applications or other editing software. Objects and data may be arranged so that pages of data are displayed sequentially, for example, in a vertical or a horizontal arrangement of the display of pages. A pagination change may occur when edits include the addition or arrangement of content in the document that causes certain data and content in the document to move to another page, or to move to another location on the same page. For example, a document may contain paragraph "A" located in the middle of the second page of the document. First edits may occur on the first page of the document that introduce the addition of two additional pages of text. This may result in a pagination change of paragraph "A," which may move from page two to page four in the document. A pagination change is not limited to the movement of objects and data from one page to another and may include movements of objects and data within the same page either by a single line, part of a line, a paragraph, or horizontally within a single line. More broadly, a pagination change may refer to any adjustment in the location of objects or text within the location of a page in the collaborative electronic word processing document.

Some disclosed embodiments may include receiving from a second editor during the common editing period, second edits to an electronic collaborative word processing document. Second edits may include the addition, manipulation, or deletion of objects or data, and may include addition, manipulation, or deletion of text, graphics, tables, images, formatting, highlights, manipulation of fonts, icons, shapes, references, headers, footers, or any other addition, deletion, or manipulation of objects or data within the electronic word processing document as previously discussed. As used herein, second edits refer to edits made in a second instance of the collaborative electronic word processing document. Second edits may occur either earlier in time, later in time, or simultaneously with first edits and are not limited to edits occurring later in time than first edits in the document.

In some embodiments, second edits may occur on a second page of an electronic collaborative word processing document later than a first page. As described herein, objects and data within the electronic collaborative word processing document may be displayed on sequentially arranged pages, for example, in a vertical or a horizontal arrangement of the display of pages. Second edits may occur on a second page in that the second page is arranged sequentially after edits from the first page in the document. A second page may be later than a first page if it occurs anywhere in the sequence of pages after the first edits. In one non-limiting example, second edits in the document may occur on page 4 of the document and first edits may occur on page 2. In this example, the second edits on the second page occur later than the first page in that page 4 is displayed sequentially after page 2. In other embodiments, first and second edits may occur on the same page, with the second edits occurring sequentially after the first edits within the same page. For example, if a second edit occurs lower on a page than a first edit, then the second edit may be considered later than first edits. In some embodiments, second edits may be associated with a block in an electronic collaborative word processing document. As described herein, the electronic collaborative word processing document may organize objects and data into blocks. A block may be any collection of objects or data within the electronic collaborative word processing document, as described herein. For example, the electronic collaborative word processing document may contain one or more title blocks which display formatting text information. Other blocks may include other text portions of the document, such as a sentence, a group of sentences, a paragraph, or a collection of paragraphs, or any grouping of text. Blocks are not limited to text alone, and objects such as charts, graphics, widgets, objects, or tables, or any other component in the document may be recognized as a block.

Some disclosed embodiments may include recognizing an active work location of the second editor. An active work location of an editor may include any portion of the electronic collaborative word processing document displayed in or receiving edits from the editor. For example, a user may be editing a portion of the electronic word processing document using an instance of an editor, and the active work location may correspond to the location of the edits. In another example, a user may be viewing a portion of the document, and the active work location may correspond to the location of the viewport displayed by the editor. In yet another embodiment, there may be multiple active work locations, for example, when a user may be editing one portion of the electronic word processing document while viewing a second portion of the electronic word processing document, such as using multiple viewports or by scrolling away from the edit location. Recognizing the active work location may be performed in various ways and may include any process of determining at least a portion of an electronic collaborative word processing document for display or alteration on a computing device. In some embodiments, the recognition of the active work location may be based on a cursor location in the second instance of the collaborative electronic word processing document. A cursor location may include any indication of a location on a display that represents an intent to interact (e.g., manipulate text, select data objects, view information, activate a link, or any other interaction) with the location of the indication is presented in the display. The cursor location may be displayed visually or may be omitted from display according to preference. A cursor location may be determined by an editing location or by a hovering location. For example, a user may be editing a document at the location of an editing cursor and the system may recognize the cursor as the active work location. In other embodiments, the system may recognize adjacent objects and data around the cursor location as included in the active work location. For example, adjacent letters, words, sentences, or paragraphs near the cursor may be included as part of the active work location depending on certain contexts. In yet another example, a user may use a device (e.g., a mouse) to move a cursor location and hover over a certain portion of a collaborative electronic word processing document without selecting a specific location for editing, such a scrolling location. In other embodiments, the recognition of the active work location may be based on a scrolling location in the second instance of the collaborative electronic word processing document. A scrolling location may include any displayed portion of the collaborative electronic word processing document, which may be displayed independently of the editing cursor location. The system may recognize a location within the viewport as the active work location. A scrolling location may be recognized in various ways. For example, determining a scrolling location may be based on an amount of time a viewport displays a location of the document, based on a distance away from the editing cursor, or based on user preferences.

In yet other embodiments, the recognition of the active work location may be based on a block location in the second instance of the collaborative electronic word processing document. A block location may include a relative or absolute position of a block within an electronic collaborative word processing document. For example, each block within the electronic collaborative word processing document may include a unique block identification ("ID") with associated location data. The associated location data may determine a block's location within the electronic collaborative word processing document. For example, the location data may describe a block's location with respect to other blocks, describe a sequence of blocks for display, or describe a block's intended position within a document based on distances from margins or other blocks or a combination of these factors. The system may recognize that a block is an active work location based on the location of edits or the viewport displayed in the second editor, or any other way based on data received by the editor.

By way of example, FIG. 4, shows active work location 424 indicated by the user's cursor 425 positioned in a text block. Distance 426 may indicate the positioning of the active work area 424 from the edge of the display or viewport. Data associated with the active work location 424 and blocks, such as blocks 420, 422, and 424, may be stored in a repository, such as repository 230-1, so that the system can track the positioning of the active work location 424 and block locations 420, 422, and 424 in relation to a first or second instance of the editor. Location data of the user's cursor 425, or of the users scrolling location may also be stored in a repository. The user's scrolling location may be defined by a collection or grouping of blocks. In the example shown in FIG. 4, the user's scrolling location contains the collection of blocks 422 and 424. When a first user accesses the collaborative electronic word document from their computing device 220-1, the system may record an active work location for the first user and cause the system to display information from the stored collaborative electronic word document at that first active work location to computing device 220-1. Independently, when a second user accesses the collaborative electronic work document from a second computing device 220-2, the system may recognize a second active work location for the second user and cause the second computing device 220-2 to display only the second active work location independently from the display of the first computing device 220-1.

Some disclosed embodiments may include, locking a display associated with the second hardware device. Locking a display may refer to fixing the location of objects and information in a viewport of a hardware device. For example, the location of objects and information depicted on a screen of the second hardware device may shift during operation of an editor. When a display is locked, the location of objects and information depicted on a screen of the second hardware device may remain in a location that does not change, independent of the location of the objects and information in relation to their placement in a document. In some embodiments, locking a display may indicate that objects and information depicted on a screen are fixed at the pixel level. In other embodiments, locking a display may indicate that objects and information depicted on a screen are fixed with respect to a determined measurement taken from the boundaries of the viewport. In yet other embodiments, locking a display may indicate that objects and information depicted on a screen are fixed with respect to one direction but may not be fixed with respect to another direction. For example, a display may depict a block at a location in the document. Locking a display may fix the distance between the first line of the block and a boundary of the display but edits to the block may cause the distance from other lines of the block to the boundary of the display to change. Locking a display is not limited to fixing pixel locations or dimensions to boundaries of the viewport to blocks but may include any fixing of the display with respect to any objects or information within the electronic collaborative word processing document.

In some embodiments, locking a display may suppress a pagination change caused by the first edits received by the second hardware device during a common editing period. A pagination change may be a shift in the location of objects or data from one page in a document to another page based on changes in objects or data on an earlier page, as described previously above. The pagination change may occur as a result of a single user editing a document, or as a result of multiple users editing the document at the same time during a common editing period, as previously discussed above. In an unlocked display, introduction of objects or information at an earlier location in an electronic collaborative word processing document may cause the location of objects and information located on a later page in the document to shift to another page due to the first edits. Pagination changes may be caused by any edits of objects and data at an earlier page in a document, and may include, as non-limiting examples, introduction, modification, or removal of text, formatting, images, objects, comments, redlines, tables, graphs, charts, references, headers, covers, shapes, icons, models, links, bookmarks, headers, footers, text boxes, or any other objects or data. For example, paragraph "A" on page three of a document may shift to page five in the document if two pages of table data are added to the document at a location before paragraph "A." In some embodiments, locking a display to suppress a pagination change may include fixing the location of objects or information to a location within a page of an electronic collaborative word processing document as described herein. For example, a user may be editing text on a third page in an electronic collaborative word processing document using a second hardware device in a common editing period, and another user may introduce two additional pages of text and graphics at a location earlier in the document using a first hardware device. In this example, the system may freeze the location of the text on the third page in a display of the second hardware device and will not adjust the location of this text to a new page based on the edits in an earlier location of the document caused by the first hardware device.

Figure 5:
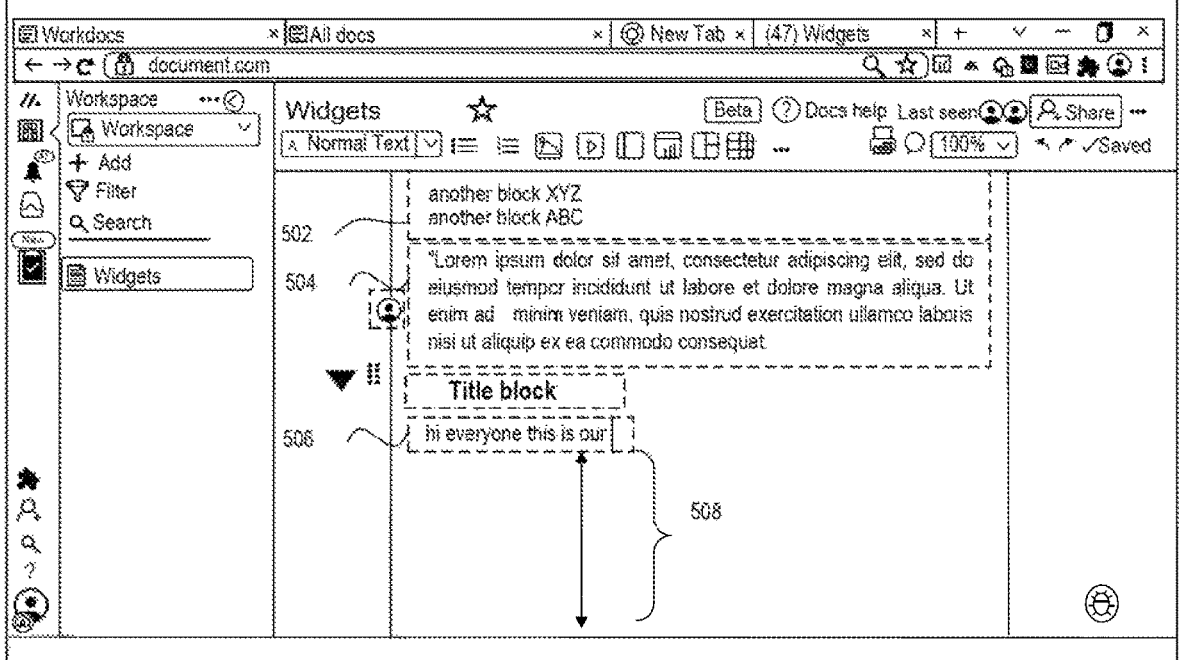
FIG. 5 illustrates an example user interface of a collaborative word processing document with a locked display, consistent with some embodiments of the present disclosure.

By way of example, FIG. 5 depicts an electronic collaborative word processing document with a locked display at an active work location. FIG. 5 is an example of the same interface in FIG. 4 after first and second edits have been made to the document. For example, second edits have been made by a user operating a second hardware device, such as hardware device 220-2 (of FIG. 2), at location 506. Location 506 represents the same active editing location shown in FIG. 4 at 424. A first user operating a different hardware device 220-1 (of FIG. 2) has introduced first edits 504 to the document at a location earlier in the document than the active editing location 506 being edited by the second user on hardware device 220-2. The display shown on hardware device 220-2 is locked in that the vertical distance 508 from the active work location to the edge of the display in FIG. 5 is the same distance as vertical distance 426 in FIG. 1 made prior to the first and second edits. In response to the first user's edits in 504 made on hardware device 220-1, the system has adjusted the location of text earlier in the document shown on hardware device 220-2, such as text in block 502, while the display is locked. While the display is locked, additional edits made by the first user to location 504 on hardware device 220-1 will continue to adjust the location of text earlier in the document shown on hardware device 220-2, such as text block 502, but the location of the active editing area by the second user at 506 will remain fixed with respect to the viewport shown in hardware device 220-2.

Figure 6:
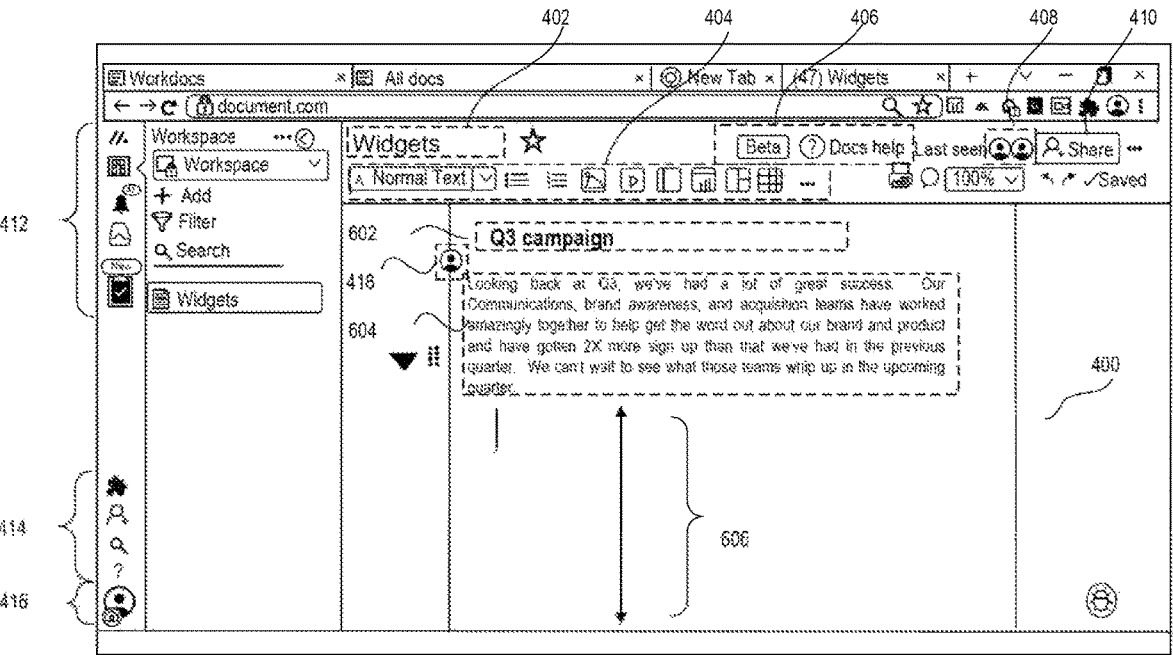
FIG. 6 illustrates another example of a collaborative word processing document with an active work location, consistent with some embodiments of the present disclosure.
Figure 7:
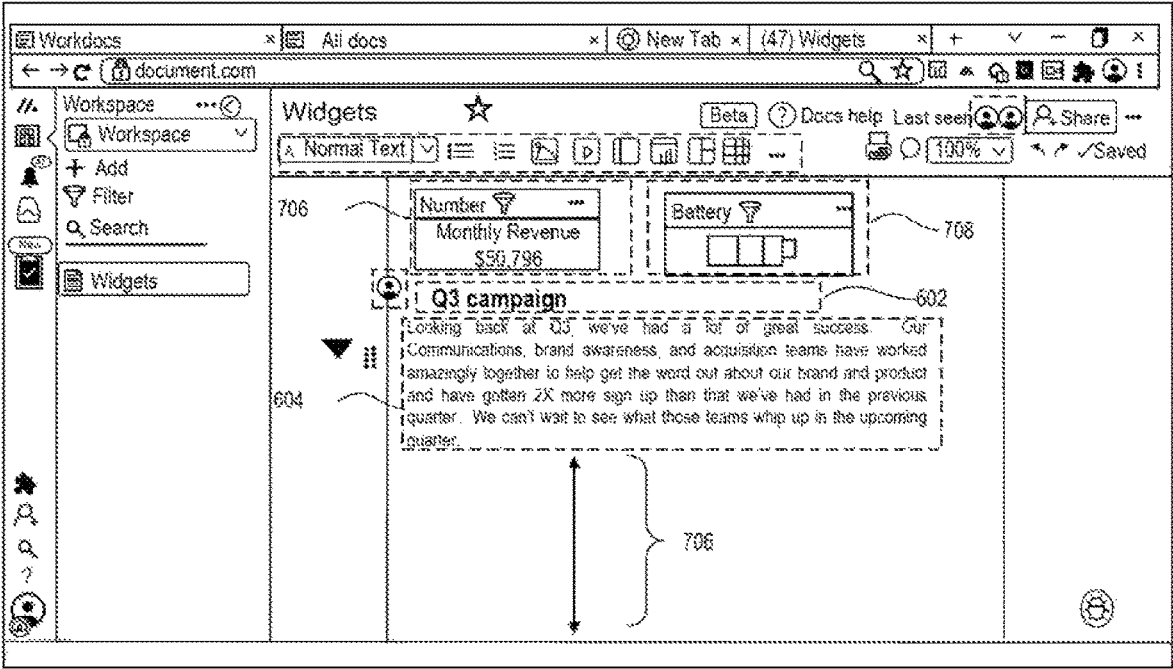
FIG. 7 illustrates another example of a collaborative word processing document with a locked display, consistent with some embodiments of the present disclosure.

FIG. 6 and FIG. 7 depict another example of locking a display. A display may be locked with the introduction of widgets, figures, or charts at an earlier location in the document. For example. FIG. 6 shows an active work location 64 of a user running an editor. FIG. 7 depicts the same editor later in time after a different user has introduced widgets 706 and 708 in the document. As can be seen in FIG. 6 and FIG. 7, the distance 606 from the active work location to the bottom of the editor before the addition of the widgets and the distance 706 from the active work location to the bottom of the editor after the addition of the widgets is constant in a locked display.

In some embodiments, locking the display scrolling associated with the second display may be based on the recognized active work location so as not to interrupt viewing of the active work location. The system may recognize an active work location as described herein and then freeze or lock the display of the active work location at a location on the screen when edits made at an earlier location in the document would otherwise result in a shift in the location of the active work location, as discussed previously. Not interrupting viewing of the active work location may include maintaining the display of the active work location even though other users make alterations to a document. For example, if the active work location is confined to information in a block and the block includes a paragraph, the system may recognize that the paragraph is the active work location and may fix the location of the paragraph in the display. Alternatively, blocks may include header lines, charts, graphs, or widgets or any other objects or information as described herein. As another example, the system may recognize that a block that includes a chart is the active work location and may fix the location of the chart in the display. The system may track the relative arrangement of blocks based on certain data associated with the blocks. For example, each block may retain location data that positions that block in relationship to the location of other blocks within the document. This data may be independent of location data associated with the display of information in the electronic collaborative word processing document. The system may compute or record the relative arrangement of the display of blocks within the document by updating data describing the relative position of the blocks but may not update the location of the block associated with the active work location within the document when the display is fixed. In this way, a second editor can receive edits from a first editor that updates block information, including the relative position data associated with the introduction of new blocks at an earlier location in the document, but allows the second editor to lock the display of the active work location.

In some other embodiments, a lock may remain in place until an active work location is changed in a second editor. The active work location may be changed based on user actions, user preferences, or other determinations by the system. For example, the active work location may be changed upon a user moving the cursor to a second location, scrolling to a new location in the document, editing a different block, an amount of time since the last user input, selecting an icon or toggle associated with the display lock, or any other change in the editing location by the user. When the lock is released, the display may update to reflect a revised location of the active work location based on edits that occurred at an earlier page in the document.

In some embodiments, the system may receive a scroll-up command via a second editor during the common editing period. A scroll-up command may be any input from a user that indicates a user intent to change the viewport to display additional information. For example, a user may roll a mouse wheel, click a scroll bar on a document, or provide input through a keyboard, voice headset, haptic controls, or other user device that indicates a user desire to adjust a display. A scroll commend in general may be any input to indicate a direction in which the system may re-render the viewport to display additional information in any direction in relation to the electronic document being displayed in the viewport. In some embodiments, receipt of a scroll-up command may cause the display associated with the second hardware device to reflect the pagination change caused by the first edits. Reflecting the pagination change caused by the first edits may include updating or re-rendering the display to reflect a revised location of objects and information currently displayed on the second editor to reflect location changes caused by edits that occurred at an earlier page in the document. For example, when a second editor is altering information on page 2 of an electronic collaborative document while a first editor is altering information on page 1 of the same document, if the first editor's alterations adds an additional page of text to add a new page 2 and push the previous page 2 into new page 3, the second editor's viewport of the electronic collaborative document may lock the second editor's display so that a second user of the second editor is not interrupted and displays information on the previous page 2. However, as soon as the second user inputs a scroll-up commend in the second editor, the system may render the second editor's viewport to view the newly added page 2 from the first editor in a seamless manner.

In yet other embodiments, a scroll-up command that causes a second hardware device to reflect the pagination change may include a scroll to a page other than a page currently displayed on a second display. For example, adjustments to the viewing location of less than one page may not cause the system to reflect the pagination change caused by the first edits. In one embodiment, a user may want to view a different part of a page associated with an active work location and may scroll up to another part of the page without changing the viewing page. In this embodiment, the system may not reflect the pagination change caused by first edits on an earlier page. If the user issues a scroll-up command that adjusts the viewing location to a different page than the currently displayed page on the second display, the system may update the display to reflect a revised location of objects and information currently displayed on the second editor to reflect location changes caused by edits that occurred at an earlier page in the document.

FIG. 8 illustrates a block diagram of an example process 800 for managing display interference in an electronic collaborative word processing document. While the block diagram may be described below in connection with certain implementation embodiments presented in other figures, those implementations are provided for illustrative purposes only, and are not intended to serve as a limitation on the block diagram. In some embodiments, the process 800 may be performed by at least one processor (e.g., the processing circuitry 110 in FIG. 1) of a computing device (e.g., the computing device 100 in FIGS. 1 and 2) to perform operations or functions described herein and may be described hereinafter with reference to FIGS. 4 to 7 by way of example. In some embodiments, some aspects of the process 800 may be implemented as software (e.g., program codes or instructions) that are stored in a memory (e.g., the memory portion 122 in FIG. 1) or a non-transitory computer-readable medium. In some embodiments, some aspects of the process 800 may be implemented as hardware (e.g., a specific-purpose circuit). In some embodiments, the process 800 may be implemented as a combination of software and hardware.

FIG. 8 includes process blocks 802 to 816. At block 802, a processing means may access an electronic collaborative word processing document, as discussed previously in the disclosure above.

At block 804, the processing means may present a first instance of the electronic collaborative word processing document in a first editor, as discussed previously in the disclosure above.

At block 806, the processing means may present a second instance of the electronic collaborative word processing document in a second editor, as discussed previously in the disclosure above.

At block 808, the processing means may receive from the first editor during a common editing period, first edits to the electronic collaborative word processing document, as discussed previously in the disclosure above.

At block 810, the processing means may receive from the first editor during a common editing period, second edits to the electronic collaborative word processing document, as discussed previously in the disclosure above.

At block 812, the processing means may, during the common editing period, lock a display associated with the second hardware device to suppress the pagination change caused by the first edits, as discussed previously in the disclosure above.

At block 814, the processing means may receive a scroll-up command via the second editor during the common editing period, as discussed previously in the disclosure above.

At block 816, the processing means may update the display to reflect the pagination change caused by the first edits, as discussed previously in the disclosure above.

FIG. 9 illustrates a block diagram of an example process 900 for managing display interference in an electronic collaborative word processing document. While the block diagram may be described below in connection with certain implementation embodiments presented in other figures, those implementations are provided for illustrative purposes only, and are not intended to serve as a limitation on the block diagram. In some embodiments, the process 900 may be performed by at least one processor (e.g., the processing circuitry 110 in FIG. 1) of a computing device (e.g., the computing device 100 in FIGS. 1 and 2) to perform operations or functions described herein and may be described hereinafter with reference to FIGS. 4 to 7 by way of example. In some embodiments, some aspects of the process 900 may be implemented as software (e.g., program codes or instructions) that are stored in a memory (e.g., the memory portion 122 in FIG. 1) or a non-transitory computer-readable medium. In some embodiments, some aspects of the process 900 may be implemented as hardware (e.g., a specific-purpose circuit). In some embodiments, the process 900 may be implemented as a combination of software and hardware.

FIG. 9 includes process blocks 902 to 908. At block 902, a processing means may receive via a communications interface during a common editing period, first edits from a first editor accessing a first instance of the electronic collaborative document via a first hardware device, wherein the first edits occur on a first earlier page of the electronic collaborative word processing document and result in a pagination change, as discussed previously in the disclosure above.

At block 904, the processing means may receive during the common editing period, second edits from a second editor accessing a second instance of the electronic collaborative document via a second hardware device, as discussed previously in the disclosure above.

At block 908, the processing means may, during the common editing period, lock a display associated with the second hardware device to suppress the pagination change caused by the first edits received via the communications interface, as discussed previously in the disclosure above.

At block 908, the processing means may, upon receipt of a scroll-up command via the second editor during the common editing period, cause the display associated with the second hardware device to reflect the pagination change caused by the first edits, as discussed previously in the disclosure above.

In a collaborative word processing document, multiple users may simultaneously edit a single document in real time, near real time, or asynchronously. Problems may arise when certain edits made by a user in a collaborative word processing document are visible to or shared with all other users in the collaborative word processing document. In some instances, a user may input data into an electronic collaborative word processing document that the user does not intend to share with all other users of the collaborative word processing document. For example, a user may input confidential salary data in a portion of a collaborative word processing document that the user wishes to hide from some or all other users in the same document. In other instances, a user may wish to mask or hide the user's edits to one or more portions of a collaborative word processing document for a period of time. For example, a user may wish to make several private revisions, or drafts, to a portion of a collaborative word processing document, and then share the user's final edits with the other users in the collaborative word processing document at a later time. More generally, users editing a collaborative word processing document may wish to control the timing and visibility to some or all other users of certain edits that are shared within the collaborative word processing document. Therefore, there is a need for unconventional innovations for enabling dual mode editing in collaborative documents to enable private changes.

Such unconventional approaches may enable computer systems to implement functions to improve the efficiency of electronic collaborative word processing documents. By using unique and unconventional methods of classifying and storing data associated with a collaborative word processing document or by grouping, storing, and displaying histories and iterations of editable segments of the collaborative word processing document into unique and discrete elements with access restriction controls, a system may provide dual mode editing in collaborative documents to enable private changes to increase the efficiency of electronic collaborative word processing documents. Various embodiments of the present disclosure describe unconventional systems, methods, and computer readable media for enabling dual mode editing in collaborative documents to enable private changes in an electronic collaborative word processing document. Various embodiments of the present disclosure may include at least one processor configured to access an electronic collaborative document in which a first editor and at least one second editor are enabled to simultaneously edit and view each other's edits to the electronic collaborative document, and output first display signals for presenting an interface on a display of the first editor, the interface including a toggle enabling the first editor to switch between a collaborative mode and a private mode. The at least one processor may be configured to receive from the first editor operating in the collaborative mode, first edits to the electronic collaborative document and to output second display signals to the first editor and the at least one second editor, the second display signals reflecting the first edits made by the first editor. The at least one processor may be configured to receive from the first editor interacting with the interface, a private mode change signal reflecting a request to change from the collaborative mode to the private mode, and in response to the first mode change signal, initiate in connection with the electronic collaborative document the private mode for the first editor. The at least one processor may be configured to, in the private mode, receive from the first editor, second edits to the electronic collaborative document, and in response to the second edits, output third display signals to the first editor while withholding the third display signals from the at least one second editor, such that the second edits are enabled to appear on a display of the first editor and are prevented from appearing on at least one display of the at least one second editor.

Thus, the various embodiments in the present disclosure describe at least a technological solution, based on improvements to operations of computer systems and platforms, to the technical challenge of managing display interference caused by simultaneous edits to an electronic collaborative word processing document.

Some disclosed embodiments may involve systems, methods, and computer readable media for enabling dual mode editing in collaborative documents to enable private changes. Enabling dual mode editing may refer to presenting an interactable interface with the ability to provide two independent modes of making changes to an electronic document. In one mode, changes made in an electronic collaborative word processing document may be public changes and may also be known as collaborative mode. A public change may include any edit to an electronic collaborative document that may be shared with or accessible to all users (or a designated group of users) in the electronic collaborative document in real-time or near-real time. Alternatively, a user may, through dual mode editing, enable private changes. Enabling a private change may include providing options to a user on an associated computing device to make any edit to an electronic collaborative document that is not shared with all other users in real-time, or not shared to at least some users who may have access to an electronic collaborative document. Dual mode editing to enable private changes may operate in various ways. For example, in collaborative mode, all of a user's changes may be shared and displayed with all other users accessing an electronic collaborative document. When in private mode, a user may designate edits to a portion of an electronic collaborative document to be visible to a subset of all users who have access to the collaborative document. In another example, some or all of a user's edits may not be visible to other users with access to an electronic collaborative document until the user signals that the edits should be visible to other users. More generally, dual mode editing to enable private changes allows a user to make any edit to an electronic collaborative document while restricting the timing or audience of the user's edits.

Dual mode editing to enable private changes may be enabled in electronic collaborative documents. A collaborative document may include any electronic file that may be read by a computer program that provides for the input, editing, formatting, display, and output of text, graphics, widgets, data, objects, tables, or other elements typically used in computer desktop publishing applications. An electronic collaborative document may be stored in one or more repositories connected to a network accessible by one or more users via at least one associated computing device. In one embodiment, one or more users may simultaneously edit an electronic collaborative document, with all users' edits displaying in real-time or near real-time within the same collaborative document file. The one or more users may access the electronic collaborative document through one or more user devices connected to a network. An electronic collaborative document may include graphical user interface elements enabled to support the input, display, and management of multiple edits made by multiple users operating simultaneously within the same document. Though this disclosure subsequently refers to electronic collaborative word processing documents, the systems, methods, and techniques disclosed herein are not limited to word processing documents and may be adapted for use in other productivity applications such as documents, presentations, worksheets, databases, charts, graphs, digital paintings, electronic music and digital video or any other application software used for producing information.

FIG. 3 is an exemplary embodiment of a presentation of an electronic collaborative word processing document 301 via an editing interface or editor 300. Though an electronic collaborative word processing document is depicted in this example, solutions and techniques are not limited to electronic collaborative word processing documents and may be included in any other types of electronic collaborative documents described herein. The editor 300 may include any user interface components 302 through 312 to assist with input or modification of information in an electronic collaborative word processing document 301. For example, editor 300 may include an indication of an entity 312, which may include at least one individual or group of individuals associated with an account for accessing the electronic collaborative word processing document. User interface components may provide the ability to format a title 302 of the electronic collaborative word processing document, select a view 304, perform a lookup for additional features 306, view an indication of other entities 308 accessing the electronic collaborative word processing document at a certain time (e.g., at the same time or at a recorded previous time), and configure permission access 310 to the electronic collaborative word processing document. The electronic collaborative word processing document 301 may include information that may be organized into blocks as previously discussed. For example, a block 320 may itself include one or more blocks of information. Each block may have similar or different configurations or formats according to a default or according to user preferences. For example, block 322 may be a "Title Block" configured to include text identifying a title of the document, and may also contain, embed, or otherwise link to metadata associated with the title. A block may be pre-configured to display information in a particular format (e.g., in bold font). Other blocks in the same electronic collaborative word processing document 301, such as compound block 320 or input block 324 may be configured differently from title block 322. As a user inputs information into a block, either via input block 324 or a previously entered block, the platform may provide an indication of the entity 318 responsible for inputting or altering the information. The entity responsible for inputting or altering the information in the electronic collaborative word processing document may include any entity accessing the document, such as an author of the document or any other collaborator who has permission to access the document.

Some aspects of the present disclosure may involve accessing an electronic collaborative document. An electronic collaborative document may be stored in one or more data repositories and the document may be retrieved by one or more users for downloading, receiving, processing, editing, or viewing, the electronic collaborative document. An electronic collaborative document may be accessed by a user using a user device through a network. Accessing an electronic collaborative document may involve retrieving data through any electrical medium such as one or more signals, instructions, operations, functions, databases, memories, hard drives, private data networks, virtual private networks, Wi-Fi networks, LAN or WAN networks, Ethernet cables, coaxial cables, twisted pair cables, fiber optics, public switched telephone networks, wireless cellular networks, BLUETOOTH™, BLUETOOTH LE™ (BLE), Wi-Fi, near field communications (NFC), or any other suitable communication method that provide a medium for exchanging data. In some embodiments, accessing information may include adding, editing, deleting, re-arranging, or otherwise modifying information directly or indirectly from the network. A user may access the electronic collaborative document using a user device, which may include a computer, laptop, smartphone, tablet, VR headset, smart watch, or any other electronic display device capable of receiving and sending data. In some embodiments, accessing the electronic document may include retrieving the electronic document from a web browser cache. Additionally or alternatively, accessing the electronic document may include connecting with a live data stream of the electronic word processing document from a remote source. In some embodiments, accessing the electronic document may include logging into an account having a permission to access the document. For example, accessing the electronic document may be achieved by interacting with an indication associated with the electronic word processing document, such as an icon or file name, which may cause the system to retrieve (e.g., from a storage medium) a particular electronic document associated with the indication.

For example, an electronic collaborative document may be stored in repository 230-1 as shown in FIG. 2. Repository 230-1 may be configured to store software, files, or code, such as electronic collaborative documents developed using computing device 100 or user device 220-1. Repository 230-1 may further be accessed by computing device 100, user device 220-1, or other components of system 200 for downloading, receiving, processing, editing, or viewing, the electronic collaborative document. Repository 230-1 may be any suitable combination of data storage devices, which may optionally include any type or combination of slave databases, load balancers, dummy servers, firewalls, back-up databases, and/or any other desired database components. In some embodiments, repository 230-1 may be employed as a cloud service, such as a Software as a Service (SaaS) system, a Platform as a Service (PaaS), or Infrastructure as a Service (IaaS) system. For example, repository 230-1 may be based on infrastructure of services of Amazon Web Services™ (AWS), Microsoft Azure™, Google Cloud Platform™, Cisco Metapod™, Joyent™, vmWare™, or other cloud computing providers. Repository 230-1 may include other commercial file sharing services, such as Dropbox™, Google Docs™, or iCloud™. In some embodiments, repository 230-1 may be a remote storage location, such as a network drive or server in communication with network 210. In other embodiments repository 230-1 may also be a local storage device, such as local memory of one or more computing devices (e.g., computing device 100) in a distributed computing environment.

In some embodiments, a first editor and at least one second editor may be enabled to simultaneously edit and view each other's edits to the electronic collaborative document. A first editor may be a user interface that provides for the input, editing, formatting, display, and output of text, graphics, widgets, objects, tables, or other elements in an electronic word processing document or any other electronic collaborative document. A first editor may receive user input via a keyboard, mouse, microphone, digital camera, scanner, voice sensing, webcam, biometric device, stylus, haptic devices, or any other input device capable of transmitting input data. In one embodiment, a user accesses an electronic collaborative document using a computer and views the document in an editor that receives text and other input via a mouse and keyboard. Another instance of the electronic collaborative document may be presented via a second hardware device running a second editor, in a similar manner to the first hardware device and the first editor described herein. Any number of hardware devices may run an editor to access another instance of the electronic collaborative word processing document.

A first editor and at least one second editor may be enabled to simultaneously edit and view each other's edits to an electronic collaborative document. Enabling simultaneous editing and viewing of other's edits to an electronic collaborative document may include providing the ability to access an electronic collaborative document to multiple users at the same time such that information in the electronic collaborative document may be presented to the multiple users and authorize the multiple users to alter information presented to them. For example, edits made by a user in the first or the second instance of the electronic collaborative document may be incorporated into other instances of the electronic collaborative document in real time. In some embodiments, the first instance and the second instance of the electronic collaborative document may share a common viewport displaying some of the same data and information in both the first and second instances of the document. Edits made in the first or second instance may be demarcated by user identification indicators in the first and second instance. User identification indicators may include a graphic, a user ID indicator, a color, a font, or any other differentiator that indicates the source of an edit in an instance of the electronic collaborative document.

Figure 10:
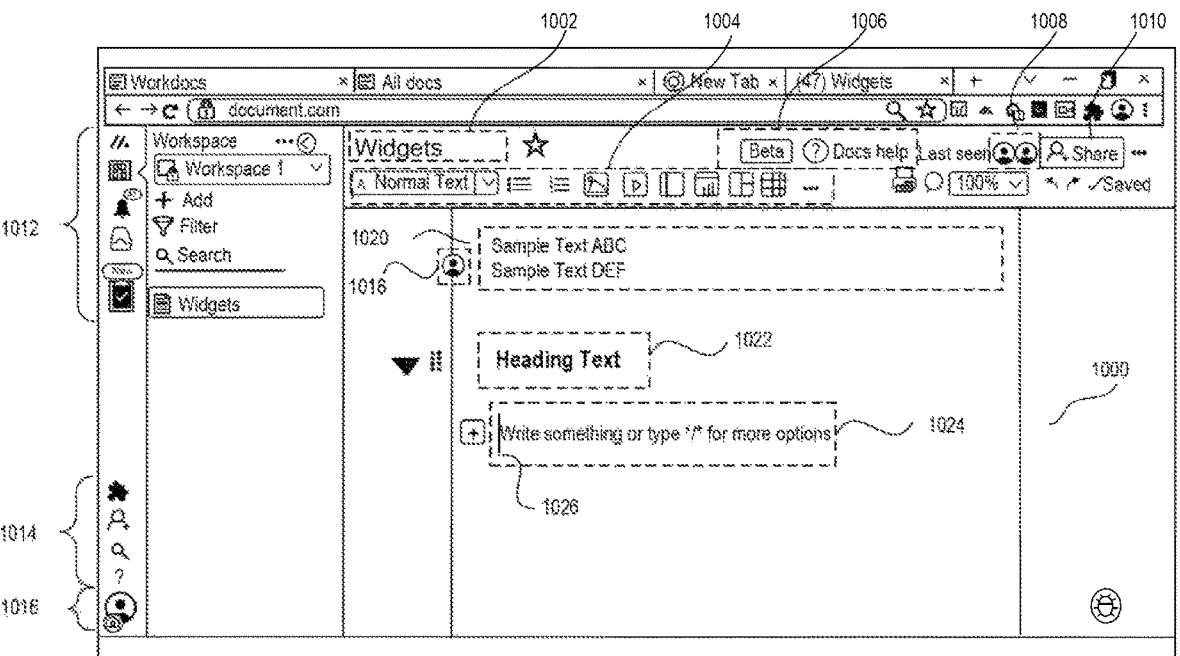
FIG. 10 illustrates an exemplary editor for an electronic collaborative word processing document operating in collaborative mode, consistent with some embodiments of the present disclosure.

By way of example, FIG. 10 illustrates an electronic collaborative document (e.g., an electronic collaborative word processing document) presented within an editor 1000 operating in collaborative mode. In some embodiments, editor 1000 may be displayed by a computing device (e.g., the computing device 100 illustrated in FIG. 1), software running thereon, or any other projecting device ((e.g., projector, AR or YR lens, or any other display device) as previously discussed). Editor 1000 may include various tools for displaying information associated with the document of for editing the document. For example, editor 1000 may display a title 1002 indicating the title of the document. Formatting bar 1004 may depict various tools to adjust formatting of information or objects within the document. Help bar 1006 may be included which may provide hyperlinks to information about various features of the editor 1000. Share button 1010 may be included to invite additional users to edit another instance of the collaborative electronic word processing document. Editor 1000 may include tool bar 1012 and interface bar 1014. Editor 1000 may indicate the that multiple users are accessing an electronic collaborative document through the display of user indicator, such as user display indicator 1008 which indicates two users are running an instance of the electronic collaborative document. Editor 1000 may include current user indicator 1016. Current user indicator 1016 may indicate the identification of the user running the displayed instance of the collaborative document. In some embodiments, the objects and information displayed for editing may be controlled by the current user shown in 1016 in each instance of the electronic collaborative document. For example, FIG. 10 may depict an editing location that is actively edited by the current user, such as editing location 1024 indicated by cursor 1026. A second user, indicated by icon 1018, is actively editing in another instance of the electronic collaborative document paragraph block 1020. With operating in collaborative mode, edits made by the first user in the first editor are immediately displayed in the editor viewed by the second user, and vice versa. For instance, any information or data added at the active work location 1024 will be visible to the second user, and any information added by the second user to paragraph block 1020 will be visible in editor 1000. Future edits to additional fields, such as title block 1022 will also be visible in both editors. The first user and the second user may correspond to users operating one or more user devices shown in FIG. 2. For example, first user may operate user device 220-1 (of FIG. 2) to view editor 1000 (of FIG. 10). Second user may operate the second editor through user device 220-2 (of FIG. 2). Additional users may further access the electronic collaborative document using additional user devices.

Some aspects of the present disclosure may involve outputting first display signals for presenting an interface on a display of the first editor. A display signal may be an electronic instruction that transmits display information. A display signal may be any phenomena capable of transmitting electronic display information and may include a time varying voltage, current, or electromagnetic wave or any other method of transmitting data through an electrical medium. Outputting a display signal may include transmitting a signal containing instructions to present an interface on a display of a first editor. A first display signal may represent a display signal that may be transmitted at a certain period of time before subsequent display signals or before toggling a change in the dual mode. Presenting an interface on a display of a first editor may include displaying a visualization with activatable elements that a user may interact with and provide input on a user device, which may include a computer, laptop, smartphone, tablet, VR headset, smart watch, or any other electronic display device capable of receiving and sending data. An interface may display data and information associated with the editor and the collaborative electronic document. The interface may receive user input via a keyboard, mouse, microphone, digital camera, scanner, voice sensing, webcam, biometric device, stylus, haptic devices, or any other input device capable of transmitting input data. In one embodiment, presenting an interface on a display of a first editor may include a user accessing an electronic collaborative word processing document using a computer and viewing the document in an editor that receives text and other input via a mouse and keyboard.

In some embodiments, an interface may include a toggle enabling a first editor to switch between a collaborative mode and a private mode. As described above, collaborative mode may be a manner of displaying an electronic collaborative document where changes made by one or more users are public changes. A public change is any edit to an electronic collaborative document that is immediately shared with all users in the electronic collaborative document in real-time. A private mode may be a manner of displaying an electronic collaborative document where edits made by a user to an electronic collaborative document is not shared with all other users in real-time. As described herein, private mode may operate in various ways. For example, a user may designate edits to a portion of an electronic collaborative document to be visible to a subset of all users who have access to the collaborative document. In another example, some or all of a user's edits may not be visible to other users with access to an electronic collaborative document until the user signals toggles back to collaborative mode. More generally, private mode allows a user to make any edit to an electronic collaborative document while restricting the visibility of the user's edits to other users viewing other instances of an electronic collaborative document for a period of time.

In some embodiments, the interface may switch between a collaborative mode and a private mode via a toggle. A toggle may be any activatable graphical user interface element that enables a change between one state to another state. For example, a toggle may be a button or other icon in a user interface that can be selected by a user. In other embodiments, the toggle is presented outside of the interface in an HTML hyperlink or file path. For example, the system may generate a unique hyperlink for an instance of an electronic collaborative document with a selection between collaborative mode and private mode pre-enabled. When a user selects the hyperlink, an interface on a display of an editor may be displayed in collaborative mode or private mode as indicated in the instructions in the hyperlink. A toggle enabling the first editor to switch between a collaborative mode and a private mode may include any activatable element on an interface that may send instructions to a processor to operate in a collaborative mode, to operate in a private mode, or to switch from an actively operating collaborative mode to private mode and vice versa.

Some aspects of the present disclosure may involve receiving from a first editor operating in the collaborative mode, first edits to the electronic collaborative document. An edit to an electronic collaborative document may include the addition, manipulation, or deletion of objects or data, and may include addition, manipulation, or deletion of text, graphics, tables, images, formatting, highlights, manipulation of fonts, icons, shapes, references, headers, footers, or any other addition, deletion, or manipulation of objects or any other data within the electronic collaborative document. Receiving the first edits may include the system receiving an edit request from a computing device associated with a user. The request may be transmitted over a network to a repository where the electronic collaborative document is stored. At least one processor may then perform a lookup of permission settings to confirm whether the computing device has authorization to make the edit. In a situation where authorization is confirmed, the system may then implement and store the edit with the electronic collaborative document such that any other computing devices accessing the document may retrieve the document with the implemented change.

Some embodiments may involve outputting second display signals to a first editor and at least one second editor, the second display signals reflecting first edits made by the first editor. A second display signal may be a display signal that is made at a later time than a first display signal, which may be output and transmitted to cause a rendering of information as discussed previously above. The second display signal may reflect first edits made by the first editor. As described herein, while in collaborative mode, an edit made by a user may be immediately shared with all other users operating instances of the electronic collaborative document in additional editors in real-time. Once a user makes first edits in an interface of a first editor, second display signals may be transmitted to the first and second editor reflecting the changes, resulting in the edits being visible in both the first and second editors to each user. Second display signals are not limited to transmission to a first and second editor, but may also include transmission to any number of editors accessing the electronic collaborative document.

Some aspects of the present disclosure may involve receiving from a first editor interacting with an interface, a private mode change signal reflecting a request to change from a collaborative mode to a private mode. A private mode change signal may be any electronic communications instruction from an editor indicating an intent to enable private mode operation from a collaborate mode operation. A private mode change signal may be indicated by user input via a keyboard, mouse, microphone, digital camera, scanner, voice sensing, webcam, biometric device, stylus, haptic devices, or any other input device capable of transmitting input data, which may then be received by at least one processor to carry out the associated instructions. In some embodiments, the private mode change signal may be generated by a user selecting a toggle in a graphical user interface.

Some embodiments may include, in response to a first mode change signal, initiating in connection with an electronic collaborative document a private mode for the first editor. Initiating the private mode for the first editor in connection with an electronic collaborative document may include causing some or all of the edits made in the first editor associated with a first editor to be withheld from display in other instances of the collaborative electronic document in other editors. Private mode may be initiated for all or part of an electronic collaborative document. For example, initiating private mode may cause all changes made in the first editor to be visible in the first editor only and not be visible in other instances of the collaborative electronic document in the second editor or any other editor. In some embodiments, private mode may be initiated in a portion of the collaborative electronic document. As described herein, collaborative electronic documents may be organized into one or more blocks of information. Private mode may be enabled for one or more blocks as designated by the user through the editor. In this scenario, changes made to blocks via the first editor that have private mode initiated will not display in other instances of the electronic collaborative word processing document, and changes made to blocks where private mode is not initiated changes will continue to display edits made by the first editor in real time.

Figure 11:
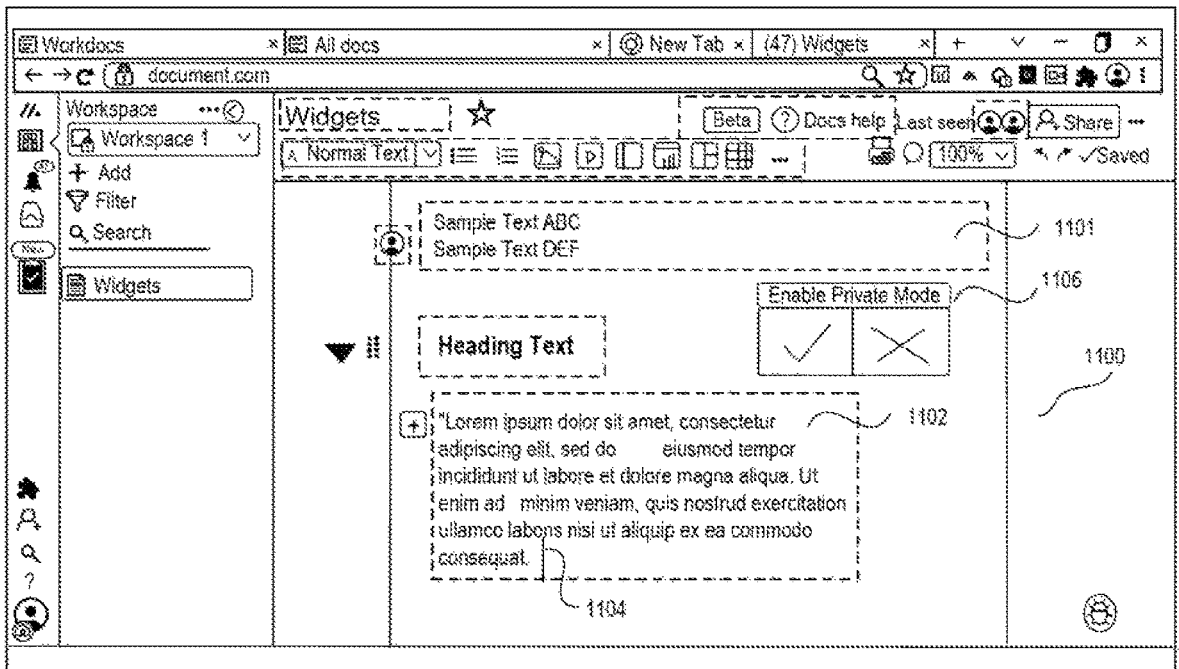
FIG. 11 illustrates an exemplary editor for an electronic collaborative word processing document with an option for enabling dual mode editing to enable private changes displayed, consistent with some embodiments of the present disclosure.

By way of example, FIG. 11 depicts an exemplary editor 1100 for an electronic collaborative document with an option for enabling dual mode editing to enable private changes displayed. Editor 1100 may include private mode change toggle 1106 which may cause a private mode change signal to be transmitted as described herein. Once editor 1100 activates the private mode change toggle 1106 via a user input, the private mode for the first editor may be initiated.

Some aspects of the present disclosure may involve, in a private mode, receiving from a first editor, second edits to an electronic collaborative document. Second edits may include the addition, manipulation, or deletion of objects or data, and may include addition, manipulation, or deletion of text, graphics, tables, images, formatting, highlights, manipulation of fonts, icons, shapes, references, headers, footers, or any other addition, deletion, or manipulation of objects or data within the electronic collaborative document as previously discussed. As used herein, second edits may refer to edits made in a second instance of the collaborative electronic word processing document while private mode is enabled. Second edits may occur either earlier in time, later in time, or simultaneously with first edits and are not limited to edits occurring later in time than first edits in the document. For example, a user may toggle between collaborative mode and private mode multiple times. In this example, all edits made while operating in private mode may be considered second edits, even if the edits were made before or after first edits made while the editor is in collaborative mode.

Some aspects of the present disclosure may involve, in response to second edits, outputting third display signals to a first editor while withholding third display signals from at least one second editor. A third display signal may be a display signal that contains data for second edits that may be transmitted to cause a presentation of the second edits, consistent with the earlier discussion. Withholding a display signal may include not transmitting the display signal so that an editor does not receive information associated with the display signal. The processor may transmit the third display signal with second edits made by the first editor to a display (e.g., the first editor may be re-rendered to include the second edits in a presentation) while the processor may not transmit or withhold the third display signal to the second editor (e.g., resulting in the second editor to not re-render with the second edits. The third display signal may be differentiated between the first and second display signals in that the third display signal contains second edits made by an editor while private mode is enabled. Outputting third display signals to the first editor while withholding the third display signals from the at least one second editor may enable second edits to appear on a display of the first editor and prevent second edits from appearing on at least one display of the at least one second editor. Third display signals that are unique from first or second display signals may be transmitted containing instructions to display the second edits. The third display signals may be selectively transmitted some but not all editors. For example, a user operating a first editor may add text data to a document after enabling private mode. Upon receipt of third display signals, the user's text will display in the editor operated by the user (e.g., second edits may appear on a display of the first editor). When private mode editing is enabled, the third display signals may be withheld from the second editor, which means the second edits may not display in the second editor (e.g., second edits are prevented from appearing on at least one display of at least one second editor). By enabling private mode editing in part or all of a document, the user operating the first editor designates which editors receive third display signals containing second edits and designates which editors do not receive third display signals and continue to receive second display signals instead.

By way of example and returning to FIG. 11, editor 1100 may include first edits made in collaborative mode that are visible to all users accessing the electronic collaborative document. For example, text block 1101 includes first edits made by editor 1100 that are displayed in editor 1100 and in other editors accessing the electronic collaborative document. Text block 1102 displays edits made in editor 1100 in private mode. Text block 1102 is displayed in editor 1100 but not in any other editors viewing the same electronic collaborative document. Additional edits made at cursor 1104 while private mode is enabled may not be displayed in other editors viewing the same electronic collaborative document until collaborative mode is enabled.

Some aspects of the present disclosure may involve receiving from a first editor interacting with an interface, a collaborative mode change signal reflecting a request to change from a private mode to a collaborative mode. A collaborative mode change signal may be any electronic communications instruction from the editor indicating an intent to enable collaborative mode operations. A collaborative mode change signal may be indicated by user input via a keyboard, mouse, microphone, digital camera, scanner, voice sensing, webcam, biometric device, stylus, haptic devices, or any other input device capable of transmitting input data. In some embodiments, the collaborative mode change signal may be generated by a user selecting a toggle in a graphical user interface. In response to receipt of the collaborative mode change signal, subsequent edits made by the first editor may be enabled to be viewed by the at least one second editor. A subsequent edit may include an edit made by the first editor after receipt of the collaborative mode change signal. When edits are made by a first editor in collaborative mode, these edits may be immediately shared in real time to all other users and rendered on associated displays of the users accessing the collaborative electronic document. In some embodiments, the collaborative mode change signal may be toggled for the entire document. In this embodiment, all subsequent edits made to the document in collaborative mode may be displayed in other editors viewing other instances of the electronic document. In other embodiments, the collaborative mode change signal may be applied to one or more portions of a document. In this embodiment, only subsequent edits to certain portions of the electronic collaborative document may be displayed to all other editors in real time, while other portions of the electronic collaborative document remain in private mode. In some embodiments, a collaborative mode change signal may be toggled with respect to one or more blocks and may operate at the block level.

Some aspects of the present disclosure may involve segregating second edits made in private mode, such that upon return to a collaborative mode, viewing of the second edits are withheld from at least one second editor. Segregating second edits made in private mode may involve a method of saving and storing data that independently tracks and stores data associated with second edits in a manner that does not transmit the stored data until additional instructions are received to release the segregated second edits to particular editors. Data indicating that the edits were made in private mode may be stored as a property of the document, and in some embodiments, may be stored as a property of each individual block in the document. For example, a first editor may be enabled in private mode and may make second edits in private mode to one or more blocks of an electronic document. These edits may be initially withheld from display to other instances of the electronic document. Continuing with the example, the editor may close the document and reopen it at a later time and toggle collaborative mode. The second edits made to the one or more blocks may be displayed in the first editor but may not be displayed in the second editor or other editors because the second edits have been segregated when they were made in private mode. More generally, segregating edits made in private mode may refer to any method of data manipulation and storage that tracks the state of the dual mode at the of the editor at the time the second edits are made.

Some aspects of the present disclosure may involve receiving from a first editor a release signal, and in response thereto, enabling at least one second editor to view the second edits. Receiving a release signal from an editor may include any electronic communications instruction from the editor that transmits a user desire to publish second edits to the second editor. Enabling an editor to view edits may include transmitting a display signal to a particular computing device associated with an editor to cause information associated with particular edits to be rendered on a screen associated with the editor. As previously discussed, an editor may utilize both a collaborative mode and a private mode when editing an electronic document. Edits made in the electronic document while operating in collaborative mode may be shared and displayed in real time to all other users. Edits made in private mode may not be shared with all other users in the electronic collaborative document. In some embodiments, switching between collaborative mode and private mode may not publish the edits made to the electronic collaborative document that were made in private mode. Instead, a release signal may operate to publish edits made in private mode to the other users in the electronic collaborative document. An editor may transmit a release signal in response to various inputs. For example, the editor may include a button, toggle, switch, or other GUI element that releases all second edits made to an electronic collaborative document. In another embodiment, release signals may be transmitted that correspond to a portion of the electronic document. For example, a release signal may be transmitted that applies to one or more blocks in the electronic document. A user may indicate a desire to transmit a release signal by selecting a block and selecting a release icon. As an illustrative example, the editor may allow a user to right click on a block and select an option to release second edits in the block. In other embodiments, release signals may trigger automatically in accordance with various user settings. For example, user settings may cause release signals to be transmitted based on pre-determined intervals of time, based on certain users with superior administrative privileges viewing the document in another editor, or based on a predetermined action performed by the user, such as closing the editor. In some embodiments, enabling the at least one second editor to view the second edits may include displaying to the at least one second editor, in association with the second edits, an identity of the first editor. An identity of the first editor may be associated with the user operating the editor and may include any indicator (e.g., alphanumeric, graphical, or combination thereof). For example, a user operating a first editor may have a user account with personal identifying information, such as a name, username, photo, employee ID, or any other personal information. Displaying to the at least on second editor an identity of the first editor may include causing a presentation of an indication of the user account associated with the first editor. In some embodiments, the identity of the first editor may be displayed with an icon that is visible in the second editor. The icon may contain personally identifying information such as a name, initials, a photo, or other data. In some embodiments, the identity of the first editor may be displayed to the second editor in association with the second edits. Displaying an identity in association with second edits may include rendering a visual indicator of the identity of the first editor in or near the second edits in a co-presentation, or in response to an interaction (e.g., a cursor hover over the second edits). For example, the visual link may include an icon, a font, a highlight, a graphic, a color of text or any other data property identifying the identity of the first editor placed adjacent or in the edits in the display. In another example, the identity of the first editor may be displayed in response to an input in the second editor. For instance, the user operating the second editor may receive display information indicating second edits displayed in a color. Upon selecting the edits or placing a cursor near the edits, a popup may be displayed that identifies the identity of the first editor using a visual indicator as described herein.

In some embodiments, in response to receiving a release signal, at least one processor may compare second edits made in private mode to original text in an electronic collaborative document, identify differences based on the comparison, and present the differences in connection with text of the electronic collaborative document to thereby indicate changes originally made during private mode. Original text may include any or all text or data in an electronic collaborative document that the document contained prior to second edits made by the first editor. The processor may identify the second edits made in private mode by segregating the data associated with second edits as described herein. Comparing second edits to original text in an electronic collaborative document may include a calculation of differences and/or similarities between data contained in the second edits to the original text in an electronic document. Identifying differences between the original text and data in the electronic collaborative document and the second edits may include analyzing the differences in objects, text, and other data between the original version and the second edits after a comparison and associating a tag with the different data in the repository so that the processor may later locate the data that is different. Differences may include the addition, deletion, or modification of text, objects, tables, pictures, fonts, colors, object properties, graphics, visual or audio data, or any other manipulation of data in the electronic document made in private mode. Presenting the differences in connection with text of the electronic collaborative document to thereby indicate changes originally made during private mode may include rendering an indication that certain text, objects, or data have been changed as compared to the original version. In one embodiment, changes to text are presented by displaying additional or deleted text in a particular color, font, or format. For example, additional text may be displayed in red with underlines and deleted text may be indicated by a strikethrough. In other embodiments, changes to the document may be indicated by highlighting, font changes, imbedded objects or pop-up indicators, or any other method capable of visually distinguishing types of data in an electronic collaborative document. In some embodiments, the color associated with the changes to text or other objects corresponds with the identity of the user who made the second edits.

Some aspects of the present disclosure may include receiving from a first editor, in association with a text block, a retroactive privatization signal, and upon receipt of the retroactive privatization signal, withhold the text block from display to at least one second editor. A retroactive privatization signal may be a data signal that indicates a portion of text that should be withheld from display to a second editor or any additional editors. A retroactive privatization signal may function to transfer a portion or all of a document to private mode, thereby allowing the first editor to view and manipulate objects, text, or data in the portion of the document in private mode. Receiving a retroactive privatization signal may be associated with a text block which may involve obtaining instructions to retroactively mark a particular region of text as private. For example, a user running a first editor may wish to hide certain portions of a document containing confidential financial information from view of one or all other users. The user may select the block or blocks of text data containing the confidential information and transmit a privatization signal which causes the display signals being transmitted to the other users to not display the blocks containing confidential financial information. Any block or blocks of data may be designated associated with a retroactive privatization signal, which may transmit the objects, text, and data inside the block or blocks to private mode (e.g., causing a re-rendering of the displays of the users to omit the data designated to be retroactively private). Withholding the text block from display to a second editor may include causing a re-rendering of a display of the second editor to delete, omit, obscure, or reduce access to information marked as private. A retroactive privatization signal may be disabled by an editor sending a release signal.

Some aspects of the present disclosure may include receiving from a first editor operating in private mode an exemption signal for at least one particular editor, to thereby enable the at least one particular editor to view the second edits. Receiving an exemption signal may include obtaining an electronic transmittal of data or instructions from a computing device associated with a user interacting with an editor to enable a particular editor to receive display signals causing a display to show the changes made in private mode by the first editor. For example, a user operating the first editor may wish to make private edits in private mode and may wish to share the edits with a particular user without publishing the edits to all other users in the electronic collaborative document by sending a release signal. By sending an exemption signal, the first editor may designate one or more other editors to receive third display signals containing the second edits made in the first editor. Receiving an exemption signal for at least one particular editor to thereby enable the at least one particular editor to view the second edits may include receiving instructions in an exemption signal that may allow a user to share edits with some users and hide the edits from other users. For example, a large team of several dozen users may collaborate on a single electronic collaborative document. In this example, there may be a desire to include a section of the document that contains confidential information, such as salary information. A user may enable private mode editing to begin privately adding confidential data to the document that may be hidden from all other users. The user's editor may then transmit an exemption signal to another user's editor who can now view the confidential information and the confidential information will remain hidden from the other users working in the document. In some embodiments, an exemption signal may be applied to one or more blocks in an electronic document, thereby enabling particular editors to view the second edits associated with that block.

FIG. 12 illustrates a block diagram of an example process 1200 for enabling dual mode editing in collaborative documents to enable private changes. While the block diagram may be described below in connection with certain implementation embodiments presented in other figures, those implementations are provided for illustrative purposes only, and are not intended to serve as a limitation on the block diagram. In some embodiments, the process 1200 may be performed by at least one processor (e.g., the processing circuitry 110 in FIG. 1) of a computing device (e.g., the computing device 100 in FIGS. 1 and 2) to perform operations or functions described herein and may be described hereinafter with reference to FIGS. 10 to 11 by way of example. In some embodiments, some aspects of the process 1200 may be implemented as software (e.g., program codes or instructions) that are stored in a memory (e.g., the memory portion 122 in FIG. 1) or a non-transitory computer-readable medium. In some embodiments, some aspects of the process 1200 may be implemented as hardware (e.g., a specific-purpose circuit). In some embodiments, the process 1200 may be implemented as a combination of software and hardware.

FIG. 12 includes process blocks 1202 to 1216. At block 1202, a processing means may access an electronic collaborative document in which a first editor and at least one second editor are enabled to simultaneously edit and view each other's edits to the electronic collaborative document, as discussed previously in the disclosure above.

At block 1204, the processing means may output first display signals for presenting an interface on a display of the first editor, the interface including a toggle enabling the first editor to switch between a collaborative mode and a private mode, as discussed previously in the disclosure above.

At block 1206, the processing means may receive from the first editor operating in the collaborative mode, first edits to the electronic collaborative document, as discussed previously in the disclosure above.

At block 1208, the processing means may output second display signals to the first editor and the at least one second editor, the second display signals reflecting the first edits made by the first editor, as discussed previously in the disclosure above.

At block 1210, the processing means may receive from the first editor interacting with the interface, a private mode change signal reflecting a request to change from the collaborative mode to the private mode, as discussed previously in the disclosure above.

At block 1212, the processing means may, in response to the first mode change signal, initiate in connection with the electronic collaborative document the private mode for the first editor, as discussed previously in the disclosure above.

At block 1214, the processing means may, in the private mode, receive from the first editor, second edits to the electronic collaborative document, as discussed previously in the disclosure above.

At block 1216, the processing means may in response to the second edits, output third display signals to the first editor while withholding the third display signals from the at least one second editor, such that the second edits are enabled to appear on a display of the first editor and are prevented from appearing on at least one display of the at least one second editor, as discussed previously in the disclosure above.

Unless otherwise defined, all technical and scientific terms used herein have the same meaning as commonly understood by one of ordinary skill in the art. The materials, methods, and examples provided herein are illustrative only and not intended to be limiting.

Implementation of the method and system of the present disclosure may involve performing or completing certain selected tasks or steps manually, automatically, or a combination thereof. Moreover, according to actual instrumentation and equipment of preferred embodiments of the method and system of the present disclosure, several selected steps may be implemented by hardware (HW) or by software (SW) on any operating system of any firmware, or by a combination thereof. For example, as hardware, selected steps of the disclosure could be implemented as a chip or a circuit. As software or algorithm, selected steps of the disclosure could be implemented as a plurality of software instructions being executed by a computer using any suitable operating system. In any case, selected steps of the method and system of the disclosure could be described as being performed by a data processor, such as a computing device for executing a plurality of instructions.

As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Although the present disclosure is described with regard to a "computing device", a "computer", or "mobile device", it should be noted that optionally any device featuring a data processor and the ability to execute one or more instructions may be described as a computing device, including but not limited to any type of personal computer (PC), a server, a distributed server, a virtual server, a cloud computing platform, a cellular telephone, an IP telephone, a smartphone, a smart watch or a PDA (personal digital assistant). Any two or more of such devices in communication with each other may optionally comprise a "network" or a "computer network".

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment or implementation are necessary in every embodiment or implementation of the invention. Further combinations of the above features and implementations are also considered to be within the scope of some embodiments or implementations of the invention.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

Disclosed embodiments may include any one of the following bullet-pointed features alone or in combination with one or more other bullet-pointed features, whether implemented as a method, by at least one processor, and/or stored as executable instructions on non-transitory computer-readable media:

- accessing the electronic collaborative word processing document;
- presenting a first instance of the electronic collaborative word processing document via a first hardware device running a first editor;
- presenting a second instance of the electronic collaborative word processing document via a second hardware device running a second editor;
- receiving from the first editor during a common editing period, first edits to the electronic collaborative word processing document;
- wherein the first edits occur on a first earlier page of the electronic collaborative word processing document and result in a pagination change;
- receiving from the second editor during the common editing period, second edits to the electronic collaborative word processing document;
- wherein the second edits occur on a second page of the electronic collaborative word processing document later than the first page;
- during the common editing period, locking a display associated with the second hardware device to suppress the pagination change caused by the first edits received by the second hardware device;
- upon receipt of a scroll-up command via the second editor during the common editing period, causing the display associated with the second hardware device to reflect the pagination change caused by the first edits;
- recognizing an active work location of the second editor and to lock display scrolling associated with the second display based on the recognized active work location so as not to interrupt viewing of the active work location;

wherein the recognition of the active work location is based on a cursor location in the second instance of the collaborative electronic word processing document;

wherein the recognition of the active work location is based on a scrolling location in the second instance of the collaborative electronic word processing document;

wherein the lock remains in place until the active work location is changed in the second editor;

wherein the scroll-up command that causes the second hardware device to reflect the pagination change includes a scroll to a page other than a page currently displayed on the second display;

wherein the second edits are associated with a block in the electronic collaborative word processing document;

wherein the recognition of the active work location is based on a block location in the second instance of the collaborative electronic word processing document;

accessing an electronic collaborative document in which a first editor and at least one second editor are enabled to simultaneously edit and view each other's edits to the electronic collaborative document;

outputting first display signals for presenting an interface on a display of the first editor, the interface including a toggle enabling the first editor to switch between a collaborative mode and a private mode;

receiving from the first editor operating in the collaborative mode, first edits to the electronic collaborative document;

outputting second display signals to the first editor and the at least one second editor, the second display signals reflecting the first edits made by the first editor;

receiving from the first editor interacting with the interface, a private mode change signal reflecting a request to change from the collaborative mode to the private mode;

in response to the first mode change signal, initiating in connection with the electronic collaborative document the private mode for the first editor;

in the private mode, receiving from the first editor, second edits to the electronic collaborative document;

in response to the second edits, outputting third display signals to the first editor while withholding the third display signals from the at least one second editor, such that the second edits are enabled to appear on a display of the first editor and are prevented from appearing on at least one display of the at least one second editor;

receiving from the first editor interacting with the interface, a collaborative mode change signal reflecting a request to change from the private mode to the collaborative mode;

in response to receipt of the collaborative mode change signal, enabling subsequent edits made by the first editor to be viewed by the at least one second editor;

segregating the second edits made in private mode, such that upon return to the collaborative mode, viewing of the second edits are withheld from the at least one second editor;

receiving from the first editor a release signal, and in response thereto, enabling the at least one second editor to view the second edits;

wherein enabling the at least one second editor to view the second edits includes displaying to the at least one second editor, in association with the second edits, an identity of the first editor;

in response to receiving the release signal, comparing the second edits made in private mode to original text in the electronic collaborative document;

identifying differences based on the comparison;

presenting the differences in connection with text of the electronic collaborative document to thereby indicate changes originally made during private mode;

receiving from the first editor, in association with a text block, a retroactive privatization signal;

upon receipt of the retroactive privatization signal, withholding the text block from display to the at least one second editor; and receiving from the first editor operating in private mode an exemption signal for at least one particular editor, to thereby enable the at least one particular editor to view the second edits.

Systems and methods disclosed herein involve unconventional improvements over conventional approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

It is appreciated that the above described embodiments can be implemented by hardware, or software (program codes), or a combination of hardware and software. If implemented by software, it can be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units can be combined as one module or unit, and each of the above described modules/units can be further divided into a plurality of sub-modules or sub-units.

The block diagrams in the figures illustrate the architecture, functionality, and operation of possible implementations of systems, methods, and computer hardware or software products according to various example embodiments of the present disclosure. In this regard, each block in a flowchart or block diagram may represent a module, segment, or portion of code, which includes one or more executable instructions for implementing the specified logical functions. It should be understood that in some alternative implementations, functions indicated in a block may occur out of order noted in the figures. For example, two blocks shown in succession may be executed or implemented substantially concurrently, or two blocks may sometimes be executed in reverse order, depending upon the functionality involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as example only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It will be appreciated that the embodiments of the present disclosure are not limited to the exact construction that has been described above and illustrated in the accompanying drawings, and that various modifications and changes may be made without departing from the scope thereof.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

Computer programs based on the written description and methods of this specification are within the skill of a software developer. The various programs or program modules can be created using a variety of programming techniques. One or more of such software sections or modules can be integrated into a computer system, non-transitory computer readable media, or existing software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A system for enabling dual mode editing in an electronic collaborative document to enable private changes, the system comprising:

at least one processor configured to:

communicate with a remote server configured to store the electronic collaborative document and to communicate with a first user device and a second user device;

access the electronic collaborative document, via the remote server, in which a first editor associated with the first user device and a second editor associated with the second user device are enabled to permit simultaneous editing and simultaneous viewing of edits made to the electronic collaborative document via each of the first editor and the second editor;

output first display signals for presenting an interface via the first editor, the interface including a toggle enabling switching of the first editor between a collaborative mode and a private mode;

receive from the first editor operating in the collaborative mode, first edits to the electronic collaborative document;

output second display signals to the first editor and the second editor, the second display signals reflecting the first edits made via the first editor;

receive from the first editor interacting with the interface, a private mode change signal reflecting a request to change a designated first portion of the electronic collaborative document from the collaborative mode to the private mode;

in response to the private mode change signal, initiate the private mode for the designated first portion of the electronic collaborative document for the first editor;

receive at the remote server from the first editor, second edits for the designated first portion of the electronic collaborative document; and in response to the second edits, output third display signals to the first editor while withholding the third display signals from the second editor by enabling the second edits to appear via the first editor and preventing the second edits from appearing via the second editor;

wherein the at least one processor is further configured to receive from the first editor interacting with the interface, a collaborative mode change signal reflecting a request to change the designated first portion of the electronic collaborative document from the private mode to the collaborative mode, and in response to the receipt of the collaborative mode change signal, enable subsequent edits to the designated first portion of the electronic collaborative document made via the first editor to be viewed via the second editor, while preventing subsequent edits made via the first editor to a second portion of the electronic collaborative document from being viewed via the second editor, wherein the first designated portion is associated with one or more blocks of information within the electronic collaborative document and the second portion is associated with one or more other blocks of information within the electronic collaborative document, and wherein the at least one processor is further configured to recognize an active work location of the second editor within the electronic collaborative document and to lock a display associated with the active work location of the second editor to suppress a pagination change caused by the first edits.

2. The system of claim 1, wherein the at least one processor is further configured to segregate the second edits made in private mode by withholding, upon return to the collaborative mode, viewing of the second edits via the second editor.

3. The system of claim 1, wherein the at least one processor is further configured to receive via the first editor a release signal, and in response thereto, enabling the second editor to present the second edits.

4. The system of claim 3, wherein enabling second editor to present the second edits includes displaying to via the second editor, in association with the second edits, an identity of a user associated with the first editor.

5. The system of claim 3, wherein the at least one processor is further configured to, in response to receiving the release signal, compare the second edits made in private mode to original text in the electronic collaborative document, identify differences based on the comparison, and present the differences in connection with text of the electronic collaborative document to thereby indicate changes originally made during private mode.

6. The system, of claim 1, wherein the at least one processor is further configured to receive via the first editor, in association with a text block, a retroactive privatization signal, and upon receipt of the retroactive privatization signal, withhold the text block from display via the second editor.

7. The system of claim 1, wherein the at least one processor is further configured to receive via the first editor operating in private mode an exemption signal for at least one particular editor to enable the at least one particular editor to view the second edits.

8. A non-transitory computer readable medium containing instructions that when executed by at least one processor cause the at least one processor to perform operations for enabling dual mode editing in an electronic collaborative document to enable private changes, the operations comprising:

communicating with a remote server configured to store the electronic collaborative document and to communicate with a first user device and a second user device;

accessing the electronic collaborative document, via the remote server, in which a first editor associated with the first user device and a second editor associated with the second user device are enabled to permit simultaneous editing and simultaneous viewing of edits made to the electronic collaborative document via each of the first editor and the second editor;

outputting first display signals for presenting an interface via the first editor, the interface including a toggle enabling switching of the first editor between a collaborative mode and a private mode;

receiving from the first editor operating in the collaborative mode, first edits to the electronic collaborative document;

outputting second display signals to the first editor and the second editor, the second display signals reflecting the first edits made via the first editor;

receiving from the first editor interacting with the interface, a private mode change signal reflecting a request to change a designated first portion of the electronic collaborative document from the collaborative mode to the private mode;

in response to the private mode change signal, initiating the private mode for the designated first portion of the electronic collaborative document for the first editor;

receiving at the remote server from the first editor, second edits for the designated first portion of the electronic collaborative document; and in response to the second edits, output third display signals to the first editor while withholding the third display signals from the second editor by enabling the second edits to appear via the first editor and preventing the second edits from appearing via the second editor;

wherein the at least one processor is further configured to receive from the first editor interacting with the interface, a collaborative mode change signal reflecting a request to change the designated first portion of the electronic collaborative document from the private mode to the collaborative mode, and in response to the receipt of the collaborative mode change signal, enable subsequent edits to the designated first portion of the electronic collaborative document made via the first editor to be viewed via the second editor, while preventing subsequent edits made via the first editor to a second portion of the electronic collaborative document from being viewed via the second editor, wherein the first designated portion is associated with one or more blocks of information within the electronic collaborative document and the second portion is associated with one or more other blocks of information within the electronic collaborative document, and wherein the at least one processor is further configured to recognize an active work location of the second editor within the electronic collaborative document and to lock a display associated with the active work location of the second editor to suppress a pagination change caused by the first edits.

9. The system of claim 1 wherein the at least one processor is further configured to identify the first editor and the second editor by a user identification indicator.

10. The system of claim 1, wherein the at least one processor is further configured to determine that the first editor has an authorization to make the first edit to the electronic collaboration document.

11. The system of claim 1, wherein the at least one processor is further configured to output the third display signals via the second editor in response to an automatic release signal, the automatic release signal being based on a predetermined action performed via the first editor.

12. The system of claim 1, wherein the at least one processor is further configured to suppress a pagination change caused by the first edits made by the first editor in the second display signals output to the second editor.

13. The system of claim 1, wherein the at least one processor is configured to receive the private mode change signal from a unique hyperlink associated with the first editor.

14. The system of claim 1, wherein the remote server is configured to store the received second edits.

15. The system of claim 14, wherein the remote server is collocated with neither the first user device or the second user device.

16. The system of claim 1, wherein in the private mode, the at least one processor is configured to allow a user to designate edits to a portion of an electronic collaborative document to be visible to a subset of all users who have access to the collaborative document.

17. The system of claim 1, wherein the at least one processor is configured to make less than all of a user's edits not visible to other users with access to an electronic collaborative document until the user signals that the edits should be visible to other users.

18. The system of claim 1, wherein:
the electronic collaborative document is a worksheet, and
the first designated portion and the second portion include at least one of: one or more columns or one or more cells.

19. The system of claim of 1, wherein a block of information includes at least one of: a single text character, a word, a sentence, a paragraph, a page, or a graphic.

20. The system of claim 1, wherein recognizing the active work location of the second editor within the electronic collaborative document is based on at least one of: a cursor location in the electronic collaborative document, a scrolling location in the electronic collaborative document, or a block location in the electronic collaborative document.

21. The non-transitory computer readable medium of claim 8, wherein the operations further include receiving from the first editor interacting with the interface, a collaborative mode change signal reflecting a request to change from the private mode to the collaborative mode, and in response to receipt of the collaborative mode change signal, enable subsequent edits made via the first editor to be viewed via the second editor.

22. The non-transitory computer readable medium of claim 8, wherein the operations further include segregating the second edits made in private mode by withholding, upon return to the collaborative mode, viewing of the second edits via the second editor.

23. The non-transitory computer readable medium of claim 8, wherein the operations further comprise receiving via the first editor a release signal, and in response thereto, enabling the second editor to present the second edits.

24. The non-transitory computer readable medium of claim 8, wherein the operations further include receiving via the first editor, in association with a text block, a retroactive privatization signal, and upon receipt of the retroactive privatization signal, withhold the text block from display via the second editor.

25. The non-transitory computer readable medium of claim 8, wherein the operations further include receiving via the first editor operating in private mode an exemption signal for at least one particular editor, to thereby enable the at least one particular editor to view the second edits.

26. A method for enabling dual mode editing in an electronic collaborative document to enable private changes, the method comprising:

communicating with a remote server configured to store the electronic collaborative document and to communicate with a first user device and a second user device;

accessing the electronic collaborative document, via the remote server, in which a first editor associated with the first user device and a second editor associated with the second user device are enabled to permit simultaneous editing and simultaneous viewing of edits made to the electronic collaborative document via each of the first editor and the second editor;

outputting first display signals for presenting an interface via the first editor, the interface including a toggle enabling switching of the first editor between a collaborative mode and a private mode;

receiving from the first editor operating in the collaborative mode, first edits to the electronic collaborative document;

outputting second display signals to the first editor and the second editor, the second display signals reflecting the first edits made via the first editor;

receiving from the first editor interacting with the interface, a private mode change signal reflecting a request to change a designated first portion of the electronic collaborative document from the collaborative mode to the private mode;

in response to the private mode change signal, initiating the private mode for the designated first portion of the electronic collaborative document for the first editor;

receiving at the remote server from the first editor, second edits for the designated first portion of the electronic collaborative document;

in response to the second edits, output third display signals to the first editor while withholding the third display signals from the second editor by enabling the second edits to appear via the first editor and preventing the second edits from appearing via the second editor; and receiving from the first editor interacting with the interface, a collaborative mode change signal reflecting a request to change the designated first portion of the electronic collaborative document from the private mode to the collaborative mode, and in response to the receipt of the collaborative mode change signal, enable subsequent edits to the designated first portion of the electronic collaborative document made via the first editor to be viewed via the second editor, while preventing subsequent edits made via the first editor to a second portion of the electronic collaborative document from being viewed via the second editor, wherein the first designated portion is associated with one or more blocks of information within the electronic collaborative document and the second portion is associated with one or more other blocks of information within the electronic collaborative document, and wherein the at least one processor is further configured to recognize an active work location of the second editor within the electronic collaborative document and to lock a display associated with the active work location of the second editor to suppress a pagination change caused by the first edits.

27. The method of claim 26, further comprising receiving from, the first editor interacting with the interface, a collaborative mode change signal reflecting a request to change from the private mode to the collaborative mode, and in response to receipt of the collaborative mode change signal, enable subsequent edits made via the first editor to be viewed via the second editor.

28. The method of claim 26, further comprising segregating the second edits made in private mode by withholding, upon return to the collaborative mode, viewing of the second edits via the second editor.

29. The method of claim 26, further comprising receiving via the first editor a release signal, and in response thereto, enabling the second editor to present the second edits.

30. The method of claim 26, further comprising receiving via the first editor, in association with a text block, a retroactive privatization signal, and upon receipt of the retroactive privatization signal, withhold the text block from display via the second editor.

31. The method of claim 26, further comprising receiving via the first editor operating in private mode an exemption signal for at least one particular editor, to thereby enable the at least one particular editor to view the second edits.

* * * * *